US012745296B2

(12) United States Patent
Du et al.

(10) Patent No.: US 12,745,296 B2
(45) Date of Patent: Sep. 22, 2026

(54) SENSING SESSION ESTABLISHMENT METHOD AND COMMUNICATION APPARATUS

(71) Applicant: HUAWEI TECHNOLOGIES CO., LTD., Shenzhen (CN)

(72) Inventors: Rui Du, Shenzhen (CN); Zihan Zheng, Chengdu (CN); Lingling Yang, Chengdu (CN); Meihong Zhang, Shenzhen (CN); Xiao Han, Shenzhen (CN); Mengshi Hu, Shenzhen (CN); Xun Yang, Shenzhen (CN); Yan Long, Chengdu (CN); Rong He, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 297 days.

(21) Appl. No.: 18/411,798

(22) Filed: Jan. 12, 2024

(65) Prior Publication Data

US 2024/0155702 A1 May 9, 2024

Related U.S. Application Data

(63) Continuation of application No. PCT/CN2022/101932, filed on Jun. 28, 2022.

(30) Foreign Application Priority Data

Jul. 14, 2021 (CN) ......................... 202110797771.8

(51) Int. Cl.
*H04W 76/10* (2018.01)
*H04W 8/00* (2009.01)
(Continued)

(52) U.S. Cl.
CPC ............ *H04W 76/10* (2018.02); *H04W 8/005* (2013.01); *H04W 48/16* (2013.01); *H04W 84/12* (2013.01)

(58) Field of Classification Search
CPC ..... H04W 76/10; H04W 8/005; H04W 48/16; H04W 84/12
See application file for complete search history.

(56) References Cited

U.S. PATENT DOCUMENTS

2023/0198579 A1* 6/2023 Lim ...................... H04W 24/08 375/262
2023/0308923 A1 9/2023 Beg et al.
2023/0362990 A1* 11/2023 Jang .................. H04W 74/0808

FOREIGN PATENT DOCUMENTS

CN 113115341 A * 7/2021 ............ H04W 24/02
JP 2024500889 A 1/2024
WO 2022139449 A1 6/2022

OTHER PUBLICATIONS

Zhou et al., "WLAN Sensing Discovery", Jun. 22, 2021, IEEE, 802.11 WG, doc .: IEEE 802.11-21/0647r2, pp. 1-11 (Year: 2021).*
(Continued)

*Primary Examiner* — Paul H. Masur
(74) *Attorney, Agent, or Firm* — WOMBLE BOND DICKINSON (US) LLP

(57) ABSTRACT

In a sensing session establishment process, an access point sends a first frame to a first station, where the first frame includes first information, the first information indicates a first role of the first station in a sensing session, the first role of the first station in the sensing session is a transmitter and/or a receiver, and the first station is a station participating in the sensing session in a second station associated with the access point; and the access point receives a second frame from the first station, where the second frame includes confirm information for the first frame.

20 Claims, 44 Drawing Sheets

(51) Int. Cl.
*H04W 48/16* (2009.01)
*H04W 84/12* (2009.01)

(56) References Cited

OTHER PUBLICATIONS

Zhou et al., “WLAN Sensing Discovery”, Apr. 20, 2021, IEEE, 802.11 WG, doc .: IEEE 802.11-21/0647r1, pp. 1-9 (Year: 2021).*
Zhou et al., “WLAN Sensing Discovery”, Apr. 16, 2021, IEEE, 802.11 WG, doc .: IEEE 802.11-21/0647r0, pp. 1-9 (Year: 2021).*
Zhou et al., “Discussion on Sensing Setup Procedure”, Apr. 12, 2021, IEEE, 802.11 WG, doc .: IEEE 802.11-21/0648r0, pp. 1-9 (Year: 2021).*
Machine Translation of CN-113115341-A (Year: 2021).*
IEEE Std 802.11ac™—2013, Part 11: Wireless LAN Medium Access Control (MAC) and Physical Layer (PHY) Specifications, Amendment 4: Enhancements for Very High Throughput for Operation in Bands below 6 GHz,Dec. 11, 2013,total 425 pages.
IEEE P802.11ax™/D8.0, Oct. 2020,Part 11: Wireless LAN Medium Access Control (MAC) and Physical Layer (PHY) Specifications,Amendment 1: Enhancements for High Efficiency WLAN,total 820 pages.
Cheng Chen et al. (INTEL): “Considerations of sensing negotiation”, IEEE Draft; 11-21-0370-00-00BF—Considerations-of-Sensing-Negotiation, IEEE-SA Mentor, Piscataway, NJ USA vol. 802.11 bf Mar. 7, 2021 (Mar. 5, 2021), pp. 1-10, XP068179889, total 10 pages.
Claudio Da Silva et al. (INTEL): “Specification Framework for TGbf”, IEEE Draft: 11-21-0504-01-00BF—Specification-Framework-FORTGBF, IEEE-SA Mentor. Piscataway, NJ USA vol. 802.11 bf, No. 1 Apr. 28, 2021 (Apr. 28, 2021), pp. 1-6, XP068179967, total 6 pages.
Insun Jang et al., “Discussion on WLAN Sensing Procedure”,LG Electronics, Nov. 9, 2020,IEEE 802.11-20/1804r0, total 13 pages.

* cited by examiner

CONT. FROM FIG. 6b-1

61

| | Frame Control | Duration | (RA) | TA | Common Info | User Info | ... | User Info | Padding | FCS |
|---|---|---|---|---|---|---|---|---|---|---|
| Octets: | 2 | 2 | 6 | 6 | 8 or more | 5 or more | | 5 or more | variable | 4 |

| | AID 12 | RU Allocation | ... | Reserved | Trigger Dependent User Info |
|---|---|---|---|---|---|
| Bits: | 12 | 8 | 19 | 1 | variable |

| | Sensing Request Info | Sensing Type | ... |
|---|---|---|---|
| Octets: | 1 | 12 | |

| | Sensing Roles Indication | Sensing Feedback Type | Reserved |
|---|---|---|---|
| Bits: | 2 | 3 | 2 |

| Type 1 | Type 2 |
|---|---|

| | Pattern | Group measurement duration | Number of Group | Interval between Group |
|---|---|---|---|---|
| Octets: | 1 | 2 | 2 | 2 |

| Pattern | Measurement duration | Number |
|---|---|---|
| 1 | 2 | 2 |

CONT. FROM FIG. 8b-1

81

| Octets: | 2 | 2 | 6 | 6 | 8 or more | 5 or more | | 5 or more | variable | 4 |
|---|---|---|---|---|---|---|---|---|---|---|
| | Frame Control | Duration | (RA) | TA | Common Info | User Info | ... | User Info | Padding | FCS |

| Bits: | 12 | 8 | 19 | 1 | variable |
|---|---|---|---|---|---|
| | AID 12 | RU Allocation | ... | Reserved | Trigger Dependent User Info |

| Octets: | 1 | 12 | |
|---|---|---|---|
| | Sensing Request Info | Sensing Type | ... |

| Bits: | 1 | 2 | 3 | 2 |
|---|---|---|---|---|
| | Sensing Request Indication | Sensing Roles Indication | Sensing Feedback Type | Reserved |

| Type 1 | Type 2 |
|---|---|

| Octets: | 1 | 2 | 2 | 2 |
|---|---|---|---|---|
| | Pattern | Group measurement duration | Number of Group | Interval between Group |

| 1 | 2 | 2 |
|---|---|---|
| Pattern | Measurement duration | Number |

FIG. 8b-2

SENSING SESSION ESTABLISHMENT METHOD AND COMMUNICATION APPARATUS

CROSS-REFERENCE TO RELATED APPLICATIONS

This application is a continuation of International Patent Application No. PCT/CN2022/101932, filed on Jun. 28, 2022, which claims priority to Chinese Patent Application No. 202110797771.8, filed on Jul. 14, 2021. The disclosures of the aforementioned applications are hereby incorporated by reference in their entireties.

TECHNICAL FIELD

This application relates to the field of communication technologies, and in particular, to a sensing session establishment method and a communication apparatus.

BACKGROUND

With development of communication technologies such as wireless fidelity (Wi-Fi), various wireless communication devices have been widely used in people's daily life. Sensing measurement may be performed on environment information or other information (for example, human body movement information) based on channel information of these devices in a wireless communication process. A technology in which sensing measurement is performed on a sensing target (that is, the environment information or other information) based on channel information is referred to as a wireless sensing technology.

However, signaling or a data frame in the Wi-Fi communication technology is usually used for channel measurement, communication configuration, channel estimation, or the like, and cannot meet a function requirement of the wireless sensing technology.

SUMMARY

Embodiments of this application provide a sensing session establishment method and a communication apparatus, so that an access point can flexibly manage a station participating in a sensing session to perform sensing measurement. This helps meet a sensing measurement requirement.

According to a first aspect, an embodiment of this application provides a sensing session establishment method. An access point (AP) sends a first frame to a first station (STA), where the first frame includes first information, the first information indicates a first role of the first STA in a sensing session, the first role of the first STA in the sensing session is a transmitter and/or a receiver, and the first STA is a STA participating in the sensing session in a second STA associated with the AP; and the AP receives a second frame from the first STA, where the second frame includes confirm information for the first frame.

In an embodiment, for each STA participating in the sensing session, the AP allocates a role in the sensing session to the STA by sending the first frame to the STA, so that the AP can flexibly manage, by using the first frame, the role of the STA participating in the sensing session. This helps satisfy (meet) a function requirement of a wireless sensing technology as much as possible in Wi-Fi communication.

In an embodiment, the first frame further includes a first sensing parameter, and the first sensing parameter is used by the first station to perform sensing measurement and/or sensing data reporting in the sensing session. In this embodiment, the AP may manage, by using the first frame, the sensing parameter of the STA participating in the sensing session.

In an embodiment, the first sensing parameter includes one or more of the following parameters: an operation parameter, a feedback type, a sensing type, or a feedback address.

In an embodiment, the first frame includes a common information field and a user information field, and the first information is located in the common information field and/or the user information field; the first frame includes a station information field, and the first information is located in the station information field; or the first frame includes a common information field and a station information field, and the first information is located in the common information field and/or the station information field.

In an embodiment, the second frame includes a confirm element field, and the confirm information is located in the confirm element field.

In an embodiment, the AP sends a third frame to a plurality of second STAs, where the third frame includes second information, and the second information is used to request the second STA to participate in the sensing session. Further, the AP receives a fourth frame from the plurality of second STAs, where the fourth frame includes third information, and the third information indicates whether the second STA confirms to participate in the sensing session. The AP determines the first STA from the plurality of second STAs based on the third information from the plurality of second STAs. In this embodiment, the AP may determine, from the plurality of STAs associated with the AP, a part of STAs to participate in the sensing session. This reduces a quantity of STAs participating in the sensing session, and saves communication transmission resources.

In an embodiment, when the third information indicates that the second STA confirms to participate in the sensing session, the third information further includes a second role supported by the second STA in the sensing session and a second sensing parameter corresponding to the second role. The AP determines the first STA from the plurality of second STAs based on a role of the AP in the sensing session and the third information from the plurality of second STAs.

In this embodiment, if the STA associated with the AP confirms to participate in the sensing session, the STA sends the third information to the AP. The third information is used to notify the AP of the second role that can be supported by the STA in the sensing session and the second sensing parameter corresponding to the second role. Further, the AP may allocate a role in the sensing session to the STA based on the second role and the second sensing parameter, to improve efficiency of managing the STA in the sensing session by the AP.

In an embodiment, when the role of the AP in the sensing session is not a transmitter and the role of the AP in the sensing session is not a receiver, third information from a third STA indicates that the third STA participates in the sensing session, and third information from a fourth STA indicates that the fourth STA participates in the sensing session, the AP determines the third STA and the fourth STA as the first STAs. A second role corresponding to the third STA is a receiver in the sensing session, and a second role corresponding to the fourth STA is a transmitter in the sensing session. In this embodiment, when the AP is neither a transmitter nor a receiver in the sensing session, and does not participate in receiving/sending of the sensing signal, in STAs that are determined by the AP and that participate in the sensing session, there is at least one STA whose role is a receiver and at least one STA whose role is a transmitter, to ensure that there is at least one complete communication link of the sensing signal.

In an embodiment, the third STA and the fourth STA are a same STA.

In an embodiment, when the role of the AP in the sensing session is a transmitter, and third information from a fifth STA indicates that the fifth STA participates in the sensing session, the AP determines the fifth STA as the first STA. The fifth STA is one of the plurality of second STAs, and a second role corresponding to the fifth STA is a receiver in the sensing session. In this embodiment, when the AP is a transmitter in the sensing session, in STAs that are determined by the AP and that participate in the sensing session, there is at least one STA whose role is a receiver, to ensure that there is at least one complete communication link of the sensing signal.

In an embodiment, when the role of the AP in the sensing session is a receiver, third information from a sixth STA indicates that the sixth STA participates in the sensing session, the AP determines the sixth STA as the first STA. The sixth STA is one of the plurality of second STAs, and a second role corresponding to the sixth STA is a transmitter in the sensing session. In this embodiment, when the AP is a receiver in the sensing session, in STAs that are determined by the AP and that participate in the sensing session, there is at least one STA whose role is a transmitter, to ensure that there is at least one complete communication link of the sensing signal.

In an embodiment, the AP determines the first sensing parameter based on the second sensing parameter. In this embodiment, the AP determines, based on a recommended sensing parameter (that is, the second sensing parameter) fed back by the STA, the sensing parameter used when the STA participates in the sensing session, to improve efficiency of configuring a parameter for the STA by the AP.

In an embodiment, the third frame includes a common information field, and the second information is located in the common information field; or the third frame includes a sensing request element field, and the second information is located in the sensing request element field.

In an embodiment, the fourth frame includes a sensing confirm element field, and the third information is located in the sensing confirm element field; or the fourth frame includes a sensing response element field, and the third information is located in the sensing response element field.

In an embodiment, the first frame includes a sensing request element field, and the first information is located in the sensing request element field.

In an embodiment, the second frame includes a sensing response element field, and the confirm information is located in the sensing response field.

In an embodiment, the AP sends a fifth frame to a plurality of second STAs, where the fifth frame includes fourth information, and the fourth information is used to request the second STA to participate in the sensing session by using a third role and a fourth sensing parameter; the AP receives a sixth frame from the plurality of second STAs, where the sixth frame includes fifth information, and the fifth information indicates whether the second STA confirms to participate in the sensing session by using the third role and the fourth sensing parameter; and the AP determines the first STA from the plurality of second STAs based on the fifth information from the plurality of second STAs. In this embodiment, the AP may determine, from the plurality of STAs associated with the AP, a part of STAs to participate in the sensing session. This reduces a quantity of STAs participating in the sensing session, and saves communication transmission resources. In addition, when requesting the plurality of STAs associated with the AP to participate in the sensing session, the AP allocates a role and a sensing parameter to each STA. If the STA agrees to participate in the sensing session by using the role and the sensing parameter allocated by the AP, the AP may not allocate a role and a sensing parameter to the STA subsequently. That is, a quantity of communication times between the AP and the STA can be reduced, and communication transmission resources can be saved.

In an embodiment, when fifth information from a third STA indicates that the third STA participates in the sensing session based on a third role corresponding to the third STA and the fourth sensing parameter, and fifth information from a fourth STA indicates that the fourth STA participates in the sensing session based on a third role corresponding to the fourth STA and the fourth sensing parameter, the AP determines the third STA and the fourth STA as the first STAs. The third role corresponding to the third STA is a receiver in the sensing session, and the third role corresponding to the fourth STA is a transmitter in the sensing session. In this embodiment, in STAs that are determined by the AP and that participate in the sensing session, there is at least one STA whose role is a transmitter, to ensure that there is at least one complete communication link of the sensing signal.

In an embodiment, the third STA and the fourth STA are a same STA.

In an embodiment, the AP determines the first STA from the plurality of second STAs based on a role of the AP in the sensing session and the fifth information from the plurality of second STAs.

In an embodiment, when the role of the AP in the sensing session is a transmitter, and fifth information from a fifth STA indicates that the fifth STA participates in the sensing session based on a third role corresponding to the fifth STA, the AP determines the fifth STA as the first STA. The fifth STA is one of the plurality of second STAs, and the third role corresponding to the fifth STA is a receiver in the sensing session. Alternatively, when the role of the AP in the sensing session is a receiver, and fifth information from a sixth STA indicates that the sixth STA participates in the sensing session based on a third role corresponding to the sixth STA, the AP determines the sixth STA as the first STA. The sixth STA is one of the plurality of second STAs, and the third role corresponding to the sixth STA is a transmitter in the sensing session. In this embodiment, when the AP is a transmitter in the sensing session, in STAs that are determined by the AP and that participate in the sensing session, there is at least one STA whose role is a receiver; or when the AP is a receiver in the sensing session, in STAs that are determined by the AP and that participate in the sensing session, there is at least one STA whose role is a transmitter, to ensure that there is at least one complete communication link of the sensing signal in the sensing session.

In an embodiment, when the fifth information from the fifth STA indicates that the fifth STA participates in the sensing session based on the third role corresponding to the fifth STA, but the fifth STA does not participate in the sensing session based on a fourth sensing parameter corresponding to the fifth STA, or when the fifth information from the sixth STA indicates that the sixth STA participates in the sensing session based on the third role corresponding to the sixth STA, but the sixth STA does not participate in the sensing session based on a fourth sensing parameter corresponding to the sixth STA, the fifth information further includes a fifth sensing parameter of the first STA; and the AP determines, based on the fifth sensing parameter of the first STA, the first sensing parameter corresponding to the first STA. In this embodiment, when the STA determines to participate in the sensing session based on the role allocated by the AP to the STA, but does not agree to participate in the sensing session based on the sensing parameter allocated by the AP to the STA, the STA may feed back a suggested parameter (that is, the fifth sensing parameter) of the STA in the role to the AP. Further, the AP determines, based on the suggested parameter fed back by the STA, a sensing parameter used when the STA participates in the sensing session, to improve efficiency of configuring a parameter for the STA by the AP.

In an embodiment, the fifth frame includes a sensing request element field, and the fourth information is located in the sensing request element field.

In an embodiment, the sixth frame includes a sensing response element field, and the fifth information is located in the sensing response element field.

In an embodiment, the AP receives sensing requirement information from an initiator STA. In this embodiment, when the STA serves as a sensing initiator, the STA sends a sensing requirement to the AP, and the AP performs any one or more of the foregoing implementations based on the sensing requirement sent by the STA, to coordinate and manage station devices participating in the sensing session.

According to a second aspect, an embodiment of this application provides a sensing session establishment method. A station STA receives a first frame from an access point AP, where the first frame includes first information, the first information indicates a first role of the STA in a sensing session, and the first role of the STA in the sensing session is a transmitter and/or a receiver; and the STA sends a second frame to the AP, where the second frame includes confirm information for the first frame.

For beneficial effects of the sensing session establishment method according to the second aspect, refer to the beneficial effects of the sensing session establishment method according to the first aspect. Details are not described herein again.

In an embodiment, the first frame further includes a first sensing parameter, and the first sensing parameter is used by the STA to perform sensing measurement and/or sensing data reporting in the sensing session.

In an embodiment, the first sensing parameter includes one or more of the following parameters: an operation parameter, a feedback type, a sensing type, or a feedback address.

In an embodiment, the first frame includes a common information field and a user information field, and the first information is located in the common information field and/or the user information field; the first frame includes a station information field, and the first information is located in the station information field; or the first frame includes a common information field and a station information field, and the first information is located in the common information field and/or the station information field.

In an embodiment, the second frame includes a confirm element field, and the confirm information is located in the confirm element field.

In an embodiment, the STA receives a third frame from the AP, where the third frame includes second information, and the second information is used to request the STA to participate in the sensing session; and the STA sends a fourth frame to the AP, where the fourth frame includes third information, and the third information indicates whether the STA confirms to participate in the sensing session.

In an embodiment, when the third information indicates that the STA confirms to participate in the sensing session, the third information further includes a second role supported by the STA in the sensing session and a second sensing parameter corresponding to the second role.

In an embodiment, the third frame includes a common information field, and the second information is located in the common information field; or the third frame includes a sensing request element field, and the second information is located in the sensing request element field.

In an embodiment, the fourth frame includes a sensing confirm element field, and the third information is located in the sensing confirm element field; or the fourth frame includes a sensing response element field, and the third information is located in the sensing response element field.

In an embodiment, the first frame includes a sensing request element field, and the first information is located in the sensing request element field.

In an embodiment, the second frame includes a sensing response element field, and the confirm information is located in the sensing response field.

In an embodiment, the STA receives a fifth frame from the AP, where the fifth frame includes fourth information, and the fourth information is used to request the STA to participate in the sensing session by using a third role and a fourth sensing parameter; and the STA sends a sixth frame to the AP, where the sixth frame includes fifth information, and the fifth information indicates whether the STA confirms to participate in the sensing session by using the third role and the fourth sensing parameter.

In an embodiment, when the fifth information indicates that the STA participates in the sensing session based on the third role, but the STA does not participate in the sensing session based on the fourth sensing parameter, the fifth information further includes a fifth sensing parameter of the STA.

In an embodiment, the fifth frame includes a sensing request element field, and the fourth information is located in the sensing request element field.

In an embodiment, the sixth frame includes a sensing response element field, and the fifth information is located in the sensing response element field.

In an embodiment, the STA sends sensing requirement information to the AP.

According to a third aspect, this application provides a communication apparatus. The apparatus may be an apparatus in an access point, or an apparatus that can be used together with an access point; or the apparatus may be an apparatus in a station, or an apparatus that can be used together with a station. The communication apparatus may alternatively be a chip system. The communication apparatus may perform the method of the access point according to the first aspect or the second aspect; or the communication apparatus may perform the method of the station according to the first aspect or the second aspect. A function of the communication apparatus may be implemented by hardware, or may be implemented by hardware by executing corresponding software. The hardware or the software includes one or more units corresponding to the functions. The unit may be software and/or hardware. For operations performed by the communication apparatus and beneficial effects thereof, refer to the method according to the first aspect or the second aspect, and the beneficial effects thereof. Repeated content is not described again.

According to a fourth aspect, this application provides a communication apparatus. The communication apparatus includes a processor and a memory. The memory is configured to store one or more computer programs, and the one or more computer programs include computer-executable instructions. When the communication apparatus runs, the processor executes the one or more computer programs stored in the memory, to enable the communication apparatus to perform the method of the access point according to the first aspect or the second aspect, or perform the method of the station according to the first aspect or the second aspect.

According to a fifth aspect, this application provides a computer-readable storage medium. The computer-readable storage medium is configured to store a computer program or instructions. When the computer program or instructions are run, the methods performed by the station or the access point according to the foregoing aspects are implemented.

According to a sixth aspect, a computer program product including instructions is provided. When the computer program product is run on a computer, the methods according to the foregoing aspects are implemented.

BRIEF DESCRIPTION OF DRAWINGS

FIG. 6*b*-1 and FIG. 6*b*-2 are a schematic diagram of a frame structure according to this application;

FIG. 8*b*-1 and FIG. 8*b*-2 are a schematic diagram of still another frame structure according to this application;

DESCRIPTION OF EMBODIMENTS

To make objectives, technical solutions, and advantages of this application clearer, the following further describes this application in detail with reference to the accompanying drawings.

In the specification, the claims, and the accompanying drawings of this application, terms "first", "second", and the like are intended to distinguish between different objects but do not indicate a particular order. In addition, terms "including" and "having" and any other variants thereof are intended to cover a non-exclusive inclusion. For example, a process, a method, a system, a product, or a device that includes a series of operations or units is not limited to the listed operations or units, but optionally further includes an unlisted operation or unit, or optionally further includes another inherent operation or unit of the process, the method, the product, or the device.

An "embodiment" mentioned in this specification means that a particular feature, structure, or characteristic described with reference to this embodiment may be included in at least one embodiment of this application. The phrase shown in various locations in the specification may not necessarily refer to a same embodiment, and is not an independent or optional embodiment exclusive from another embodiment. It is explicitly and implicitly understood by a person skilled in the art that embodiments described in the specification may be combined with another embodiment.

In this application, "at least one (item)" means one or more, "a plurality of" means two or more, "at least two (item)" means two or three or more, and "and/or" is used to describe an association relationship between associated objects and indicates that three relationships may exist. For example, "A and/or B" may indicate the following three cases: Only A exists, only B exists, and both A and B exist, where A and B may be singular or plural. The character "/" generally indicates an "or" relationship between the associated objects. "At least one of the following items (pieces)" or a similar expression thereof refers to any combination of these items, including any combination of singular items (pieces) or plural items (pieces). For example, at least one of a, b, or c may indicate a, b, c, a and b, a and c, b and c, or a, b, and c, where a, b, and c may be singular or plural.

To better understand embodiments of this application, the following first describes a system architecture in embodiments of this application.

The system architecture in this application includes one or more first wireless devices and one or more second wireless devices. The first wireless device may be an access point (AP) station, and the second wireless device may be a non-access point station (non-AP STA). For ease of description, in this specification, a station of an access point type is referred to as an AP, and a station of a non-access point type is referred to as a station (STA).

Figures 1, 2:
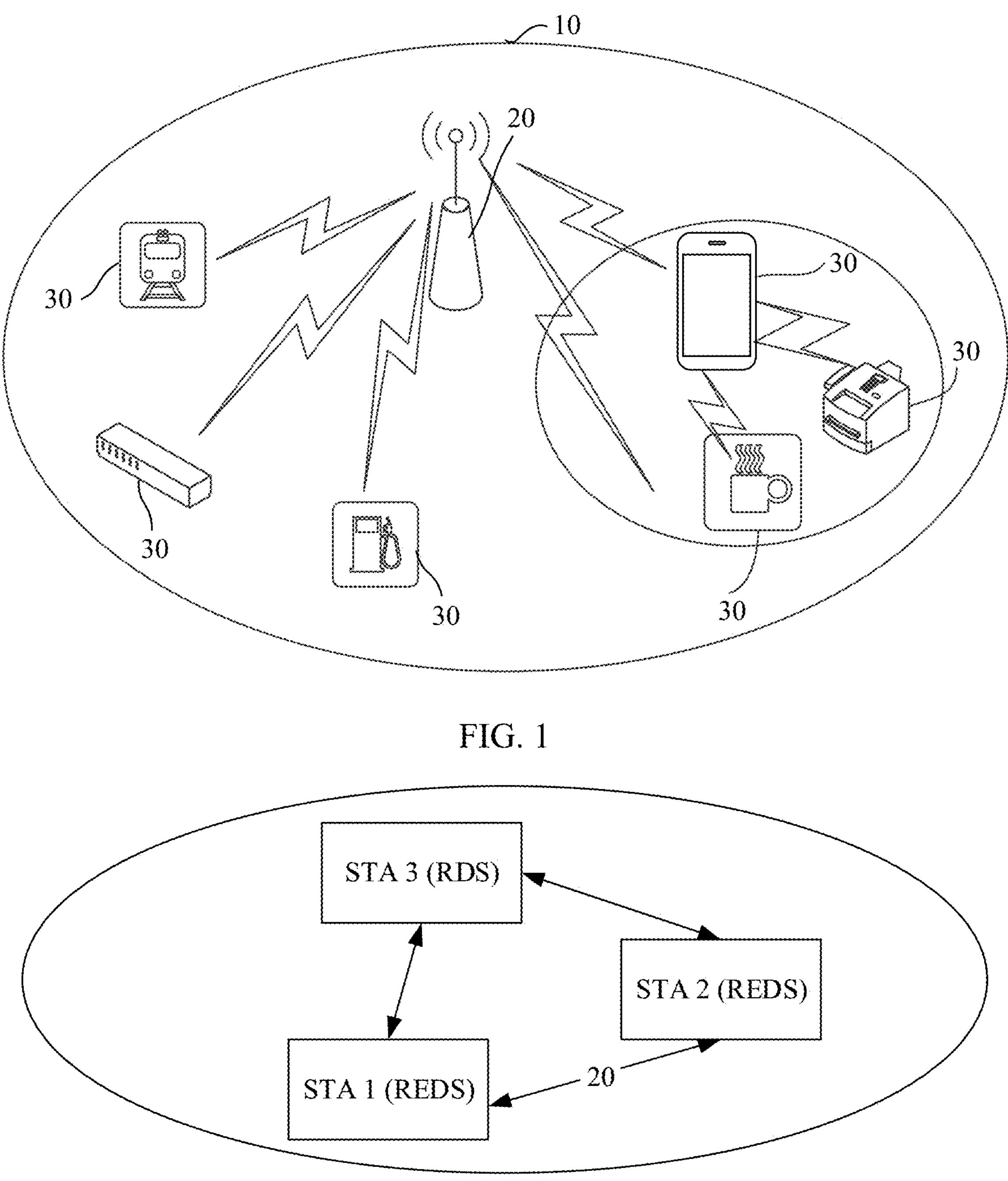
FIG. 1 is a schematic diagram of a system architecture according to this application.
FIG. 2 is a schematic diagram of a D2D communication scenario according to this application.

FIG. 1 is a schematic diagram of a system architecture 10 according to an embodiment of this application. In FIG. 1, an example in which a first wireless device is an access point (that is, a device 20 in the system architecture 10) and a second wireless device is a station (that is, a device 30 in the system architecture 10) is used.

The access point may be an access point used by a terminal device (such as a mobile phone) to access a wired (or wireless) network, and is mainly deployed at home, in a building, and in a park. A typical coverage radius is tens of meters to 100-odd meters. Certainly, the access point may alternatively be deployed outdoors. The access point is equivalent to a bridge that connects the wired network and the wireless network. A main function of the access point is to connect various wireless network clients together and then connect the wireless network to the Ethernet. In an embodiment, the access point may be a terminal device (such as a mobile phone) or a network device (such as a router) with a Wi-Fi chip. The access point may be a device that supports the 802.11be standard or a standard after 802.11be.

The station may be a wireless communication chip, a wireless sensor, or a wireless communication terminal. For example, the station may be a mobile phone, a tablet computer, a set-top box, a smart television set, a smart wearable device, a vehicle-mounted communication device, or a computer that supports a Wi-Fi communication function.

The access point and the station interact with each other by using a wireless network protocol, for example, a Wi-Fi protocol. The access point may send a downlink measurement packet, and coordinate the station to perform channel measurement. The station may feed back information to the access point based on a measurement result, so that the access point determines wireless sensing or information in another field based on the information fed back by the station. It should be learned that there may be a plurality of stations in a coverage area of one access point, and the access point may perform proper resource scheduling on each station to improve a system throughput, robustness, and the like.

To facilitate understanding of content of this solution, the following describes some terms in embodiments of this application, to help a person skilled in the art have a better understanding.

1. Channel State Information (CSI)

The CSI is a channel measurement result obtained by a STA by measuring a training packet sent by an AP, and is used to reflect a current status of a wireless channel. In the Wi-Fi protocol, the CSI is measured for each orthogonal frequency division multiplexing (OFDM) subcarrier group, to obtain a CSI matrix corresponding to the subcarrier group. A size of the CSI matrix is a quantity of transmit antennas multiplied by a quantity of receive antennas. Each matrix element is a complex number including real and imaginary parts. Therefore, when there are a large quantity of antennas and a large quantity of subcarriers, an overall data amount of the CSI may reach more than 3000 bytes per packet. This consumes a large quantity of communication bandwidth resources.

A transmitter and a receiver do not need to be synchronized. An illumination signal may be a common communication physical layer protocol data unit (PPDU) or a modified communication PPDU, and may be classified into coordinated CSI sensing and non-coordinated CSI sensing based on a working manner of the illumination signal. In coordinated CSI sensing, a sensing transmitter participates in a sensing session and sends an illumination signal to illuminate a region of interest, and a sensing receiver receives the signal to measure the region of interest, that is, obtains information related to a location of a measured target by performing related processing on the CSI. In non-coordinated CSI sensing, there is no dedicated sensing transmitter in the sensing session, and the sensing receiver measures the region of interest by occasionally receiving the illumination signal in an environment.

2. Device-to-Device Communication (D2D)

A device in a D2D communication scenario may be a relay endpoint directional multi-gigabit station (REDS), a device configured to transmit a signal is referred to as a source REDS, and a device configured to receive a signal is referred to as a target REDS. FIG. 2 is a D2D communication scenario according to this application. In the D2D communication scenario, a STA 1 is a source REDS, a STA 2 is a target REDS, and a STA 3 is a relay directional multi-gigabit station (RDS). Generally, the STA 1 and the STA 2 directly communicate with each other through a direct link 20. When the direct link 20 between the STA 1 and the STA 2 is interrupted, a frame for redirection addressing of the STA 1 is transmitted to the target REDS (e.g., STA 2) by using the STA 3. The STA 3 forwards the frame received from the STA 1 to the STA 2, and forwards the frame received from the STA 2 to the STA 1. After the direct link 20 between the STA 1 and the STA 2 is restored, direct communication between the STA 1 and the STA 2 may be restored.

3. Wireless Sensing Technology

Figure 3:
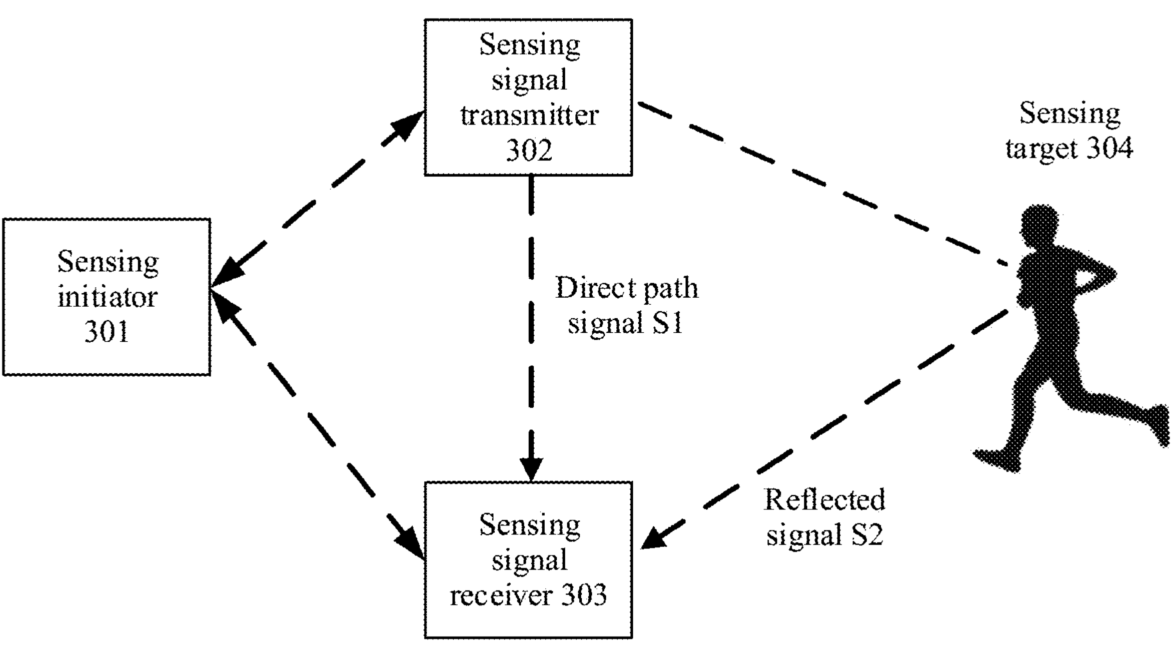
FIG. 3 is a schematic diagram of an application scenario of a wireless sensing technology according to this application.

In an application process of the wireless sensing technology, devices participating in sensing may be classified into a sensing initiator and a sensing responder, or a sensing signal transmitter and a sensing signal receiver. A device configured to respond to the sensing initiator may be understood as a sensing responder, for example, a sensing signal transmitter and a sensing signal receiver. Refer to FIG. 3. When the wireless sensing technology is used to sense a human body movement, a wireless sensing system includes a sensing initiator 301, a sensing signal transmitter 302, a sensing signal receiver 303, and a sensing target 304. In the system shown in FIG. 3, the sensing initiator 301 is configured to initiate a sensing session, that is, may be understood as notifying the sensing signal transmitter 302 to transmit a sensing signal to the sensing signal receiver 303. In this case, both the sensing signal transmitter 302 and the sensing signal receiver 303 are sensing responders. The sensing signal received by the sensing signal receiver 303 includes a direct path signal S1 and a reflected signal S2 reflected by the sensing target 304. In this way, when the sensing target 304 moves, the reflected signal S2 changes, and a superimposed sensing signal received by the sensing signal receiver 303 also changes accordingly. In this case, the sensing signal receiver 303 detects that a channel of a wireless link changes (which is represented as a change of an amplitude and a phase of channel information). Generally, the channel of the wireless link is quantized and represented as channel information in a communication protocol, for example, channel state information (CSI). Further, the sensing initiator 301 may initiate channel sounding on the sensing signal receiver 303 at a specific time interval, and learn, based on a change of CSI reported by the receiver 303, whether the sensing target 304 moves and what specific action the sensing target 304 performs.

It should be understood that the sensing initiator, also referred to as an initiator, is configured to initiate a sensing session to the sensing responder based on a sensing requirement; the sensing signal transmitter (also referred to as a sensing transmitter or transmitter) is configured to transmit a sensing signal; and the sensing signal receiver (also referred to as a sensing receiver or receiver) is configured to receive the sensing signal, obtain a sensing measurement result, and report the sensing measurement result to the sensing initiator. The sensing initiator may be classified into the following two types based on whether the sensing initiator participates in receiving/sending of the sensing signal: an independent sensing initiator and a non-independent sensing initiator. The non-independent sensing initiator refers to a sensing initiator that participates in receiving/sending of the sensing signal. That is, in the sensing session, the sensing initiator further has a function of the sensing transmitter or the sensing receiver. The independent sensing initiator refers to a sensing initiator that does not participate in transmitting the sensing signal. That is, in the sensing session, the sensing initiator does not have a function of the sensing transmitter or the sensing receiver.

4. Channel Sounding Procedure

Figure 4:
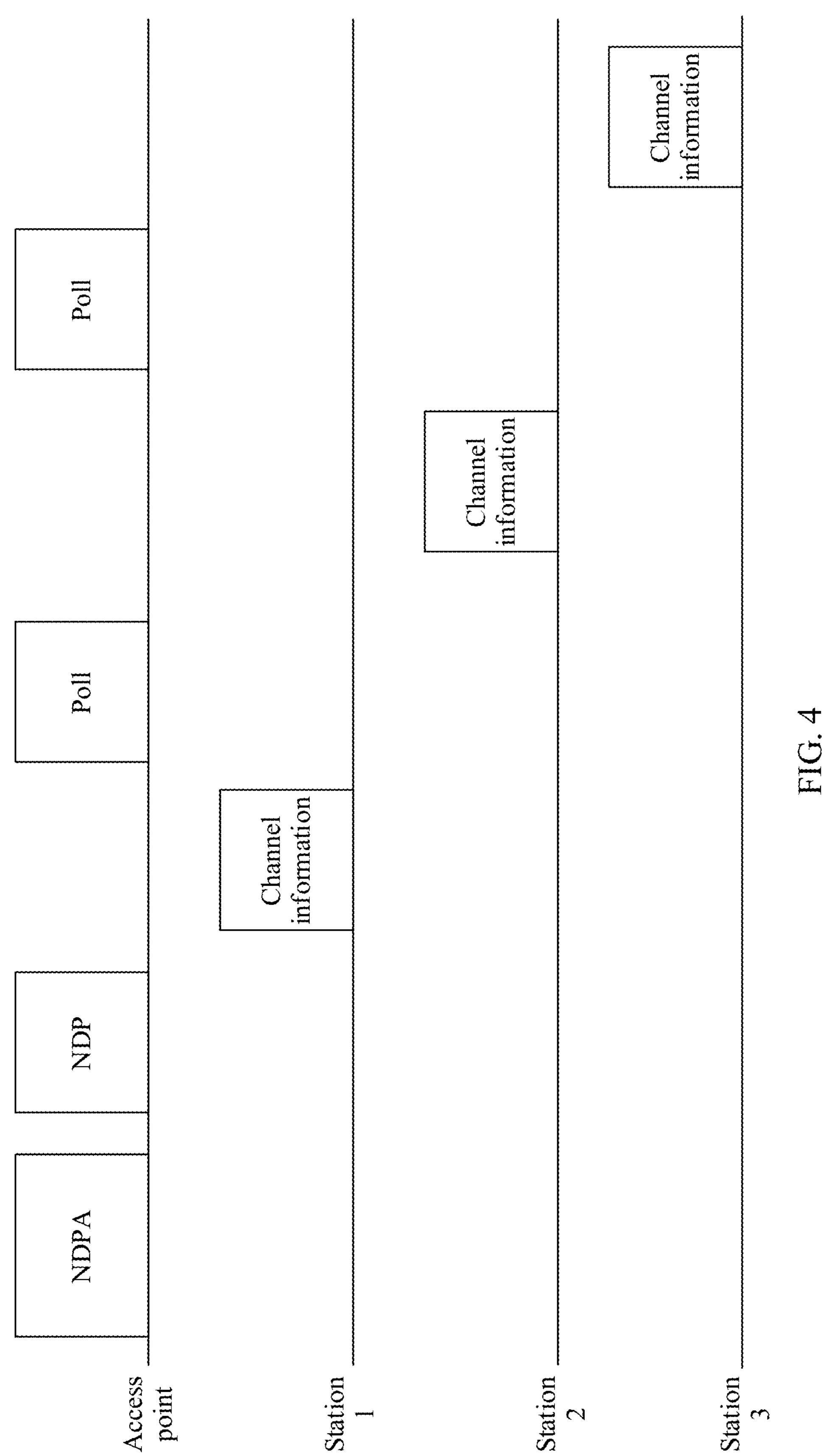
FIG. 4 is a schematic diagram of a channel sounding procedure according to this application.

FIG. 4 shows a solution in which a sensing initiator broadcasts a null data packet (NDP) to enable a plurality of sensing responders to simultaneously perform channel measurement. First, in this solution, the sensing initiator sends a null data packet announcement (NDPA) message to notify the plurality of sensing responders to perform channel measurement. Then, the sensing initiator sends an NDP measurement packet. The plurality of sensing responders simultaneously perform channel measurement. After the sensing responder performs channel measurement, a first sensing responder notified in the NDPA feeds back channel information. In this case, the sensing initiator may select a part of the channel information for feedback, or indicate that a channel does not change in feedback. Then, the sensing initiator sequentially uses a Poll message to request another sensing responder to perform channel information feedback, and the another sensing responder sequentially perform feedback.

5. Sensing Session

Figure 5A:
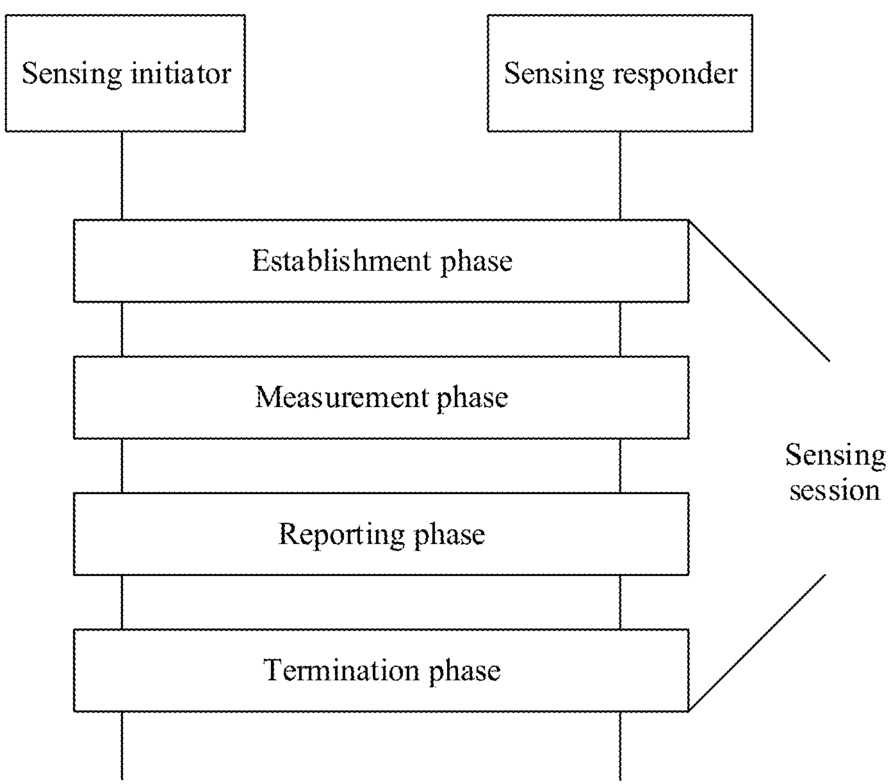
FIG. 5*a* is a schematic diagram of a phase included in a sensing session according to this application.

As shown in FIG. 5*a*, the sensing session usually includes one or more of the following phases: an establishment phase, a measurement phase, a reporting phase, and a termination phase.

5.1 Establishment Phase

In the establishment phase, a sensing initiator establishes a sensing session and determines an operation parameter (for example, a parameter of a sensing transmitter and a parameter of a sensing receiver) associated with the sensing session, and may exchange the parameter with a STA.

5.2 Measurement Phase

In the measurement phase, the sensing transmitter sends a sensing signal to the sensing receiver. After receiving the sensing signal, the sensing receiver performs corresponding processing on the sensing signal to obtain a sensing measurement result. For example, corresponding processing on the sensing signal is channel estimation. In an embodiment, an initiator (e.g., a beamformer) sends an NDP, and the receiver (beamformee) receives the NDP and compares the NDP with original information to obtain CSI information. Because the CSI information includes information such as an arrival time and an angle of the sensing signal, the receiver may further process the CSI information by using a specific algorithm, and extract the information such as the arrival time and the angle of the sensing signal from the CSI information, to obtain the sensing measurement result.

Figure 5B:
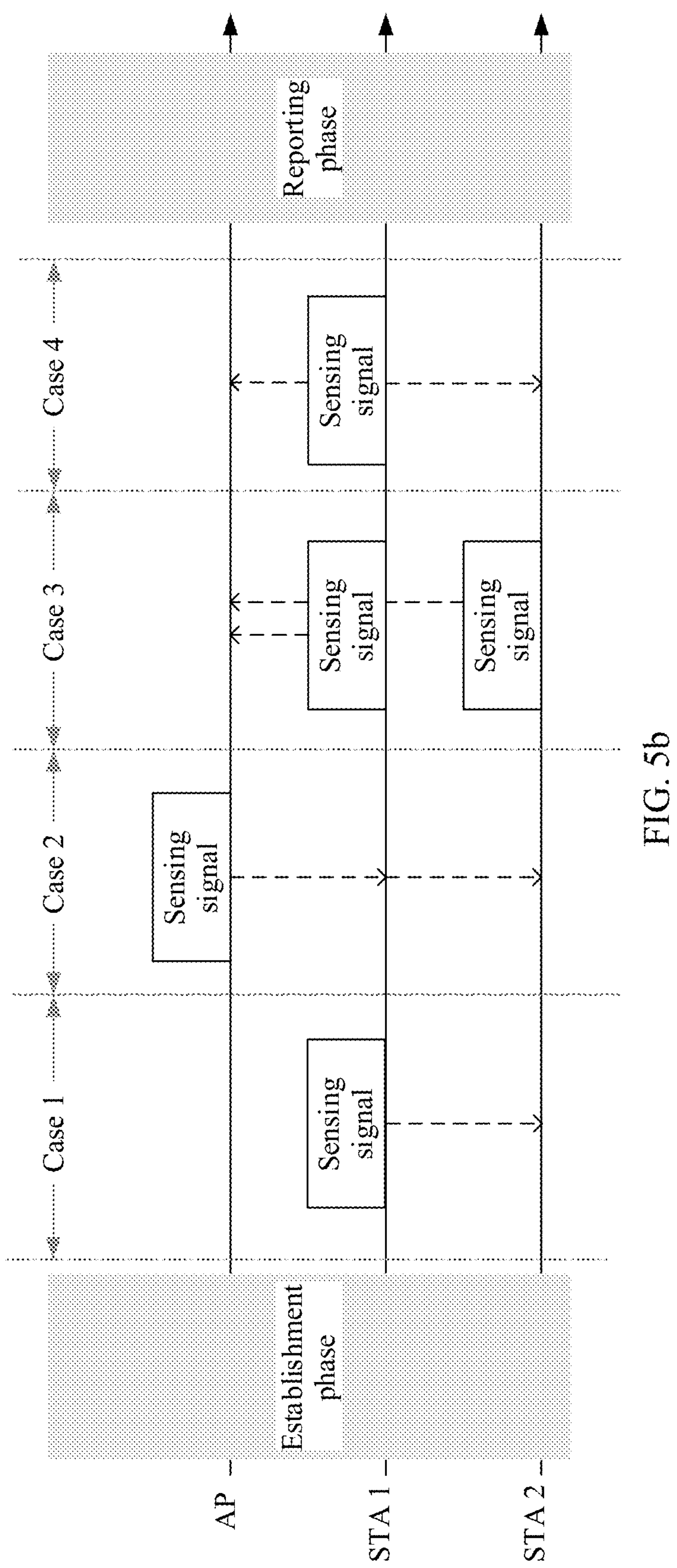
FIG. 5*b* is a schematic diagram of a measurement phase according to this application.

The following describes the measurement phase in detail based on the type of the sensing initiator (an independent initiator or a non-independent initiator). For simplicity, the measurement phase is described by using an example in which an AP serves as an initiator in a sensing session. As shown in FIG. 5*b*, devices participating in the sensing session include the AP, a STA 1, and a STA 2.

When the AP is an independent initiator (that is, the AP does not participate in receiving/sending of a sensing signal), the STA 1 serves as a sensing signal transmitter, and the STA 2 serves as a sensing signal receiver, the measurement phase is shown in case 1 in FIG. 5*b*. The STA 1 sends a sensing signal to the STA 2, and the STA 2 receives the sensing signal and performs measurement.

When the AP is a non-independent initiator (that is, the AP participates in receiving/sending of a sensing signal), the AP is a sensing signal transmitter, and both the STA 1 and the STA 2 are sensing signal receivers, the measurement phase is explicit measurement (that is, the initiator is also a transmitter). As shown in case 2 in FIG. 5*b*, the AP sends a sensing signal to both the STA 1 and the STA 2, and the STA 1 and the STA 2 separately receive the sensing signal and perform measurement.

When the AP is a non-independent initiator (that is, the AP participates in receiving/sending of a sensing signal), only the AP is a sensing signal receiver in the sensing session, and both the STA 1 and the STA 2 are sensing signal transmitters, the measurement phase is implicit measurement (that is, only the initiator is a receiver). As shown in case 3 in FIG. 5*b*, the STA 1 and the STA 2 separately send a sensing signal to the AP, and the AP receives the sensing signal from both the STA 1 and the STA 2 and performs measurement.

When the AP is a non-independent initiator (that is, the AP participates in receiving/sending of a sensing signal), the AP is a sensing signal receiver in the sensing session, the STA 1 is a sensing signal transmitter, and the STA 2 is a sensing signal receiver, the measurement phase is a combination of explicit and implicit measurement (that is, in addition to the case where the initiator is the receiver, there is another receiver in the sensing session). As shown in case 4 in FIG. 5*b*, the STA 1 sends a sensing signal to both the AP and the STA 2, and the AP and the STA 2 separately receive the sensing signal from the STA 1 and perform measurement.

5.3 Reporting Phase

Figure 5C:
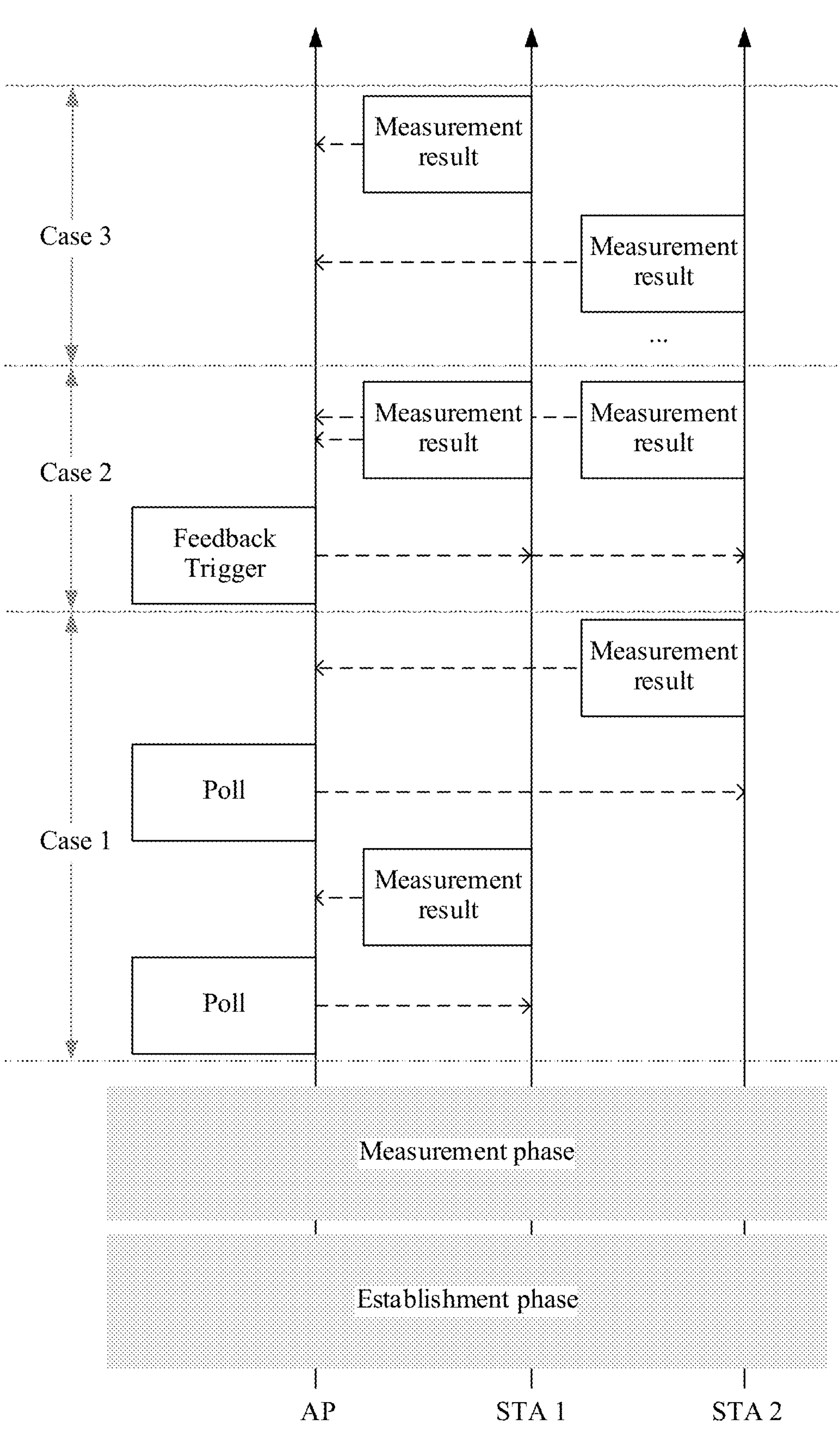
FIG. 5*c* is a schematic diagram of a reporting phase according to this application.

In the reporting phase, the receiver sends the measurement result obtained in the measurement phase to the initiator. As shown in FIG. 5*c*, the manner in which the receiver sends the measurement result to the initiator includes: a polling-based manner (as shown in case 1 in FIG. 5*c*), a scheduling-based manner (as shown in case 2 in FIG. 5*c*), and a contention-based manner (as shown in a case 3 in FIG. 5*c*). It should be learned that, for convenience, in FIG. 5*c*, a case in which the AP is an initiator in the sensing session, the STA 1 is a receiver, and the STA 2 is a receiver is used as an example for description, and should not be considered as a specific limitation on this application.

In the polling-based manner, the initiator sends a Poll frame to the receiver, and the receiver that receives the Poll frame feeds back the measurement result to the transmitter until all the receivers complete feedback. For example, as shown in case 1 in FIG. 5*c*, the AP sends a Poll frame to both the STA 1 and the STA 2, the STA 1 feeds back a measurement result of the STA 1 to the AP based on the Poll frame, and the STA 2 feeds back a measurement result of the STA 2 to the AP based on the Poll frame.

In the scheduling-based manner, the initiator sends a feedback trigger frame to the receiver, and the receiver sends the measurement result of the receiver to the initiator based on the feedback trigger frame. For example, as shown in case 2 in FIG. 5*c*, the AP sends a feedback trigger frame to both the STA 1 and the STA 2, the STA 1 feeds back a measurement result of the STA 1 to the AP based on the feedback trigger frame, and the STA 2 feeds back a measurement result of the STA 2 to the AP based on the feedback trigger frame.

In the contention-based manner, receivers contend with each other, and independently send a measurement result to the initiator based on a channel contention sequence. For example, as shown in case 3 in FIG. 5*c*, the STA 1 and the STA 2 contend for a channel resource, and the STA 2 first obtains the channel resource through contention. In this case, the STA 2 first feeds back a measurement result of the STA 2 to the AP, and then the STA 1 feeds back a measurement result of the STA 1 to the AP.

5.4 Termination Phase

In the termination phase, the STA (which may be understood as a STA participating in the sensing session) stops measurement and terminates the sensing session.

Generally, in a wireless sensing system, a sensing initiator, a sensing responder, a sensing signal transmitter, and a sensing signal receiver are all fixed at a specific location (or may be understood as a stationary device). According to the sensing measurement procedure shown in FIG. 3, when the sensing target is far away from the sensing signal transmitter (or the sensing signal receiver), accuracy of sensing measurement is reduced. In addition, if a small quantity of devices participate in sensing measurement, measurement precision of the sensing target may be reduced because information about the sensing target is not completely obtained. If a large quantity of devices participate in sensing measurement, the sensing initiator needs to poll all sensing signal receivers to obtain all information about the sensing target. As a result, a delay of obtaining information is increased, and further, measurement precision of the sensing target may be reduced.

In this application, the AP manages the devices participating in sensing, so that the devices participating in the sensing session and roles of the devices in the sensing session can be flexibly determined. This avoids a case in which there are a large quantity or a small quantity of devices participating in the sensing session, and may also avoid a case in which a device that is far away from the sensing target is determined as the sensing transmitter (or the sensing receiver). In this way, a delay of obtaining information is reduced and measurement precision of the sensing target is improved.

The following further describes a sensing session establishment method and a communication apparatus provided in this application with reference to the accompanying drawings.

Figure 6A:
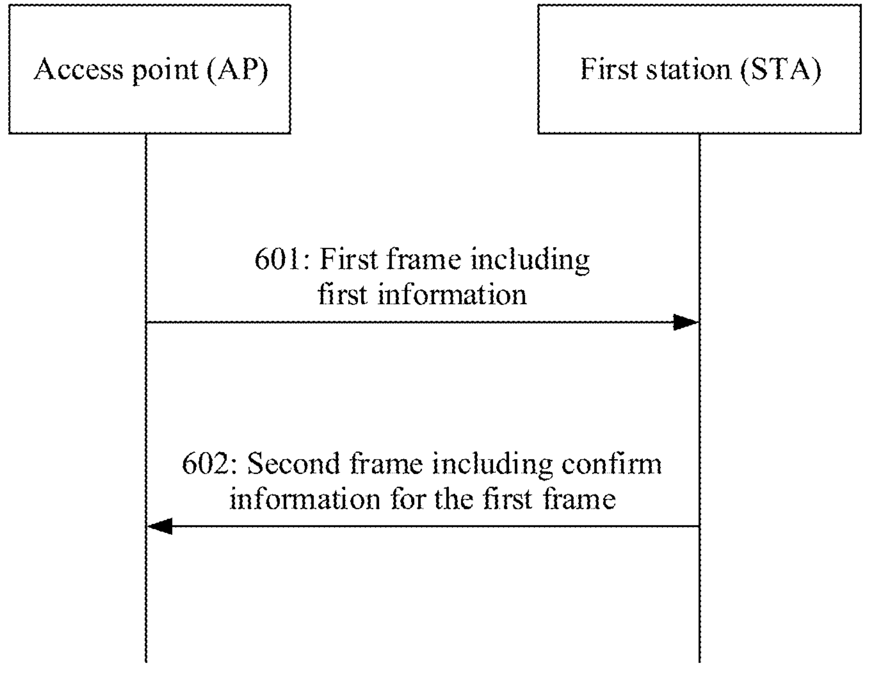
FIG. 6*a* is a flowchart of a sensing session establishment method according to this application.

FIG. 6*a* is a schematic flowchart of a sensing session establishment method according to an embodiment of this application. As shown in FIG. 6*a*, the sensing session establishment method includes operation 601 and operation 602. The method shown in FIG. 6*a* may be performed by an AP and a STA. Alternatively, the method shown in FIG. 6*a* may be performed by a chip in an AP and a chip in a STA. In FIG. 6*a*, an example in which the method is performed by the AP and the STA is used for description.

In operation 601: the AP sends a first frame to a first STA, where the first frame includes first information, and the first information indicates a first role of the first STA in a sensing session. The first role of the first STA in the sensing session is a transmitter and/or a receiver. The first STA is a STA participating in the sensing session in a second STA associated with the AP.

In other words, the second STA is a STA associated with the AP, that is, the STA is within a signal range of the AP and has a communication connection to the AP. The first STA is a STA participating in the sensing session in the second STA, and the first STA may be a part of second STAs, or may be all of second STAs. This is not specifically limited in this application. The AP sends the first frame to the first STA, to allocate a role of the first STA in the sensing session to the first STA.

For example, a STA 1, a STA 2, and a STA 3 are STAs (that is, the second STAs) associated with the AP, and the STAs (that is, the first STAs) participating in the sensing session are the STA 1 and the STA 2. In this case, the AP sends the first frame to the STA 1, and the first frame indicates that a role of the STA 1 in the sensing session is a transmitter and a receiver. The AP and the STA 2 send a first frame, where the first frame indicates that a role of the STA 2 in the sensing session is a receiver.

In an embodiment, the first frame further includes a first sensing parameter, and the first sensing parameter is used by the first STA to perform sensing measurement and/or sensing data reporting in the sensing session. The first sensing parameter includes but is not limited to one or more of the following parameters: an operation parameter, a feedback type, a sensing type, or a feedback address. The feedback address may be understood as indicating a device to which the STA feeds back a sensing report. The feedback type indicates a specific sensing report type used by the STA to provide feedback. The feedback type includes but is not limited to: CSI, compressed CSI, or measurement result information (speed information, angle information, distance information, or the like). The operation parameter indicates information such as a speed, duration, or an angle at which the STA receives/sends a data packet.

In other words, when allocating the first role participating in the sensing session to each STA participating in the sensing session, the AP further allocates the first sensing parameter corresponding to the first role to the STA, so that the STA can participate in the sensing session by using the first role and the first sensing parameter.

For example, the STA 1 is a STA associated with the AP and participating in a sensing session, and the AP sends a first frame to the STA 1. First information in the first frame includes: a first role (that is, a receiver), a first sensing parameter (that is, 10 data packets are received within 1 ms), a feedback type (that is, CSI), and a feedback address (that is, a MAC address of the AP). That is, the AP indicates to the STA 1 by using the first frame, where the STA 1 is a receiver in the sensing session, a receiving speed of the STA 1 in a sensing measurement phase is receiving 10 data packets every 1 ms, and the STA 1 feeds back CSI to the AP in a sensing report phase.

For this scenario, the following separately describes in detail frame structures of the first frame.

Structure 1: The first frame includes a common information field and a user information field, and the first information is located in the common information field and/or the user information field.

In this case, the common information field is used to configure the same configuration content of the STAs participating in the sensing session, and may be understood as configuration information shared by the STAs participating in the sensing session in the first information, that is, common parameter information. User information fields are in a one-to-one correspondence with the STAs participating in the sensing session, and the user information field is used to configure the configuration content specific to the STAs participating in the sensing session, and may be understood as parameter information specific to the STAs participating in the sensing session in the first information, that is, parameter information other than the common parameter information in the first information.

For example, in a sensing session, the AP requests the STA 1 to participate in the sensing session by using a first role including both a receiver and a transmitter, and requests the STA 2 to participate in the sensing session by using a first role including a receiver. First information corresponding to the STA 1 includes: A feedback address is an AP, a feedback type is CSI, a first role is a receiver and a transmitter, and an operation parameter is that the STA 1 sends 10 data packets every 1 ms when serving as a transmitter, and receives 10 data packets every 1 ms when serving as a receiver. First information corresponding to the STA 2 includes: A feedback address is an AP, a feedback type is CSI, a first role is a receiver, and an operation parameter is receiving 10 data packets every 1 ms. In this case, the AP sends the first frame to the STA 1 and the STA 2. The common information field in the frame includes that the feedback address is the AP and the feedback type is the CSI in the first information (that is, a part of configuration information shared by the STA 1 and the STA 2 in the first information). The user information field corresponding to the STA 1 in the frame includes a part of first information specific to the STA 1: The first role is a receiver and a transmitter, and the operation parameter is that the STA 1 sends 10 data packets every 1 ms when serving as a transmitter, and receives 10 data packets every 1 ms when serving as a receiver. The user information field corresponding to the STA 2 in the frame includes a part of first information specific to the STA 2: The first role is a receiver, and the operation parameter is receiving 10 data packets every 1 ms.

Figures 1, 6B:
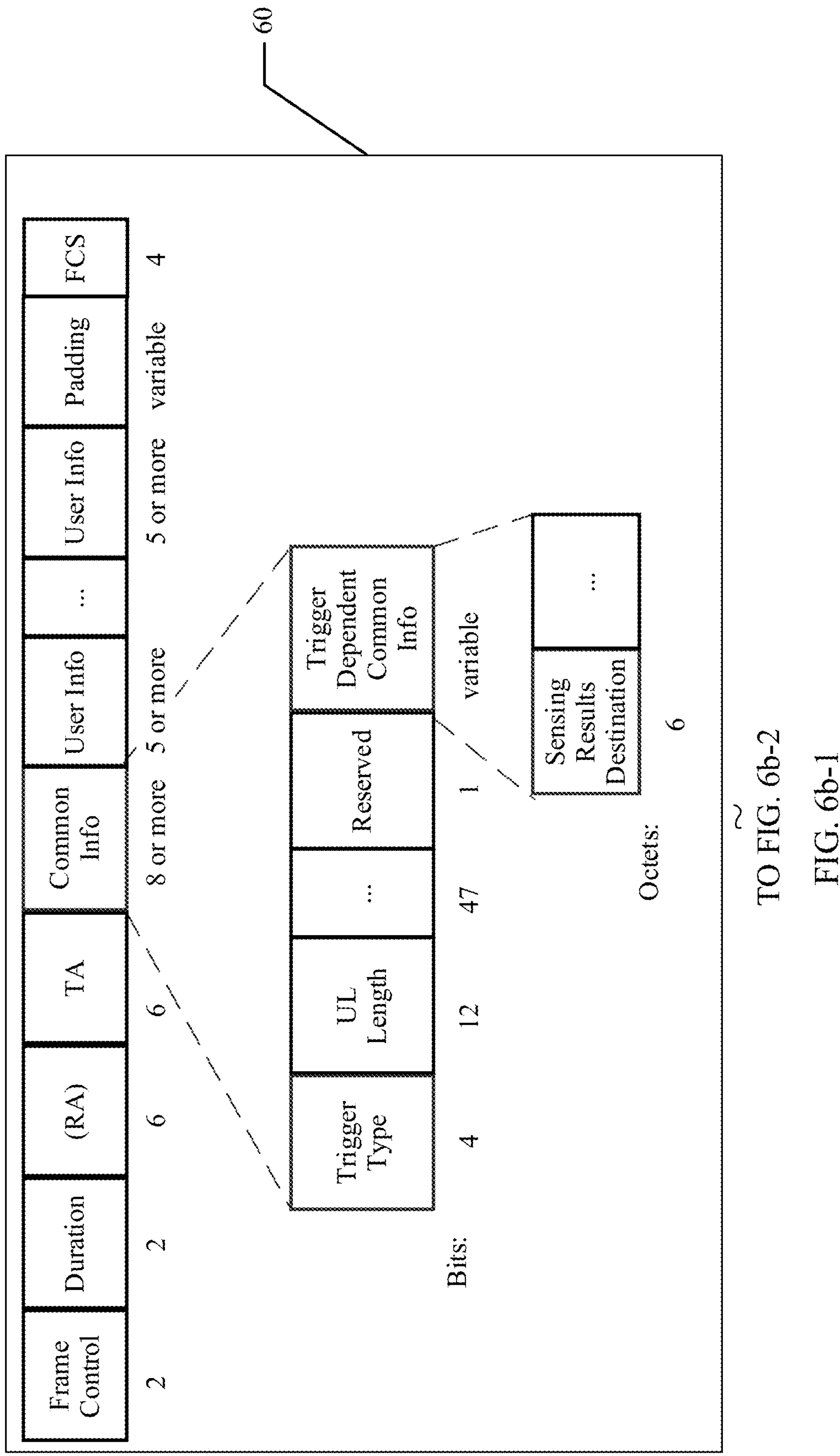

For example, FIG. 6b-1 and FIG. 6b-2 are a schematic diagram of a frame structure according to this application. The first frame is a trigger (Trigger) frame, and the Trigger frame includes a common information (Common Info) field and a user information (User Info) field. The following describes in detail the Common Info field and the User Info field of the first frame.

1. Common Info Field

FIG. 6b-1 and FIG. 6b-2 are a schematic diagram of an expanded structure of the Common Info field of the first frame shown by a module 60. The Common Info field includes a trigger type (Trigger Type) subfield and a trigger dependent common information (Trigger Dependent Common Info) subfield.

1.1 Trigger Type Subfield

The Trigger Type subfield indicates a function type of the Trigger frame. For example, when a value of the Trigger Type subfield is 9, it indicates that the Trigger frame is used to trigger a sensing (Sensing) operation.

1.2 Trigger Dependent Common Info Subfield

The Trigger Dependent Common Info subfield is used to configure common parameter information in the first information. For example, the Trigger Dependent Common Info subfield in FIG. 6b-1 and FIG. 6b-2 includes a sensing result destination (Sensing Results Destination field) subfield, and the Sensing Results Destination field is used to notify all receivers of MAC addresses of target devices (that is, devices receiving the feedback results) when the receivers feed back the measurement results.

2. User Info Field

FIG. 6b-1 and FIG. 6b-2 are a schematic diagram of an expanded structure of the User Info field of the first frame shown by a module 61. The User Info field includes a trigger dependent user info subfield. The Trigger Dependent User Info subfield is used to configure specific first information (which may be understood as parameter information other than the common parameter information of the STA) corresponding to the STA in the first information. The Trigger Dependent User Info subfield may include a sensing request info subfield and a sensing type subfield.

2.1 Sensing Request Info Subfield

The Sensing Request Info subfield includes a sensing role indication subfield and a sensing feedback type subfield.

The Sensing Roles Indication subfield indicates a role function. For example, the Sensing Roles Indication subfield includes two bits. When a value of the two bits is 00, it indicates that a role is a receiver (or may be a transmitter); when a value of the two bits is 01, it indicates that a role is a transmitter (or may be a receiver); or when a value of the two bits is 10, it indicates that a role is both a receiver and a transmitter (self-sending and self-receiving).

The Sensing Feedback Type subfield indicates that the feedback type is CSI, compressed CSI, a final result, or the like to feed back a result. 0 indicates original CSI feedback; 1 indicates compressed CSI feedback; 2 indicates final result speed information; 3 indicates final result angle information; 4 indicates final result distance information; and the like.

2.2 Sensing Type Subfield

The Sensing Type subfield indicates a data sending type (which may be understood as the foregoing operation parameter). For example, the Sensing Type subfield indicates two data sending types: a burst-based type or a continuous sending-based type. For the burst-based type (that is, Type 1 of the Sensing Type subfield shown by the module 61 in FIG. 6*b*-1 and FIG. 6*b*-2), the Sensing Type subfield includes a pattern subfield, a group measurement duration (Group measurement duration) subfield, a number of group subfield, and an interval between group subfield. It can be learned that, in the burst-based type, the Sensing Type subfield indicates sending duration, a quantity of sending times in a group, and an interval between groups. For the continuous sending-based type (that is, Type 2 of the Sensing Type subfield shown by the module 61 in FIG. 6*b*-1 and FIG. 6*b*-2), the Sensing Type subfield includes a value of a pattern subfield, a measurement duration subfield, and a number (Number) subfield. In the continuous sending-based type, the Sensing Type subfield indicates information such as total sending duration, a total quantity of sent data packets, and a packet/beam sending period/interval.

For example, in the burst-based type, the Sensing Type subfield includes a pattern subfield, a group measurement duration (Group measurement duration) subfield, a number of group subfield, and an interval between group (Interval between Group) subfield. The pattern subfield indicates a frequency pattern for sending data based on a burst. For example, when a field value of the pattern subfield is 0, it indicates that sending is performed at a low frequency. When a field value of the pattern subfield is 1, it indicates that sending is performed at a high frequency. The group measurement duration (Group measurement duration) subfield indicates sending duration of a single packet group. The number of group (Number of Group) subfield indicates a quantity of sent NDPs in a single packet group. The interval between group (Interval between Group) subfield indicates an interval between packet groups.

Structure 2: The first frame includes a station information field, and the first information is located in the station information field.

Figure 6C:
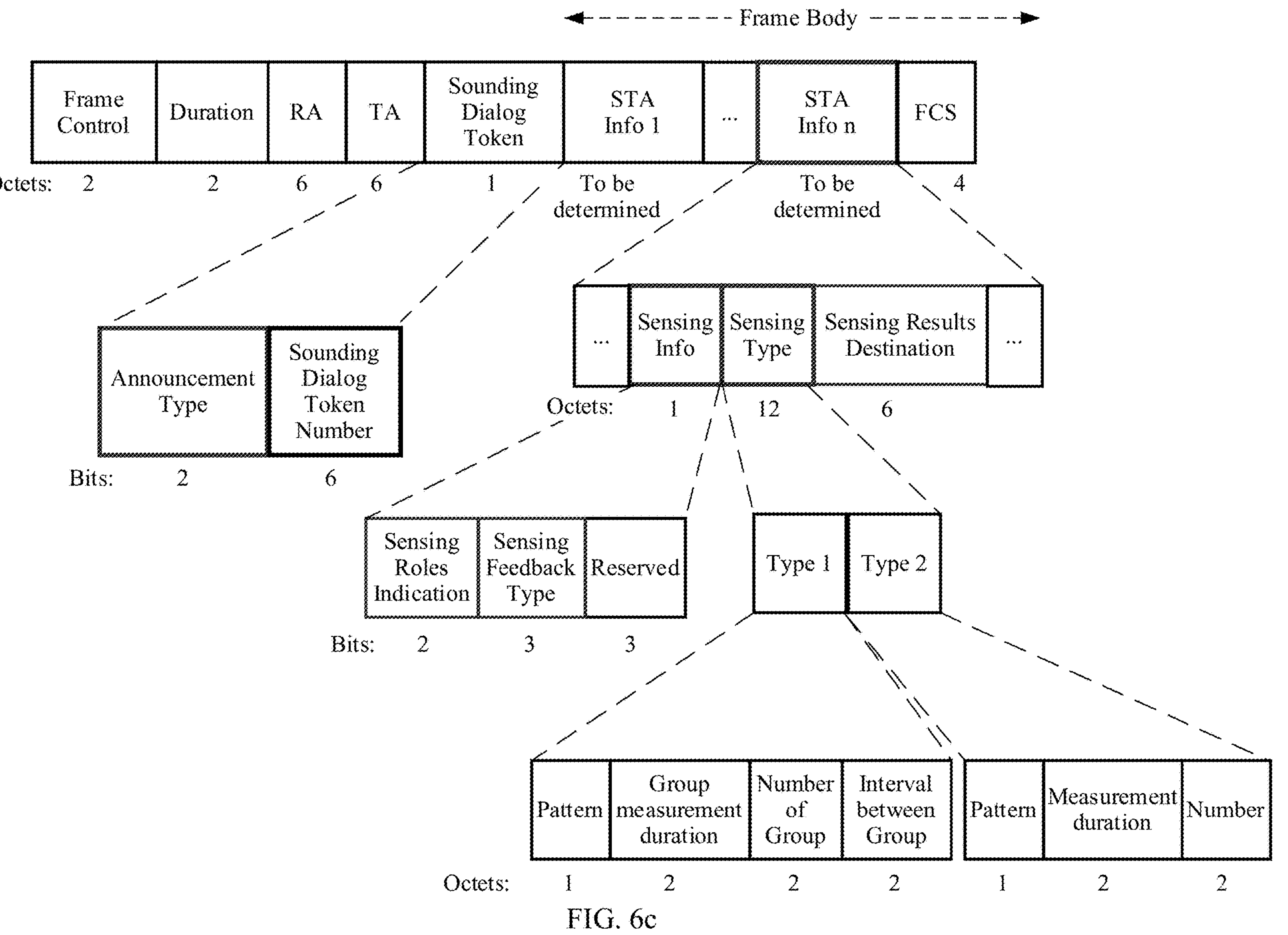
FIG. 6*c* is a schematic diagram of another frame structure according to this application.

For example, FIG. 6*c* is a schematic diagram of another frame structure of the first frame according to this application. The first frame is an announce frame, and the Announce frame includes a station information (STA Info) subfield and a sounding dialog token subfield.

1. Sounding Dialog Token Subfield

The Sounding Dialog Token subfield includes an announcement type indication subfield, and the Announcement Type subfield indicates an announcement type of the announce frame. The announcement type includes: a very high throughput (VHT), high efficiency (HE), ranging (Ranging), and an extremely high throughput (EHT).

For example, the Announcement Type subfield includes two bits, and the Announcement Type subfield indicates the announcement type of the announce frame based on values of the two bits. As shown in Table 1, Table 1 shows a correspondence between a field value of the Announcement Type and the announcement type. When the Announcement Type subfield is set to 00, it indicates that the frame is a VHT announce frame. When the Announcement Type subfield is set to 01, it indicates that the frame is an HE announce frame. When the Announcement Type subfield is set to 10, it indicates that the frame is a Ranging announce frame. When the Announcement Type subfield is set to 11, it indicates that the frame is an EHT announce frame. It should be learned that the Sensing announce frame may be represented by reusing a VHT/HE or the like.

TABLE 1

| Announcement Type field value (field value) | Announce frame type |
|---|---|
| 00 | VHT |
| 01 | HE (Sensing) |
| 10 | Ranging |
| 11 | EHT |

2. Station Information (STA Info) Subfield

The first frame includes a plurality of STA Info subfields, that is, a STA Info 1 subfield to a STA Info n subfield shown in FIG. 6*c*. STA Info subfields are in a one-to-one correspondence with the STAs. The following uses the STA Info n subfield as an example for description. The STA Info n subfield includes a sensing info subfield, a sensing type (Sensing Type) subfield, and a sensing result destination (Sensing Results Destination) subfield.

2.1 Sensing Results Destination Subfield

The Sensing Results Destination subfield is used to notify the receiver of a MAC address of a destination terminal (that is, a device receiving the measurement result) that feeds back the measurement result.

2.2 Sensing Type Subfield

The Sensing Type subfield indicates a data sending type. The data sending type includes a burst-based type or a continuous sending-based type. For the burst-based type, the Sensing Type subfield includes a pattern subfield, a group measurement duration subfield, a number of group subfield, and an interval between group subfield. It can be learned that, in the burst-based type, the Sensing Type subfield indicates sending duration, a quantity of sending times in a group, and an interval between groups. For the continuous sending-based type, the Sensing Type subfield includes a value of a pattern subfield, a measurement duration subfield, and a number subfield. In the continuous sending-based type, the Sensing Type subfield indicates information such as total sending duration, a total quantity of sent data packets, and a packet/beam sending period/interval.

For example, in the burst-based type, the Sensing Type subfield includes a pattern subfield, a group measurement duration subfield, a number of group subfield, and an interval between group (Interval between Group) subfield. The pattern subfield indicates a frequency pattern for sending data based on a burst. For example, when a field value of the pattern subfield is 0, it indicates that sending is performed at a low frequency. When a field value of the pattern subfield is 1, it indicates that sending is performed at a high frequency. The group measurement duration subfield indicates sending duration of a single packet group. The number of group subfield indicates a quantity of sent NDPs in a single packet group. The interval between group subfield indicates an interval between packet groups.

2.3 Sensing Feedback Type Subfield

The Sensing Feedback Type subfield is used to configure a type of a measurement result fed back by the device. The type of feeding back the measurement result includes but is not limited to: CSI feedback, compressed CSI feedback, final result feedback (speed information, angle information, distance information, or the like), or the like.

For example, when a field value of the Sensing Feedback Type subfield is 0, it indicates that the CSI is fed back; when a field value of the Sensing Feedback Type subfield is 1, it indicates that the compressed CSI is fed back; when a field value of the Sensing Feedback Type subfield is 2, it indicates that the final result speed information is fed back; when a field value of the Sensing Feedback Type subfield is 3, it indicates that the final result angle information is fed back;

or when a field value of the Sensing Feedback Type subfield is 4, it indicates that the final result distance information is fed back, and the like.

Structure 3: The first frame includes a common information field and a station information field, and the first information is located in the common information field and/or the station information field.

In this case, the common information field is used to configure the same configuration content of the STAs participating in the sensing session, and may be understood as configuration information shared by the STAs participating in the sensing session in the first information, that is, common parameter information. Station information fields are in a one-to-one correspondence with the STAs participating in the sensing session, and the station information field is used to configure the configuration content specific to the STAs participating in the sensing session, and may be understood as parameter information specific to the STAs participating in the sensing session in the first information, that is, parameter information other than the common parameter information in the first information.

Figure 6D:
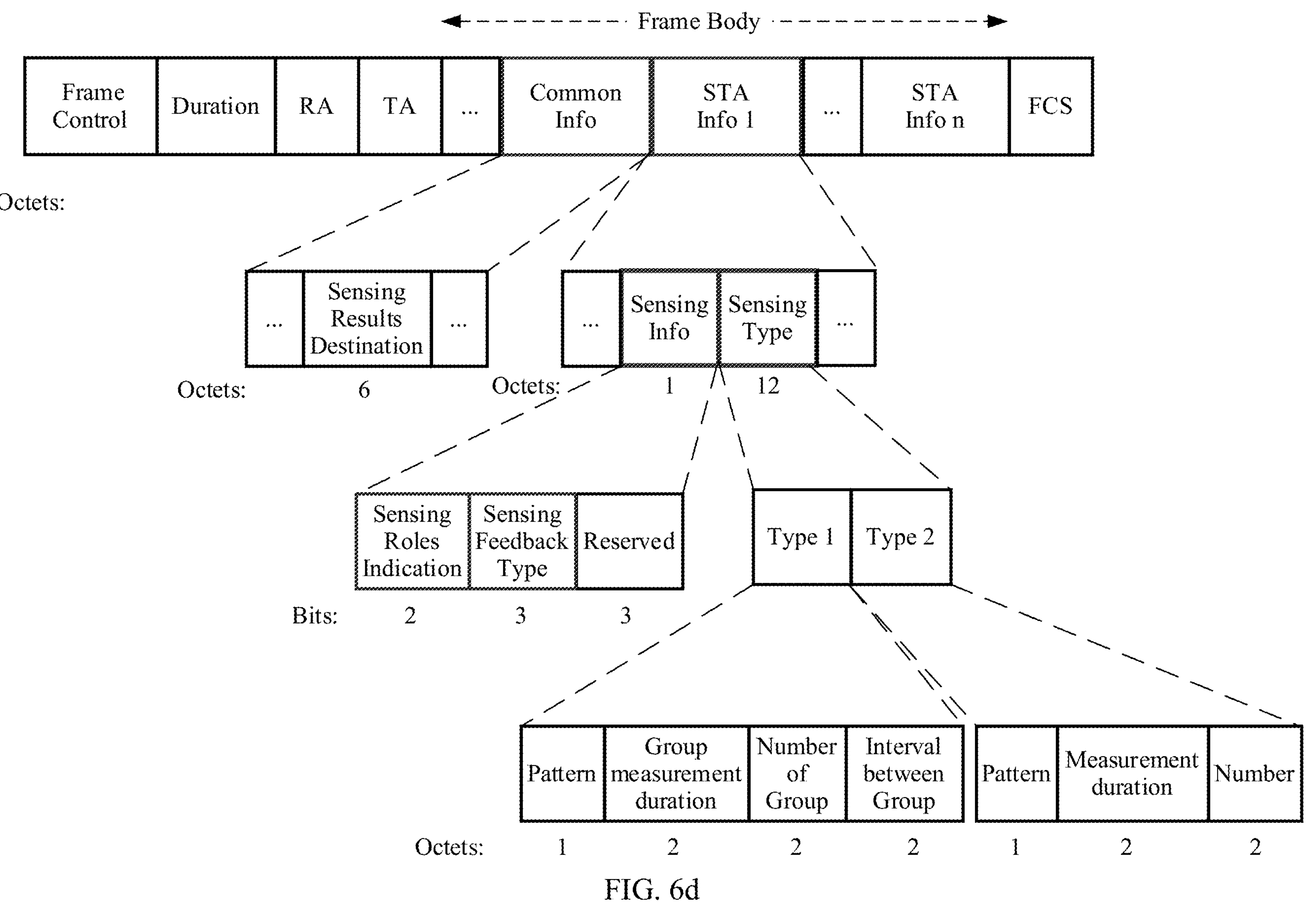
FIG. 6*d* is a schematic diagram of still another frame structure according to this application.

For example, FIG. 6*d* is a schematic diagram of still another frame structure of the first frame according to this application. The first frame is a sensing announcement frame, and the Sensing Announcement frame includes a common info field and a station information (STA Info) field. The following describes in detail the Common Info field and the STA Info field of the first frame.

1. Common Info Field

The Common Info field includes a Sensing Results Destination subfield, and the Sensing Results Destination subfield is used to notify the receiver to send a measurement result (for example, CSI or compressed CSI) to a terminal device corresponding to the MAC address.

2. STA Info Field

The first frame includes a plurality of STA Info subfields, that is, a STA Info 1 subfield to a STA Info n subfield shown in FIG. 6*d*. STA Info subfields are in a one-to-one correspondence with the STAs. Each STA Info subfield includes a sensing info subfield and a sensing type subfield.

2.1 Sensing Info Subfield

The Sensing Info subfield includes a sensing role indication subfield and a sensing feedback type subfield.

The Sensing Role Indication subfield is used to configure a role of the STA participating in the sensing session. For example, the Sensing Roles Indication subfield includes two bits. When a value of the two bits is 00, it indicates that the role is a receiver (or may be a transmitter); when a value of the two bits is 01, it indicates that the role is a transmitter (or may be a receiver); or when a value of the two bits is 10, it indicates that the role is both a receiver and a transmitter (self-sending and self-receiving).

The Sensing Feedback Type subfield is used to configure a type of a measurement result fed back by the device. The type of feeding back the measurement result includes but is not limited to: CSI feedback, compressed CSI feedback, final result feedback (speed information, angle information, distance information, or the like), or the like.

2.2 Sensing Type Subfield

The Sensing Type subfield indicates a data sending type (which may be understood as the foregoing operation parameter). The data sending type includes a burst-based type or a continuous sending-based type. For the burst-based type, the Sensing Type subfield includes a pattern subfield, a group measurement duration subfield, a number of group subfield, and an interval between group subfield. It can be learned that, in the burst-based type, the Sensing Type subfield indicates sending duration, a quantity of sending times in a group, and an interval between groups. For the continuous sending-based type, the Sensing Type subfield includes a value of a pattern subfield, a measurement duration subfield, and a number subfield. In the continuous sending-based type, the Sensing Type subfield indicates information such as total sending duration, a total quantity of sent data packets, and a packet/beam sending period/interval.

For example, in the burst-based type, the Sensing Type subfield includes a pattern (pattern) subfield, a group measurement duration subfield, a number of group subfield, and an interval between group subfield. The pattern subfield indicates a frequency pattern for sending data based on a burst. For example, when a field value of the pattern subfield is 0, it indicates that sending is performed at a low frequency. When a field value of the pattern subfield is 1, it indicates that sending is performed at a high frequency. The group measurement duration subfield indicates sending duration of a single packet group. The number of group subfield indicates a quantity of sent NDPs in a single packet group. The interval between group subfield indicates an interval between packet groups.

Structure 4: The first frame includes a sensing request element field, and the first information is located in the sensing request element field.

Figure 6E:
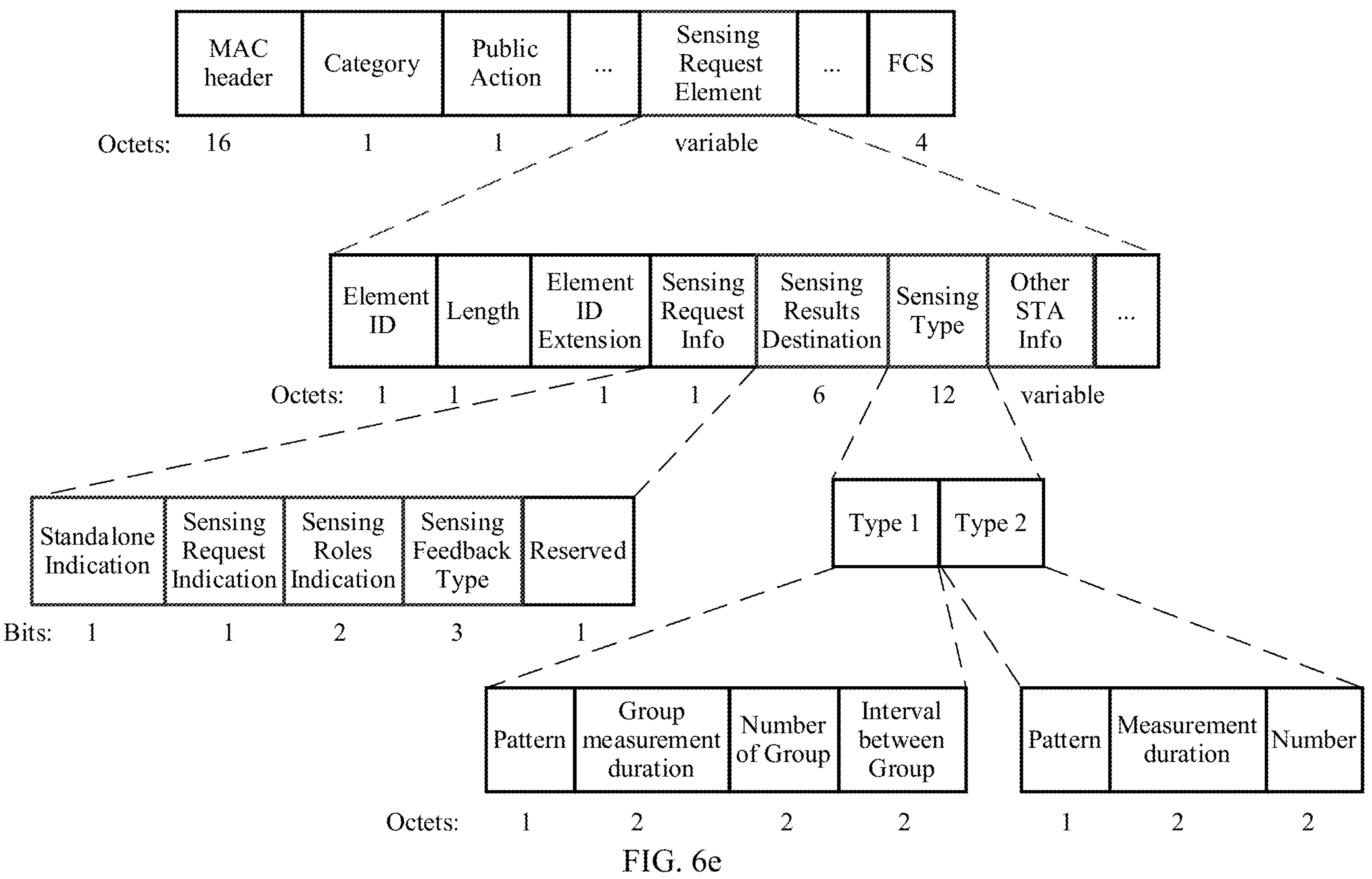
FIG. 6*e* is a schematic diagram of still another frame structure according to this application.

For example, FIG. 6*e* is a schematic diagram of a structure of the first frame according to this application. The first frame is a sensing request frame, the sensing request (Sensing Request) frame includes a sensing request element field, and the first information is located in the Sensing Request Element field.

In an embodiment, the sensing request element field includes a sensing request info subfield, a sensing type subfield, and a sensing result destination subfield.

1. Sensing Request Info Subfield

The Sensing Request Info subfield includes a standalone indication subfield, a sensing request indication subfield, a sensing role indication subfield, and a sensing feedback type subfield.

1.1 Standalone Indication Subfield

It should be stated that, when a device (for example, a STA) receiving the first frame is a sensing initiator, the first frame includes the Standalone Indication subfield. The Standalone Indication subfield indicates whether the initiator participates in receiving/sending of the sensing signal. For example, when a field value of the Standalone Indication subfield is 1, it indicates that the initiator participates in receiving/sending of the sensing signal; or when a field value of the Standalone Indication subfield is 0, it indicates that the initiator does not participate in receiving/sending of the sensing signal.

1.2 Sensing Request Indication Subfield

The Sensing Request Indication subfield is used to request the STA to feed back whether the STA is willing to participate in the sensing session. For example, when a field value of the Sensing Request Indication subfield is 1, it indicates that the STA is requested to feed back whether the STA is willing to participate in the sensing session. For example, Table 2 shows a correspondence between a field value of the Sensing Request Indication subfield and indication information.

TABLE 2

| Field value of the Sensing Request Indication | Indication information |
|---|---|
| 1 | Request the STA to participate in the sensing session |
| 0 | Reserved field |

It should be learned that, when the STA receiving the first frame has confirmed to participate in the sensing session, the sensing request information subfield may not include the sensing request indication subfield. For example, when the AP considers (or learns) that the STA 1 participates in the sensing session by default, and the AP needs only to allocate a sensing parameter or a role to the STA 1, the first frame sent by the AP to the STA 1 may not include the sensing request indication subfield requesting the STA 1 to participate in the sensing session.

1.3 Sensing Role Indication Subfield

The Sensing Role Indication subfield indicates a role of the STA participating in the sensing session. The role in the sensing session includes but is not limited to an initiator (transmitter) and a receiver. For example, Table 3 shows a correspondence between a field value of the Sensing Roles Indication subfield and indication information.

TABLE 3

| Field value of the Sensing Role Indication | Indication information |
|---|---|
| 00 | Transmitter |
| 01 | Receiver |
| 10 | Transmitter and receiver |
| 11 | Reserved field |

The Sensing Roles Indication subfield includes two bits. When a value of the two bits is 00, it indicates that the role is a receiver (or may be a transmitter); when a value of the two bits is 01, it indicates that the role is a transmitter (or may be a receiver); or when a value of the two bits is 10, it indicates that the role is both a receiver and a transmitter (self-sending and self-receiving).

It should be learned that, when the device (for example, the STA) receiving the first frame is a sensing initiator, or when the role of the device (for example, the STA) receiving the first frame in the sensing session is learned by default (or by default), the first frame may not include the Sensing Role Indication subfield.

1.4 Sensing Feedback Type Subfield

The Sensing Feedback Type subfield is used to configure a type of a measurement result fed back (or referred to as reported) by the STA. The type of feeding back the measurement result includes but is not limited to: a CSI feedback manner, a compressed CSI feedback manner, or a final sensing measurement result (for example, information such as a speed, an angle, or a distance) feedback manner.

For example, when a field value of the Sensing Feedback Type subfield is 0, it indicates that the type of the measurement result reported by the STA is CSI feedback; when a field value of the Sensing Feedback Type subfield is 1, it indicates that the type of the measurement result reported by the STA is compressed CSI feedback; when a field value of the Sensing Feedback Type subfield is 2, it indicates that the type of the measurement result reported by the STA is final result speed information feedback; when a field value of the Sensing Feedback Type subfield is 3, it indicates that the type of the measurement result reported by the STA is final result angle information feedback; or when a field value of the Sensing Feedback Type subfield is 4, it indicates that the type of the measurement result reported by the STA is final result distance information feedback.

It should be learned that, when the receiver is an initiator (that is, may be understood as a device receiving the measurement result), the first frame received by the receiver does not include the sensing feedback type subfield; or when the AP considers by default that the STA serving as the receiver already learns the type of the measurement result fed back (or when the type of the measurement result fed back is a default type), the first frame received by the receiver does not include the sensing feedback type subfield.

In an optional case, if the STA receiving the first frame is an initiator in the sensing session, the sensing request info subfield of the first frame may further include a standalone indication subfield. The Standalone Indication subfield is used to request the STA to feed back whether the STA participates in receiving/sending of the sensing signal (that is, whether the STA further participates in the sensing session as a receiver and/or a transmitter).

2. Sensing Type Subfield

The Sensing Type subfield indicates a data sending type (which may be understood as the foregoing operation parameter), and the data sending type includes a burst-based type or a continuous sending-based type. For the burst-based type, the Sensing Type subfield includes a pattern subfield, a group measurement duration subfield, a number of group subfield, and an interval between group subfield. It can be learned that, in the burst-based type, the Sensing Type subfield indicates sending duration, a quantity of sending times in a group, and an interval between groups. For the continuous sending-based type, the Sensing Type subfield includes a value of a pattern subfield, a measurement duration subfield, and a number subfield. In the continuous sending-based type, the Sensing Type subfield indicates information such as total sending duration, a total quantity of sent data packets, and a packet/beam sending period/interval.

For example, in the burst-based type, the Sensing Type subfield includes a pattern subfield, a group measurement duration subfield, a number of group subfield, and an interval between group subfield. The pattern subfield indicates a frequency pattern for sending data based on a burst. For example, when a field value of the pattern subfield is 0, it indicates that sending is performed at a low frequency. When a field value of the pattern subfield is 1, it indicates that sending is performed at a high frequency. The group measurement duration subfield indicates sending duration of a single packet group. The number of group subfield indicates a quantity of sent NDPs in a single packet group. The interval between group subfield indicates an interval between packet groups.

It should be learned that, when the receiver is an initiator (that is, may be understood as a device receiving the measurement result), the first frame received by the receiver may not include the sensing type subfield; or when the AP considers by default that the STA serving as the receiver already learns the data sending type (or understood that the data sending type is a default type), the first frame received by the receiver may not include the sensing type (Sensing Type) subfield.

3. Sensing Result Destination Subfield

The Sensing Results Destination subfield is used to notify all receivers of MAC addresses of target devices (that is, devices receiving feedback results) when the receivers feed back the measurement results.

It should be noted that, when the device (such as the STA) receiving the first frame is the initiator or already learns the destination MAC address for feeding back the measurement result, the first frame may not include the Sensing Results Destination subfield.

In operation 602: the AP receives a second frame from the first STA, where the second frame includes confirm information for the first frame.

After the AP sends the first frame to the first STA, the first STA sends the second frame to the AP. The second frame includes the confirm information for the first frame.

In an embodiment, the second frame includes a confirm element field, and the confirm information is located in the confirm element field.

The following describes the frame structure of the second frame in detail based on the frame structure of the first frame in operation 601.

Structure 1: For the first frame described in structure 1, structure 2, and structure 3 in 601, the second frame includes a confirm element field, and the confirm information for the first frame is located in the confirm element field.

Figure 6F:
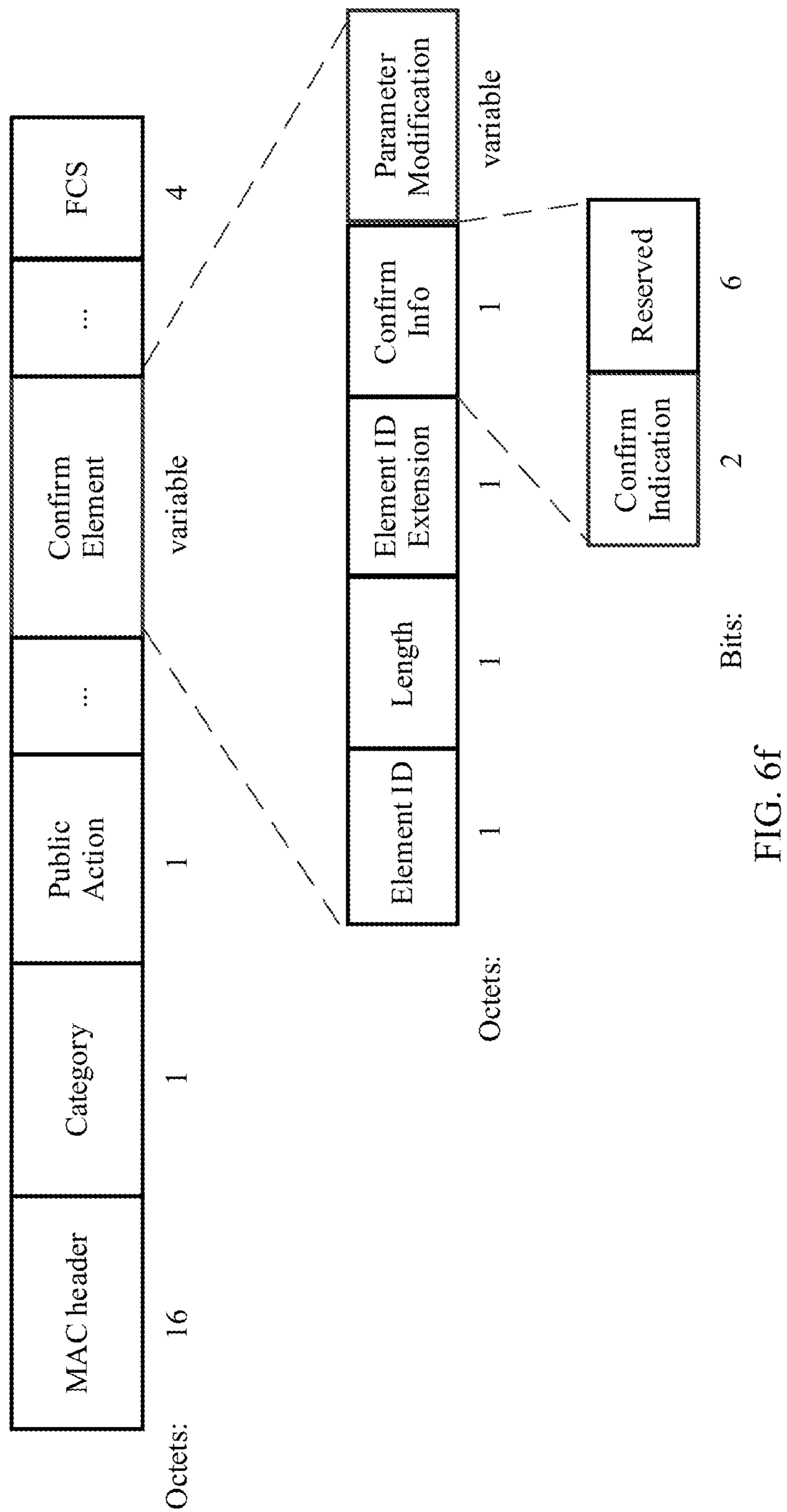
FIG. 6*f* is a schematic diagram of still another frame structure according to this application.

For example, FIG. 6*f* is a schematic diagram of a frame structure of the second frame according to this application. The second frame is a confirm frame, the Confirm frame includes a confirm element field, and the confirm information is configured in the Confirm Element field. In an embodiment, the Confirm Element field may include a confirm information (Confirm Info) subfield and a parameter modification subfield.

1. Confirm Indication Subfield

A value of the confirm indication subfield indicates whether the STA agrees to participate in the sensing session. For example, when a field value of the Confirm Indication subfield is 0, it indicates that the STA does not agree to participate in the sensing session; when a field value of the Confirm Indication subfield is 1, it indicates that the STA agrees to participate in the sensing session, and accepts a first sensing parameter allocated by the AP by using the first frame; or when a field value of the Confirm Indication subfield is 2, it indicates that the STA agrees to participate in the sensing session, but does not accept a first sensing parameter allocated by the AP by using the first frame.

2. Parameter Modification Subfield

When a field value of the Confirm Indication subfield is 2, that is, the STA agrees to participate in the sensing session, but does not accept the first sensing parameter allocated by the AP by using the first frame, the Parameter Modification subfield includes a suggested (or recommended) parameter fed back by the STA by using the second frame.

Structure 2: For the first frame described in structure 4 in operation 601, the second frame includes a sensing response element field, and the confirm information for the first frame is located in the sensing response element field.

Figure 6G:
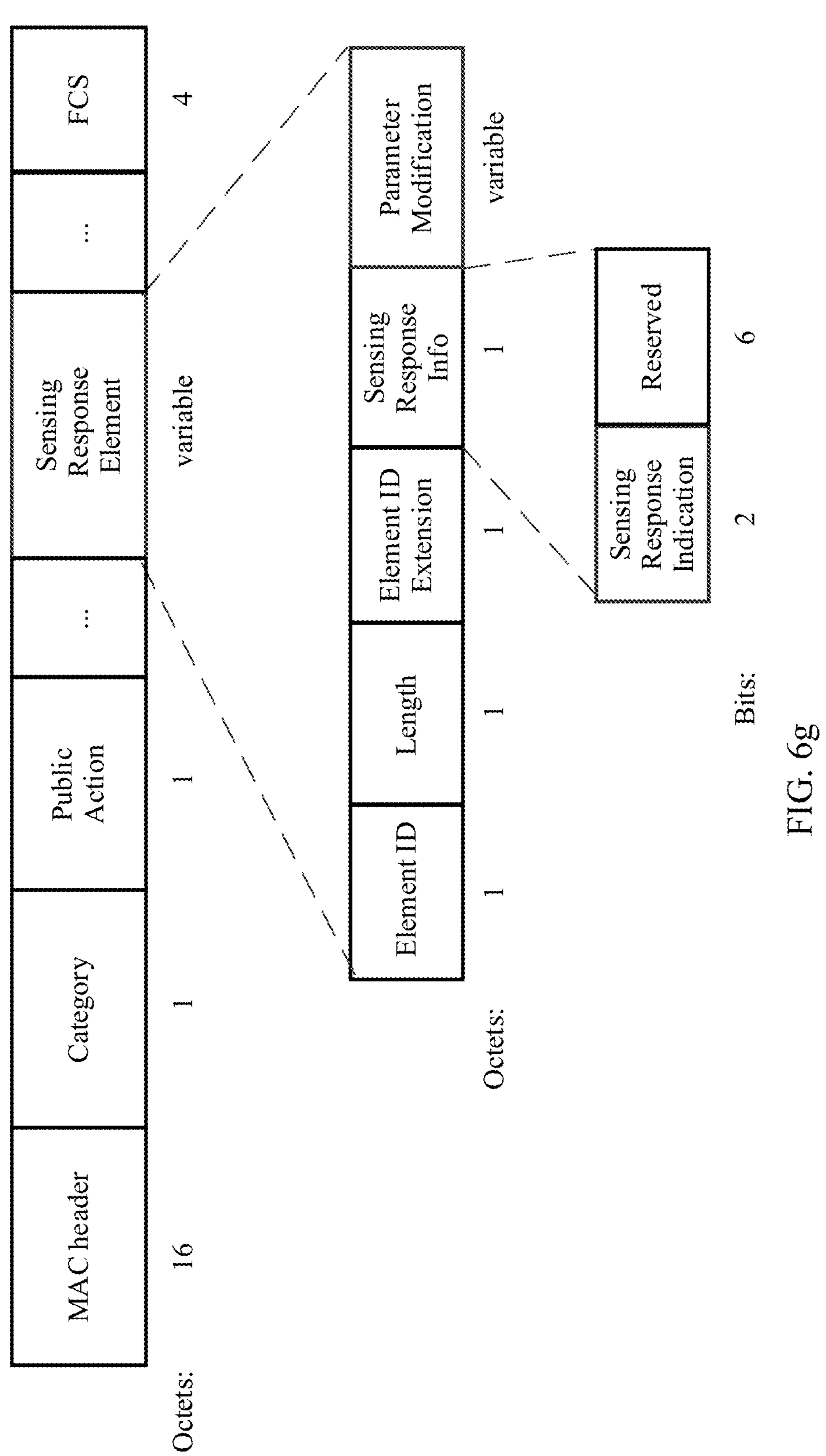
FIG. 6*g* is a schematic diagram of still another frame structure according to this application.

For example, FIG. 6*g* is a schematic diagram of a structure of the second frame according to this application. The second frame is a sensing response frame. The Sensing Response frame includes a sensing response element subfield, and the confirm information for the first frame is located in the Sensing Response Element subfield.

In an embodiment, the Sensing Response Element subfield includes a sensing response information (Sensing Response Info) subfield. The Sensing Response Info subfield includes a sensing response indication subfield. The Sensing Response Indication subfield indicates whether the STA sending the second frame confirms to participate in the sensing session, that is, the confirm information for the first frame is located in the Sensing Response Indication subfield. For example, Table 4 shows a correspondence between a field value of the Sensing Response Indication and the indication information.

TABLE 4

| Field value of the Sensing Response Indication | Indication information |
|---|---|
| 0 | Not participating in the sensing session |
| 1 | Confirm to participate in the sensing session and accept a parameter allocated to the STA in a sensing request frame |
| 2 | Confirm to participate in the sensing session, but accept no parameter allocated to the STA in the sensing request frame and feed back a suggested parameter of the STA |
| 3 | Reserved field |

If a field value of the Sensing Response Indication subfield is 0, it indicates that the STA does not participate in the sensing session; if a field value of the Sensing Response Indication subfield is 1, it indicates that the STA confirms to participate in the sensing session, and accepts the sensing parameter allocated by the AP to the STA by using the first frame; or if the field value of the Sensing Response Indication subfield is 2, it indicates that the STA confirms to participate in the sensing session, but does not accept the sensing parameter allocated by the AP to the STA by using the first frame, and feeds back the suggested parameter of the STA.

In an embodiment, if the STA confirms to participate in the sensing session, but does not accept the sensing parameter allocated by the AP to the STA by using the first frame, in addition to the sensing response info subfield, the sensing response element subfield included in the first frame further includes a parameter modification subfield. The parameter modification subfield is used to store the recommended parameter fed back by the STA.

Figure 6H:
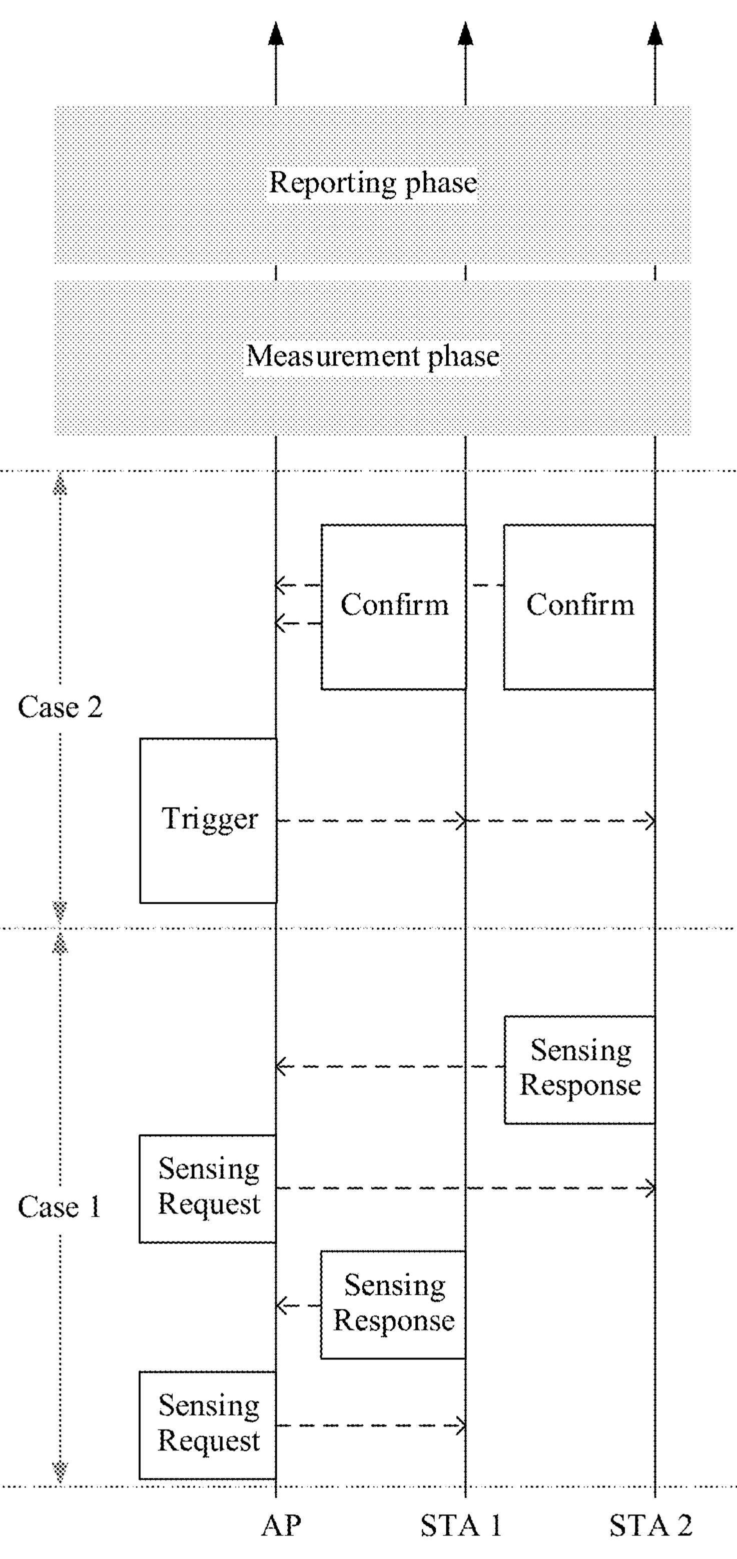
FIG. 6*h* is a schematic diagram of an application scenario according to this application.

In an application scenario, FIG. 6*h* is an application scenario of the first frame and the second frame according to an embodiment of this application. The AP is an initiator, and the STA 1 and the STA 2 are the foregoing first STAs.

In this case, as shown in case 2 in FIG. 6*h*, the AP sends (for example, sends by broadcast) the first frame (in FIG. 6*h*, the first frame is used as a Trigger frame for illustration) to the STA 1 and the STA 2, to configure a role and a sensing parameter for both the STA 1 and the STA 2 to participate in the sensing session. After receiving the first frame, the STA 1 sends the second frame (in FIG. 6*h*, the first frame is used as a Confirm frame for illustration) to the AP, and confirms to accept the first information that is in the first frame and that is configured by the AP for the STA 1. After receiving the first frame, the STA 2 sends the second frame to the AP, and confirms to accept the first information that is in the first frame and that is configured by the AP for the STA 2.

In this case, as shown in case 1 in FIG. 6*h*, the AP sends the first frame in 601 (for example, the first frame in 601 is a sensing request frame in structure 4) to both the STA 1 and the STA 2, and configures a role and a sensing parameter for both the STA 1 and the STA 2 to participate in the sensing session. After receiving the first frame, the STA 1 sends the second frame (for example, the sensing response frame in structure 2 in 602) to the AP, and confirms to accept the first information that is in the first frame and that is configured by the AP for the STA 1. After receiving the first frame, the STA 2 sends the second frame (for example, the sensing response frame in structure 2 in operation 602) to the AP, and confirms to accept the first information that is in the first frame and that is configured by the AP for the STA 2.

According to such a sensing session establishment method, the AP may allocate, by using the first frame, a role and a parameter to each STA participating in the sensing session, to manage the role and the parameter when each STA participates in the sensing session. This helps implement a function requirement of the wireless sensing technology.

Figure 7A:
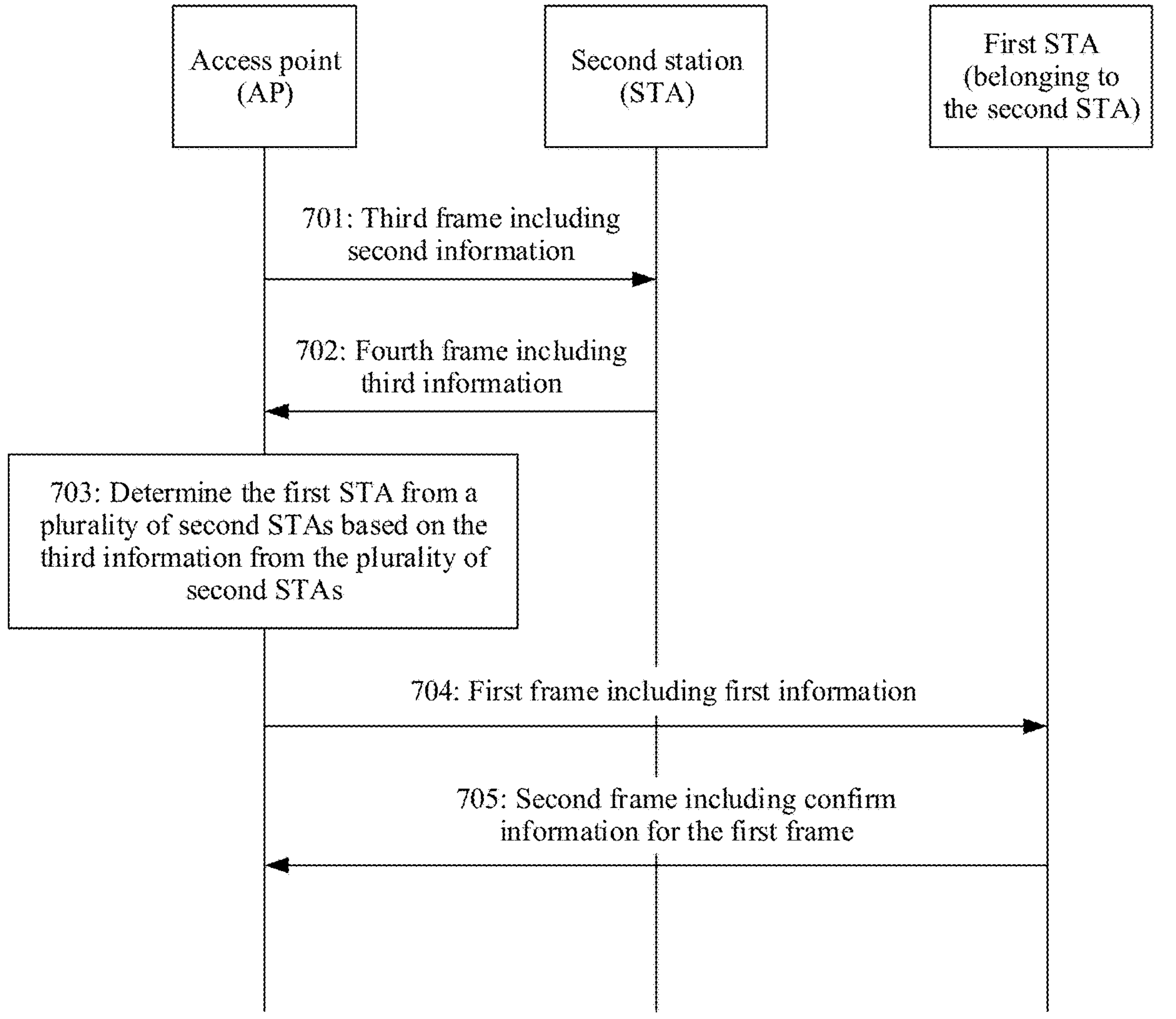
FIG. 7*a* is a flowchart of another sensing session establishment method according to this application.

FIG. 7*a* is a schematic flowchart of another sensing session establishment method according to an embodiment of this application. As shown in FIG. 7*a*, the sensing session establishment method includes the following operation 701 to operation 705. The method shown in FIG. 7*a* may be performed by an AP and a STA. Alternatively, the method shown in FIG. 7*a* may be performed by a chip in an AP and a chip in a STA. In FIG. 7*a*, an example in which the method is performed by the AP and the STA is used for description.

In operation 701: the AP sends a third frame to a plurality of second STAs, where the third frame includes second information, and the second information is used to request the second STA to participate in the sensing session.

The second STA is a STA associated with the AP, that is, the STA is within a signal range of the AP and has a communication connection to the AP. It should be learned that, that the AP sends a third frame to a plurality of second STAs may be understood as that the AP sends the third frame to all second STAs, to request all the second STAs to participate in the sensing session; or may be understood as that the AP determines a plurality of second STAs (a part of second STAs) from all the second STAs, and sends the third frame to the plurality of second STAs (the part of second STAs), to request the plurality of second STAs (the part of second STAs) to participate in the sensing session. This is not specifically limited in this application.

The following describes a frame structure of the third frame in detail.

Structure 1: The third frame includes a common information field, and the second information is located in the common information field.

Figure 7B:
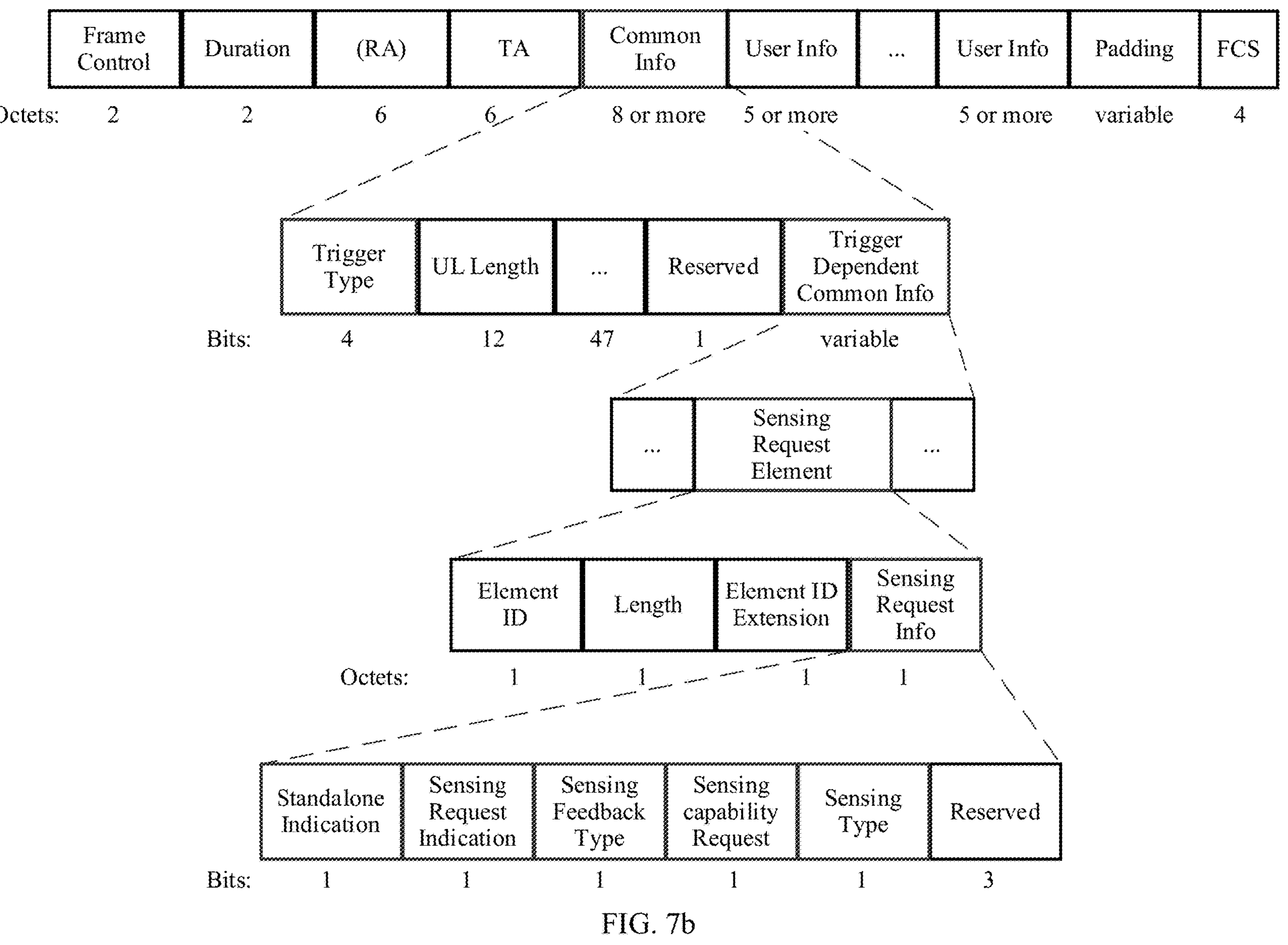
FIG. 7*b* is a schematic diagram of still another frame structure according to this application.

For example, FIG. 7*b* is a schematic diagram of a structure of the third frame according to this application. The third frame is a sensing trigger frame. The sensing trigger frame includes a common info field, and the common information field is used to configure first information (which may be understood as common parameter information) shared by all STAs participating in the sensing session. For example, when the AP sends second information to a plurality of second STAs, the second information is used to request each second STA to participate in the sensing session, and feed back a receiving/sending capability and a parameter of the second STA. In this case, it may be understood that the second information received by the plurality of second STAs is the same, and the second information is configured in a common info field of the third frame.

The common info field includes a trigger type subfield and a trigger dependent common info subfield. The Trigger Type subfield indicates a function type of the Sensing Trigger frame. For example, when a value of the Trigger Type subfield is 8, it indicates that the Sensing Trigger frame is used to trigger a Sensing operation. The trigger dependent common info subfield includes a sensing request element subfield. The sensing request element subfield includes a sensing request info field. The sensing request info field includes a sensing request indication subfield, a sensing feedback type subfield, a sensing capability request subfield, and a sensing type subfield. The following describes in detail subfields included in the sensing request info field.

1. Sensing Request Indication Subfield

The Sensing Request Indication subfield is used to request the STA to feed back whether the STA is willing to participate in the sensing session. For example, when a field value of the Sensing Request Indication subfield is 1, it indicates that the STA is requested to feed back whether the STA is willing to participate in the sensing session.

2. Sensing Feedback Type Subfield

The Sensing Feedback Type subfield is used to configure a type of a measurement result fed back by the device. The type of feeding back the measurement result includes but is not limited to: CSI feedback, compressed CSI feedback, final result feedback (speed information, angle information, distance information, or the like), or the like.

3. Sensing Capability Request Subfield

The Sensing capability Request subfield indicates (or requests) the STA to feed back a role supported by the STA in the sensing session. In this case, the STA needs to feed back all roles supported by the STA in the sensing session.

In an embodiment, the Sensing capability Request subfield may be further used to request a role recommended (or referred to as suggested) by the STA in the sensing session. In this case, the STA may feed back a part of all the roles supported by the STA in the sensing session.

4. Sensing Type Subfield

The Sensing Type subfield is used to request the STA to feed back a sensing type of the STA, and the sensing type includes but is not limited to a data sending type and the like.

In an embodiment, if the STA is an initiator in the sensing session, the sensing request info subfield may further include a standalone indication subfield. The Standalone Indication subfield is used to request the STA to feed back whether the STA participates in receiving/sending of the sensing signal (that is, whether the initiator STA further participates in the sensing session as a receiver and/or a transmitter).

Structure 2: The third frame includes a sensing request element field, and the second information is located in the sensing request element field.

Figure 7C:
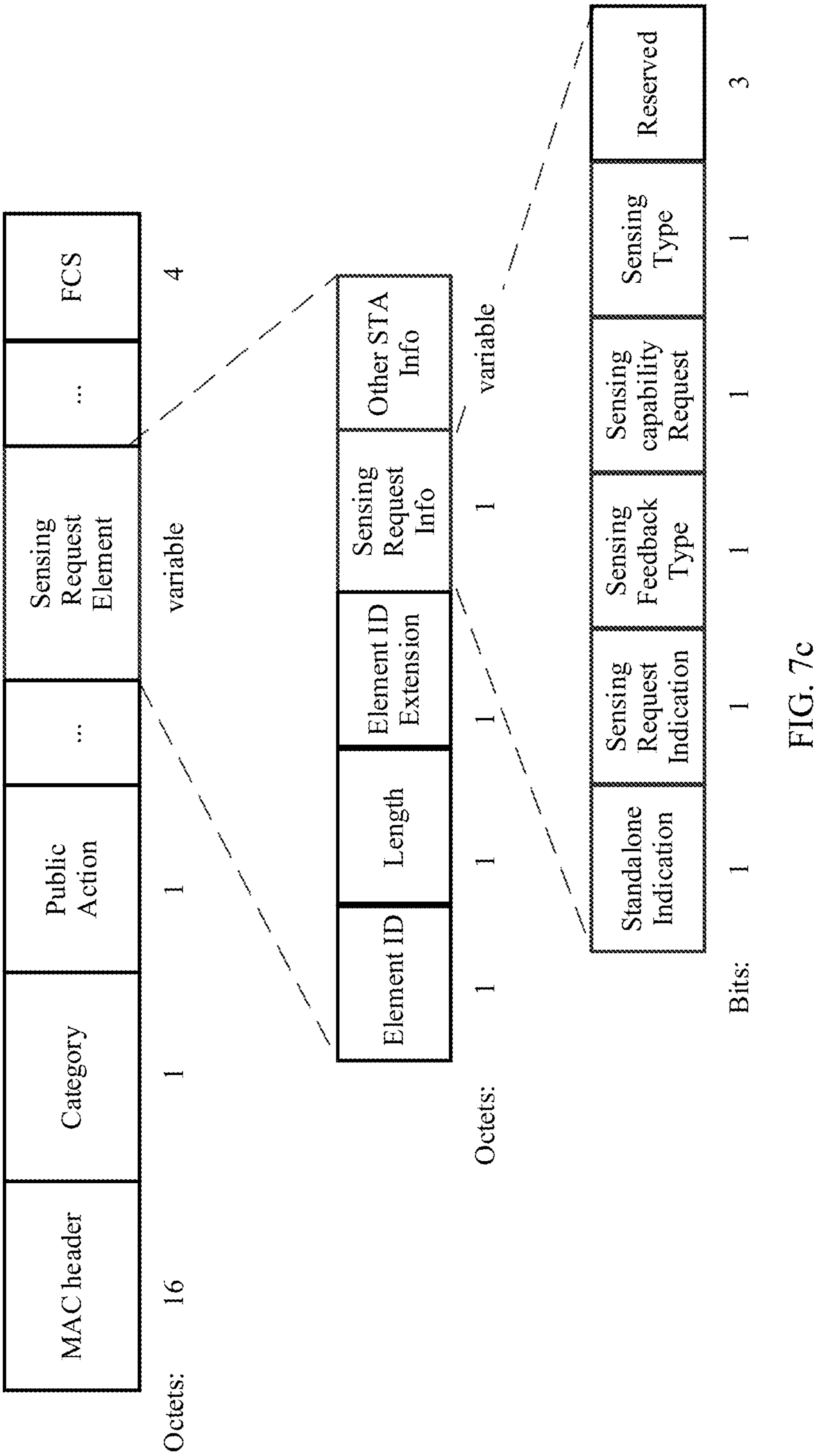
FIG. 7*c* is a schematic diagram of still another frame structure according to this application.

For example, FIG. 7*c* is a schematic diagram of another structure of the third frame according to this application. The third frame is a sensing request frame. The Sensing Request frame includes a sensing request element field. The second information is located in the Sensing Request Element field.

In an embodiment, the Sensing Request Element field includes a sensing request info subfield, and the Sensing Request Info subfield includes a sensing request indication subfield, a sensing feedback type subfield, a sensing capability request subfield, and a sensing type subfield.

1. Sensing Request Indication Subfield

The Sensing Request Indication subfield is used to request the STA to feed back whether the STA is willing to participate in the sensing session. For example, when a field value of the Sensing Request Indication subfield is 1, it indicates that the STA is requested to feed back whether the STA is willing to participate in the sensing session.

2. Sensing Feedback Type Subfield

The Sensing Feedback Type subfield is used to request the STA to feed back a type that is of a feedback measurement result and that is supported by the STA. The type of feeding back the measurement result includes but is not limited to: CSI feedback, compressed CSI feedback, final result feedback (speed information, angle information, distance information, or the like), or the like.

3. Sensing Capability Request Subfield

The Sensing capability Request subfield is used to request the STA to feed back a role supported by the STA in the sensing session. In this case, the STA needs to feed back all roles supported by the STA in the sensing session.

In an embodiment, the Sensing capability Request subfield may be further used to request a role recommended (or referred to as suggested) by the STA in the sensing session. In this case, the STA may feed back a part of all the roles supported by the STA in the sensing session.

4. Sensing Type Subfield

The Sensing Type subfield is used to request the STA to feed back a sensing type of the STA, and the sensing type includes but is not limited to a data sending type and the like.

In an optional case, if the STA is an initiator in the sensing session, the sensing request info subfield may further include a standalone indication subfield. The Standalone Indication subfield is used to request the STA to feed back whether the STA participates in receiving/sending of the sensing signal (that is, whether the STA further participates in the sensing session as a receiver and/or a transmitter).

In operation 702: the AP receives a fourth frame from the plurality of second STAs, where the fourth frame includes third information, and the third information indicates whether the second STA confirms to participate in the sensing session.

For each of the plurality of second STAs, after the second STA receives the third frame sent by the AP, the second STA determines, based on an actual situation of the second STA (a current task of the STA, a capability of a processor, or the like), whether to participate in the sensing session. Further, the second STA sends, to the AP by using the fourth frame, indication information (that is, the third information) indicating whether the second STA participates in the sensing session.

In an embodiment, if the second STA participates in the sensing session (that is, the third information indicates that the second STA confirms to participate in the sensing session), the third information may further include a second role supported by the second STA in the sensing session and a second sensing parameter corresponding to the second role. For example, after the second STA receives the third frame sent by the AP, the second STA confirms to participate in the sensing session, and the second STA sends the fourth frame to the AP. The fourth frame further indicates that the second STA may receive 10 data packets every 1 ms when the second STA supports participating in the sensing session as a receiver, and may send 7 data packets every 1 ms when the second STA supports participating in the sensing session as a transmitter.

In an embodiment, when the third information further includes the second role supported by the second STA in the sensing session and the second sensing parameter corresponding to the second role, the AP determines the first sensing parameter based on the second sensing parameter. For example, a STA 1 and a STA 2 are second STAs associated with the AP. Third information of the STA 1 indicates that a second role supported by the STA 1 is a transmitter, and a second sensing parameter corresponding to the second role is sending 10 data packets every 1 ms. Third information of the STA 2 indicates that a second role supported by the STA 2 is a receiver, and a second sensing parameter corresponding to the second role is receiving 5 data packets every 1 ms. In this case, after the AP determines the STA 1 and the STA 2 as first STAs, the AP may determine, based on the second sensing parameter indicated in the third information of the STA 1 and the second sensing parameter indicated in the third information of the STA 2, that a first sensing parameter of the STA 1 is sending five data packets every 1 ms, and a first sensing parameter of the STA 2 is receiving five data packets every 1 ms.

The following describes in detail a frame structure of the fourth frame based on the two structures of the third frame in the foregoing 701.

Structure 1: The fourth frame includes a sensing confirm element field, and the third information is located in the sensing confirm element field.

The frame structure of the fourth frame corresponds to structure 1 "the third frame includes a common information field, and the second information is located in the common information field" in the foregoing 701.

Figure 7D:
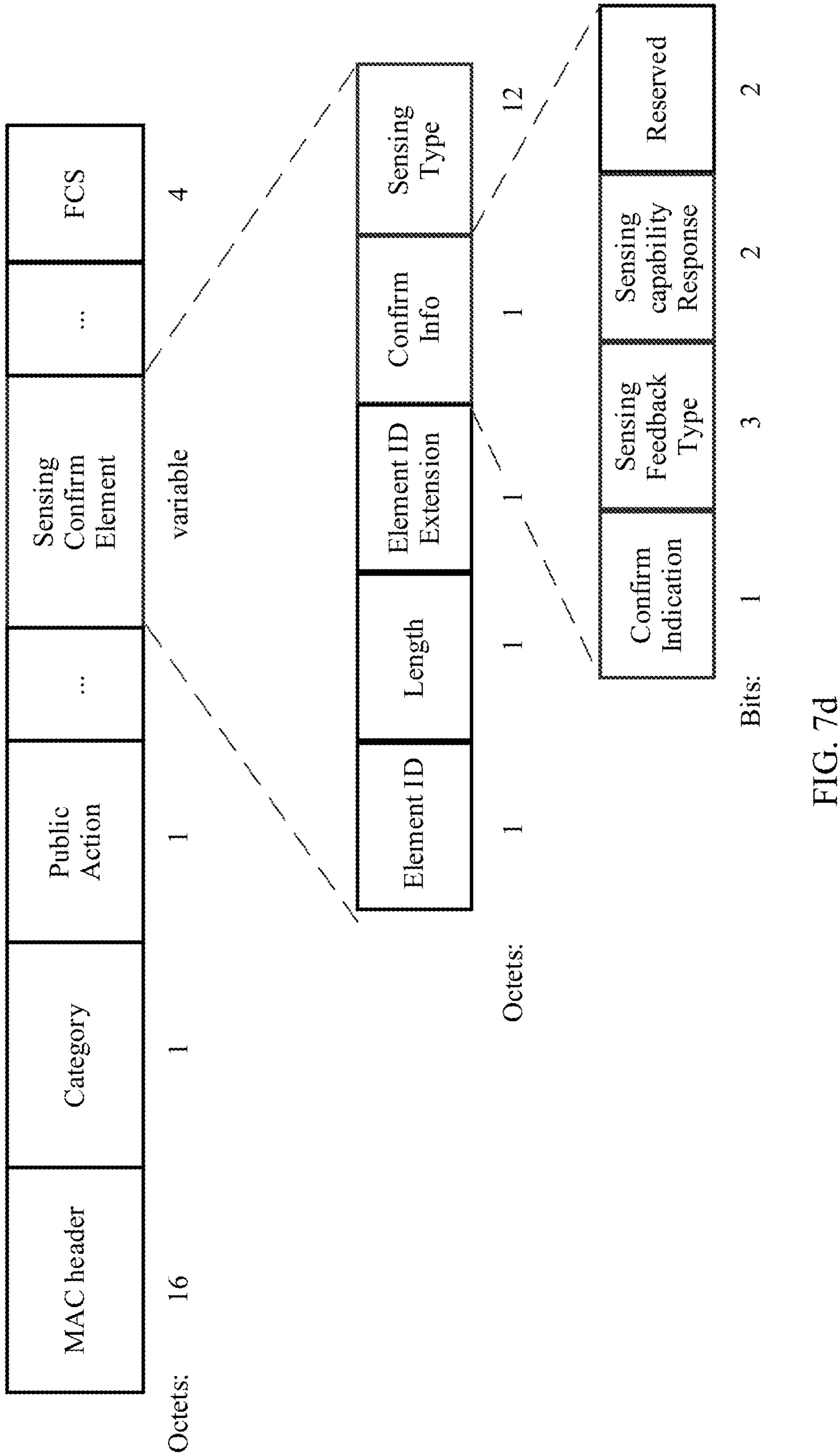
FIG. 7*d* is a schematic diagram of still another frame structure according to this application.

For example, FIG. 7*d* is a schematic diagram of a structure of the fourth frame according to this application. The fourth frame is a sensing confirm frame. The sensing confirm frame includes a sensing confirm element field, and the sensing confirm element field includes a confirm info subfield and a sensing type subfield. The following separately describes in detail the confirm info subfield and the sensing type subfield in the third frame.

1. Confirm Information Subfield

The confirm info subfield includes a confirm indication subfield, a sensing feedback type (subfield, and a sensing capability response subfield.

1.1 Confirm Indication Subfield

The Confirm Indication subfield indicates whether the STA sending the fourth frame confirms to participate in the sensing session. For example, if a field value corresponding to the Confirm Indication subfield is 0, it indicates that the STA does not participate in the sensing session. If a field value corresponding to the Confirm Indication subfield is 1, it indicates that the STA confirms to participate in the sensing session.

1.2 Sensing Feedback Type Subfield

The Sensing Feedback Type subfield indicates a type (or referred to as a manner) of a measurement result fed back by the STA sending the fourth frame. The type of the measurement result fed back by the STA includes but is not limited to: a CSI feedback manner, a compressed CSI feedback manner, a final sensing measurement result (for example, information such as a speed, an angle, or a distance) feedback manner, or the like.

For example, when a field value of the Sensing Feedback Type subfield is 0, it indicates that the type of the measurement result reported by the STA is CSI feedback; when a field value of the Sensing Feedback Type subfield is 1, it indicates that the type of the measurement result reported by the STA is compressed CSI feedback; when a field value of the Sensing Feedback Type subfield is 2, it indicates that the type of the measurement result reported by the STA is final result speed information feedback; when a field value of the Sensing Feedback Type subfield is 3, it indicates that the type of the measurement result reported by the STA is final result angle information feedback; or when a field value of the Sensing Feedback Type subfield is 4, it indicates that the type of the measurement result reported by the STA is final result distance information feedback.

1.3 Sensing Capability Response Subfield

The Sensing capability Response subfield indicates a receiving/sending capability of the STA sending the fourth frame. For example, the Sensing capability Response subfield in the fourth frame sent by the STA 1 indicates that a data packet receiving rate is receiving 10 data packets within 1 ms when the STA 1 serves as a receiver; or a data packet transmitting rate is receiving 10 data packets within 1 ms when the STA 1 serves as a transmitter.

2. Sensing Type Subfield

The Sensing Type subfield indicates a data sending type of the STA sending the fourth frame, and the data sending type includes a burst-based type or a continuous sending-based type. For the burst-based type, the Sensing Type subfield includes a pattern subfield, a group measurement duration subfield, a number of group subfield, and an interval between group subfield. It can be learned that, in the burst-based type, the Sensing Type subfield indicates sending duration, a quantity of sending times in a group, and an interval between groups. For the continuous sending-based type, the Sensing Type subfield includes a value of a pattern subfield, a measurement duration subfield, and a number subfield. In the continuous sending-based type, the Sensing Type subfield indicates information such as total sending duration, a total quantity of sent data packets, and a packet/beam sending period/interval.

For example, in the burst-based type, the Sensing Type subfield includes a pattern (pattern) subfield, a group measurement duration subfield, a number of group subfield, and an interval between group subfield. The pattern subfield indicates a frequency pattern for sending data based on a burst. For example, when a field value of the pattern subfield is 0, it indicates that sending is performed at a low frequency. When a field value of the pattern subfield is 1, it indicates that sending is performed at a high frequency. The group measurement duration subfield indicates sending duration of a single packet group. The number of group subfield indicates a quantity of sent NDPs in a single packet group. The interval between group subfield indicates an interval between packet groups.

Structure 2: The fourth frame includes a sensing response element field, and the third information is located in the sensing response element field.

The frame structure of the fourth frame corresponds to structure 2 "the third frame includes a sensing request element field, and the second information is located in the sensing request element field" in the foregoing operation 701.

Figure 7E:
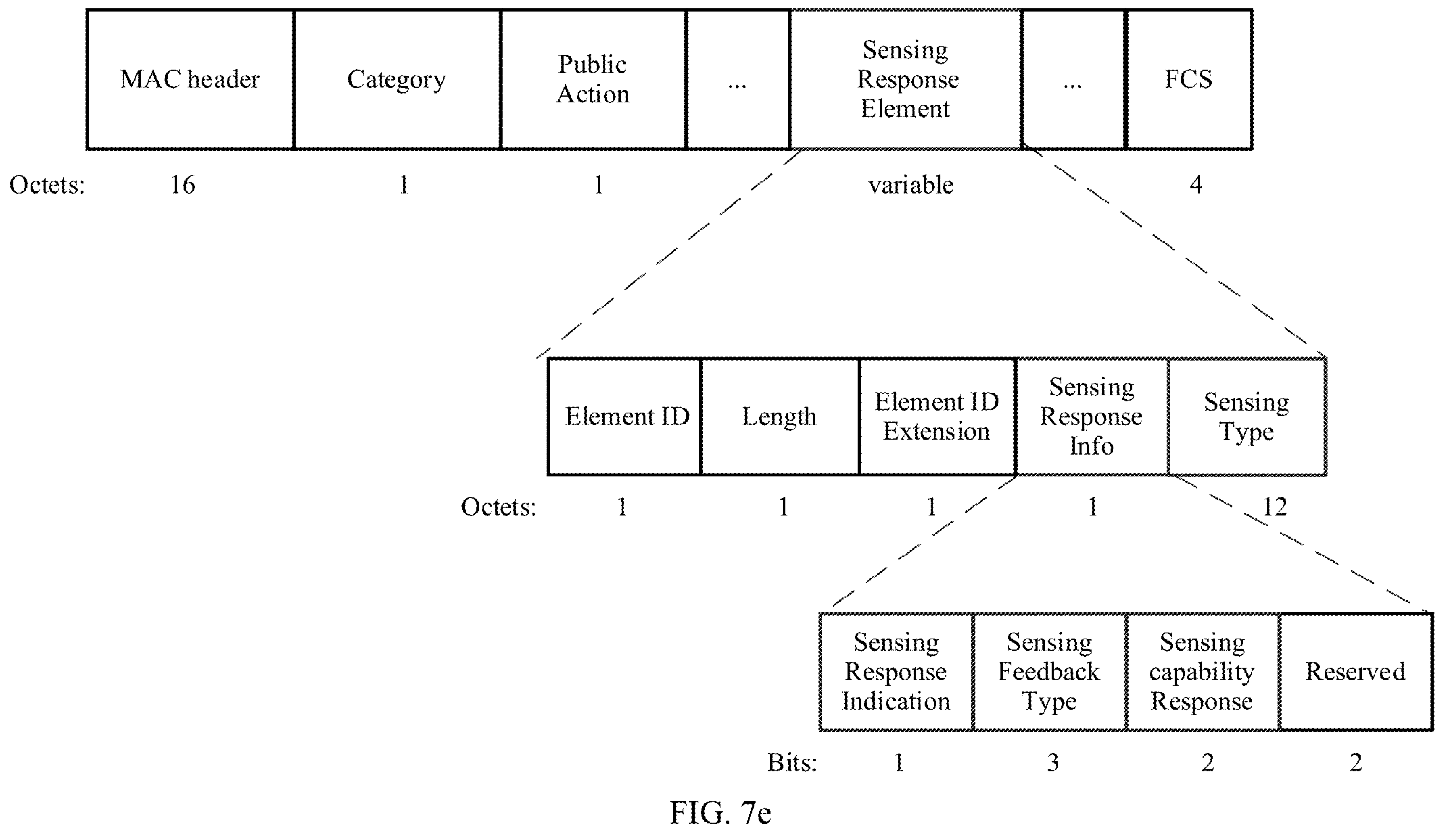
FIG. 7*e* is a schematic diagram of still another frame structure according to this application.

For example, FIG. 7*e* is a schematic diagram of another structure of the fourth frame according to this application. The fourth frame is a sensing response (frame. The Sensing Response frame includes a sensing response element subfield, and the third information is located in the Sensing Response Element subfield.

In an embodiment, the Sensing Response Element subfield includes a sensing response info subfield. The Sensing Response Info subfield includes a sensing response indication subfield, a sensing feedback type subfield, and a sensing capability response subfield.

The Sensing Response Indication subfield indicates whether the STA sending the fourth frame confirms to participate in the sensing session. For example, Table 5 shows a correspondence between a field value of the Sensing Response Indication and the indication information.

TABLE 5

| Field value of the Sensing Response Indication | Indication information |
| --- | --- |
| 0 | Not participating in the sensing session |
| 1 | Confirm to participate in the sensing session |

If a field value of the Sensing Response Indication subfield is 0, it indicates that the STA does not participate in the sensing session; or if a field value of the Sensing Response Indication subfield is 1, it indicates that the STA confirms to participate in the sensing session.

The Sensing Feedback Type subfield indicates a type (or referred to as a manner) of a measurement result fed back by the STA sending the fourth frame. The type of the measurement result fed back by the STA includes but is not limited to: a CSI feedback manner, a compressed CSI feedback manner, a final sensing measurement result (for example, information such as a speed, an angle, or a distance) feedback manner, or the like. For example, when a field value of the Sensing Feedback Type subfield is 0, it indicates that the type of the measurement result reported by the STA is CSI feedback; when a field value of the Sensing Feedback Type subfield is 1, it indicates that the type of the measurement result reported by the STA is compressed CSI feedback; when a field value of the Sensing Feedback Type subfield is 2, it indicates that the type of the measurement result reported by the STA is final result speed information feedback; when a field value of the Sensing Feedback Type subfield is 3, it indicates that the type of the measurement result reported by the STA is final result angle information feedback; or when a field value of the Sensing Feedback Type subfield is 4, it indicates that the type of the measurement result reported by the STA is final result distance information feedback.

The Sensing capability Response subfield indicates a receiving/sending capability of the STA sending the fourth frame. For example, the Sensing capability Response subfield in the fourth frame sent by the STA 1 indicates that a data packet receiving rate is receiving 10 data packets within 1 ms when the STA 1 serves as a receiver; or a data packet transmitting rate is receiving 10 data packets within 1 ms when the STA 1 serves as a transmitter.

In operation 703: the AP determines the first STA from the plurality of second STAs based on the third information from the plurality of second STAs.

After the AP sends the third frame to the plurality of second STAs to request the plurality of second STAs to participate in the sensing session, the AP determines, from the plurality of second STAs based on the third information of each of the plurality of second STAs, the first STA participating in the sensing session. For example, after the AP sends the third frame to the STA 1, the STA 2, and the STA 3, the AP determines, from the STA 1, the STA 2, and the STA 3 based on the third information of the STA 1, the third information of the STA 2, and the third information of the STA 3, that the first STAs participating in the sensing session are the STA 1 and the STA 2.

In an embodiment, the third information corresponding to each of the plurality of second STAs indicates that the second STA determines to participate in the sensing session, and the AP may determine all the plurality of second STAs as the first STAs.

For example, the STA 1, the STA 2, and the STA 3 are a plurality of second STAs associated with the AP, and the AP sends a third frame to the STA 1, the STA 2, and the STA 3, to request the STA 1, the STA 2, and the STA 3 to participate in the sensing session. The third information in the fourth frame sent by the STA 1 to the AP indicates that the STA 1 participates in the sensing session, and a role (that is, the second role) supported by the STA 1 is a transmitter and a receiver. The third information in the fourth frame sent by the STA 2 to the AP indicates that the STA 2 determines to participate in the sensing session, and a role (that is, the second role) supported by the STA 2 is a receiver. The third information in the fourth frame sent by the STA 3 to the AP indicates that the STA 3 determines to participate in the sensing session, and a role (that is, the second role) supported by the STA 1 is a transmitter. That is, if the STA 1, the STA 2, and the STA 3 all determine to participate in the sensing session, the AP determines all the second STAs (that is, the STA 1, the STA 2, and the STA 3) as the first STAs.

In another embodiment, the AP determines the first STA from the plurality of second STAs based on a role of the AP in the sensing session and the third information from the plurality of second STAs.

It can be learned from the process of participating in the sensing session for sensing in FIG. 3 that there may be at least one transmitter and at least one receiver in a sensing session, to form at least one complete communication link (including the receiver and the transmitter, which may be considered as a complete communication link) of a sensing signal. Because the AP may alternatively participate in receiving/sending of the sensing signal (that is, the AP is a receiver or a transmitter), in a process of determining, from the plurality of second STAs, the first STA participating in the sensing session, the AP may make a decision based on a role of the AP in the sensing session. In an embodiment, the AP determines the first STA from the plurality of second STAs based on the role of the AP in the sensing session. The following includes possible cases.

Case 1: The role of the AP in the sensing session is neither a transmitter nor a receiver.

In a sensing scenario corresponding to this possible case, the AP is an independent sensing initiator, and the AP does not participate in receiving/sending of a sensing signal. In this case, to form at least one complete communication link of the sensing signal, first STAs determined by the AP include at least one first STA whose role is a receiver and at least one first STA whose role is a transmitter.

In other words, when the role of the AP in the sensing session is neither a transmitter nor a receiver, third information from a third STA indicates that the third STA participates in the sensing session, and third information from a fourth STA indicates that the fourth STA participates in the sensing session, the AP determines the third STA and the fourth STA as the first STAs. The third STA is a STA in the second STAs, a second role corresponding to the third STA is a receiver in the sensing session, the fourth STA is a STA in the second STAs, and a second role corresponding to the fourth STA is a transmitter in the sensing session.

For example, the AP does not participate in receiving/sending of the sensing signal, and the STA 1, the STA 2, and the STA 3 are the plurality of second STAs associated with the AP. The AP sends a third frame to the STA 1, the STA 2, and the STA 3, to request the STA 1, the STA 2, and the STA 3 to participate in the sensing session. The third information in the fourth frame sent by the STA 1 to the AP indicates that the STA 1 participates in the sensing session, and a role (that is, the second role) supported by the STA 1 is a transmitter. The third information in the fourth frame sent by the STA 2 to the AP indicates that the STA 2 determines to participate in the sensing session, and a role (that is, the second role) supported by the STA 2 is a receiver. The third information in the fourth frame sent by the STA 3 to the AP indicates that the STA 3 does not participate in the sensing session. It can be learned that, although only a part of the plurality of second STAs confirm to participate in the sensing session, the STA 2 (that is, the foregoing third STA) in the part of the second STAs that confirm to participate in the sensing session confirms to participate in the sensing session as a receiver, and the STA 1 (that is, the foregoing fourth STA) confirms to participate in the sensing session as a transmitter. The STA 1 and the STA 2 can form a complete communication link, and the AP determines the STA 1 and the STA 2 as the first STAs.

In this case, in another possible implementation, the third STA and the fourth STA are a same STA, that is, the STA is both a receiver and a transmitter in the sensing session.

Case 2: The role of the AP in the sensing session is a transmitter.

In a sensing scenario corresponding to this possible case, the AP is a non-independent sensing initiator (in this case, the AP is a sensing initiator and a transmitter), or the AP is a transmitter in the sensing session. In this case, to form at least one complete communication link of a sensing signal, first STAs determined by the AP include at least one first STA whose corresponding role is a receiver.

In other words, when the role of the AP in the sensing session is a transmitter, and third information from a fifth STA indicates that the fifth STA participates in the sensing session, the AP determines the fifth STA as the first STA. The fifth STA is one of the plurality of second STAs, and a second role corresponding to the fifth STA is a receiver in the sensing session.

For example, in the sensing session, the AP is a sensing signal transmitter, and the STA 1, the STA 2, and the STA 3 are the plurality of second STAs associated with the AP. The AP sends a third frame to the STA 1, the STA 2, and the STA 3, to request the STA 1, the STA 2, and the STA 3 to participate in the sensing session. The third information in the fourth frame sent by the STA 1 to the AP indicates that the STA 1 participates in the sensing session, and a role (that is, the second role) supported by the STA 1 is a transmitter. The third information in the fourth frame sent by the STA 2 to the AP indicates that the STA 2 determines to participate in the sensing session, and a role (that is, the second role) supported by the STA 2 is a receiver. The third information in the fourth frame sent by the STA 3 to the AP indicates that the STA 3 does not participate in the sensing session. It can be learned that, although only a part of the plurality of second STAs confirm to participate in the sensing session, the STA 2 (that is, the fifth STA) in the part of the second STAs confirms to participate in the sensing session as a receiver, and the AP needs to determine the STA 2 as a STA (that is, the first STA) participating in the sensing session.

Case 3: The role of the AP in the sensing session is a receiver.

In a sensing scenario corresponding to this possible case, the AP is a non-independent sensing initiator (in this case, the AP is a sensing initiator and a receiver), or the AP is a receiver in the sensing session. In this case, to form at least one complete communication link of a sensing signal, first STAs determined by the AP include at least one first STA whose role is a transmitter.

In other words, when the role of the AP in the sensing session is a receiver, third information from a sixth STA indicates that the sixth STA participates in the sensing session, the AP determines the sixth STA as the first STA. The sixth STA is one of the plurality of second STAs, and a second role corresponding to the sixth STA is a transmitter in the sensing session.

For example, in the sensing session, the AP is a sensing signal receiver, and the STA 1, the STA 2, and the STA 3 are the plurality of second STAs associated with the AP. The AP sends a third frame to the STA 1, the STA 2, and the STA 3, to request the STA 1, the STA 2, and the STA 3 to participate in the sensing session. The third information in the fourth frame sent by the STA 1 to the AP indicates that the STA 1 participates in the sensing session, and a role (that is, the second role) supported by the STA 1 is a transmitter. The third information in the fourth frame sent by the STA 2 to the AP indicates that the STA 2 determines to participate in the sensing session, and a role (that is, the second role) supported by the STA 2 is a receiver. The third information in the fourth frame sent by the STA 3 to the AP indicates that the STA 3 does not participate in the sensing session. It can be learned that, although only a part of the plurality of second STAs confirm to participate in the sensing session, the STA 1 (that is, the sixth STA) in the part of the second STAs confirms to participate in the sensing session as a transmitter, and the AP needs to determine the STA 1 as a STA (that is, the first STA) participating in the sensing session.

It should be learned that the foregoing possible cases (the case 1, the case 2, and the case 3 in 703) in which the AP determines the first STA from the plurality of second STAs are to form at least one complete communication link (at least one receiver and/or at least one transmitter) of the sensing signal in the sensing session. This may be understood as a minimum condition for establishing the sensing session, and cannot be considered as a limitation on the technical solutions of this application.

In an embodiment, that the AP determines the first STA from the plurality of second STAs means that in addition to ensuring that there is at least one complete communication link (at least one receiver and/or at least one transmitter) of the sensing signal in the sensing session, the AP may further determine the first STA from the plurality of second STAs based on a determining criterion. In an embodiment, the determining criterion includes but is not limited to a bandwidth capability criterion, a criterion of a quantity of STAs in the sensing session, a parameter criterion, and the like.

The bandwidth capability criterion is to determine the first STA by using a standard of improving a transmission rate or a throughput in the sensing session. The criterion of the quantity of STAs in the sensing session may be understood as to determine the first STA by using a standard of increasing as many STAs as possible participating in the sensing session.

For example, the STA 1, the STA 2, and the STA 3 are second STAs associated with the AP. The third information of the STA 1 indicates that the second role of the STA 1 is a transmitter, and the second sensing parameter is sending 10 data packets every 1 ms. The third indication information of the STA 2 indicates that the second role of the STA 2 is a receiver, and the second sensing parameter is receiving eight data packets every 1 ms. The third indication information of the STA 3 indicates that the second role of the STA 3 is a receiver, and the second sensing parameter is receiving five data packets every 1 ms. The AP may determine the STA 1 and the STA 2 as the first STAs based on the bandwidth capability criterion. The STA 1 is a transmitter, and sends eight data packets every 1 ms. The STA 2 is a receiver, and receives eight data packets every 1 ms. The AP may determine the STA 1, the STA 2, and the STA 3 as the first STAs based on the criterion of the quantity of STAs in the sensing session, and determine that the STA 1 is a transmitter and sends five data packets every 1 ms, and both the STA 2 and the STA 3 are receivers and receive five data packets every 1 ms.

In operation 704: the AP sends a first frame to a first STA, where the first frame includes first information, and the first information indicates a first role of the first STA in a sensing session.

In operation 705: the AP receives a second frame from the first STA, where the second frame includes confirm information for the first frame.

For specific implementations of operations 704 to 705, refer to the specific implementations of operations 601 to 602. Details are not described herein again in this application.

Figure 7F:
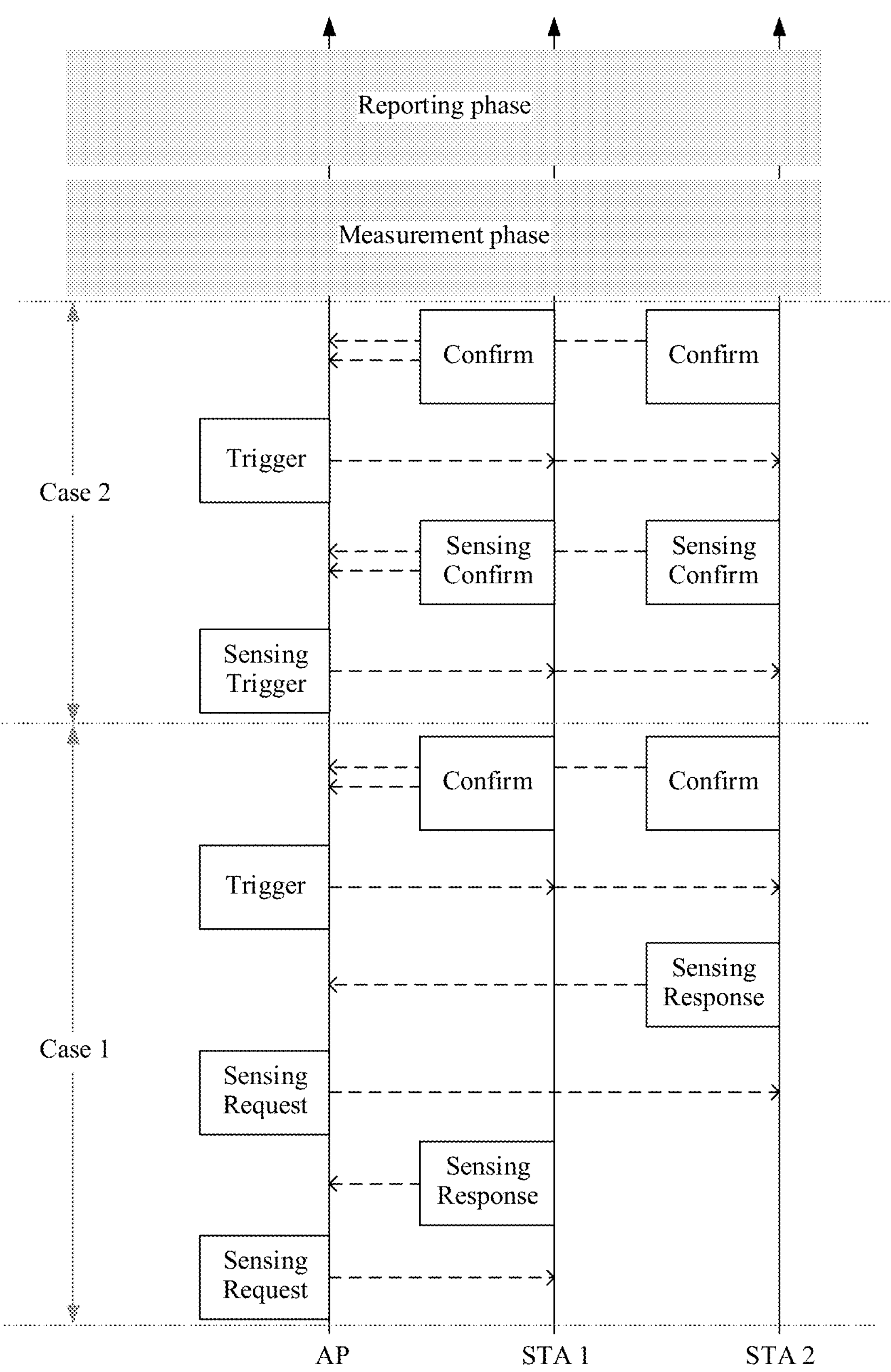
FIG. 7*f* is a schematic diagram of another application scenario according to this application.

In an application scenario, FIG. 7*f* is an application scenario according to an embodiment of this application. In this application scenario, the AP is an initiator, and the STA 1 and the STA 2 are the second STAs associated with the AP.

In case 1 in FIG. 7*f*, the AP sends the third frame (for example, the sensing request frame) in structure 2 in the foregoing 701 to both the STA 1 and the STA 2. After receiving the third frame (for example, the sensing request frame) in structure 2, the STA 1 sends the fourth frame (for example, the sensing response frame) in structure 2 in the foregoing operation 702 to the AP, to confirm to participate in the sensing session. After receiving the third frame (for example, the sensing request frame) in structure 2, the STA 2 sends the fourth frame (for example, the sensing response frame) in structure 2 in the foregoing operation 702 to the AP, to confirm to participate in the sensing session. Further, the AP determines the STA 1 and the STA 2 as the first STAs participating in the sensing session, and the AP sends (for example, sends by broadcast) the first frame (for example, the Trigger frame) to the STA 1 and the STA 2, to configure a role and a sensing parameter for both the STA 1 and the STA 2 to participate in the sensing session. After receiving the first frame, the STA 1 sends the second frame (for example, the Confirm frame) to the AP, and confirms to accept the first information that is in the first frame and that is configured by the AP for the STA 1. After receiving the first frame, the STA 2 sends the second frame to the AP, and confirms to accept the first information that is in the first frame and that is configured by the AP for the STA 2.

In case 2 in FIG. 7*f*, the AP sends the third frame (for example, the sensing trigger frame) in structure 1 in the foregoing 701 to both the STA 1 and the STA 2. After receiving the third frame (for example, the sensing trigger frame) in structure 1, the STA 1 sends the fourth frame (for example, the sensing confirm frame) in structure 1 in the foregoing operation 702 to the AP, to confirm to participate in the sensing session. After receiving the third frame (for example, the sensing trigger frame) in structure 1, the STA 2 sends the fourth frame (for example, the sensing confirm frame) in structure 1 in the foregoing operation 702 to the AP, to confirm to participate in the sensing session. Further, the AP determines the STA 1 and the STA 2 as the first STAs participating in the sensing session, and the AP sends (for example, sends by broadcast) the first frame (for example, the Trigger frame) to the STA 1 and the STA 2, to configure a role and a sensing parameter for both the STA 1 and the STA 2 to participate in the sensing session. After receiving the first frame, the STA 1 sends the second frame (for example, the Confirm frame) to the AP, and confirms to accept the first information that is in the first frame and that is configured by the AP for the STA 1. After receiving the first frame, the STA 2 sends the second frame to the AP, and confirms to accept the first information that is in the first frame and that is configured by the AP for the STA 2.

In conclusion, the AP sends, to the plurality of second STAs, the third frame used to request the second STA to participate in the sensing session. After receiving the third frame, each second STA sends, to the AP, the fourth frame indicating whether the second STA confirms to participate in the sensing session (that is, the third information). Further, the AP may determine, from the plurality of second STAs based on the third information sent by each second STA, the first STA participating in the sensing session. This reduces devices participating in the session sensing, and saves communication transmission resources.

Figure 8A:
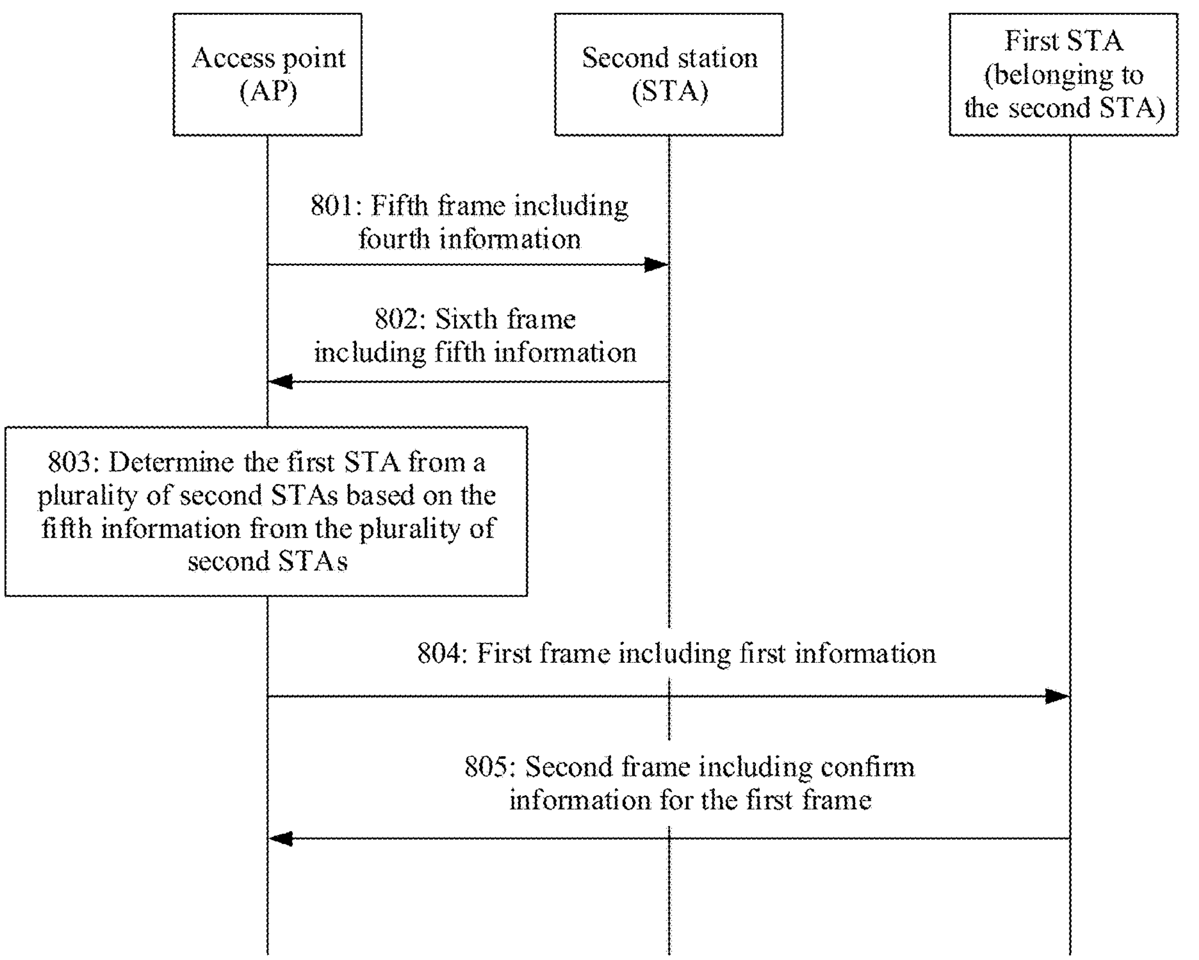
FIG. 8*a* is a flowchart of still another sensing session establishment method according to this application.

FIG. 8*a* is a schematic flowchart of still another sensing session establishment method according to an embodiment of this application. As shown in FIG. 8*a*, the sensing session establishment method includes the following operation 801 to operation 805. The method shown in FIG. 8*a* may be performed by an AP and a STA. Alternatively, the method shown in FIG. 8*a* may be performed by a chip in an AP and a chip in a STA. In FIG. 8*a*, an example in which the method is performed by the AP and the STA is used for description.

In operation 801: the AP sends a fifth frame to a plurality of second STAs, where the fifth frame includes fourth information, and the fourth information is used to request the second STA to participate in the sensing session by using a third role and a fourth sensing parameter.

In other words, when the AP sends the fourth information to the plurality of second STAs to request each of the plurality of second STAs to participate in the sensing session, for each of the plurality of second STAs, the AP allocates, to each second STA, a role (that is, the third role) and a sensing parameter (that is, the fourth sensing parameter) of the second STA participating in the sensing session. For example, the STA 1 and the STA 2 are STAs associated with the AP, and the AP sends the fifth frame to the STA 1 and the STA 2, to request the STA 1 and the STA 2 to participate in the sensing session, and indicates that a role of the STA 1 participating in the sensing session is a receiver, and a role of the STA 2 participating in the sensing session is a transmitter. In this case, the fourth information in the fifth frame corresponding to the STA 1 includes: The third role is a receiver, and the fourth sensing parameter is receiving 10 data packets every 1 ms. The fourth information in the fifth frame corresponding to the STA 2 includes: The third role is a transmitter, and the fourth sensing parameter is sensing 10 data packets every 1 ms.

It should be learned that, that the AP sends a fifth frame to a plurality of second STAs may be understood as that the AP sends the fifth frame to all second STAs, to request all the second STAs to participate in the sensing session; or may be understood as that the AP determines a plurality of second STAs (a part of second STAs) from all the second STAs, and sends the fifth frame to the plurality of second STAs (the part of second STAs), to request the plurality of second STAs (the part of second STAs) to participate in the sensing session. This is not specifically limited in this application.

The following describes a frame structure of the fifth frame in detail.

Structure 1: The fifth frame includes a sensing request element field, and the fourth information is located in the sensing request element field.

For example, for the frame structure of the fifth frame, refer to the schematic diagram of the frame structure shown in FIG. 6*e*. The fifth frame is a sensing request (Sensing Request) frame, the sensing request (Sensing Request) frame includes a sensing request element (Sensing Request Element) field, and the fourth information is located in the Sensing Request Element field. In an embodiment, for specific descriptions of the fifth frame, refer to the foregoing related descriptions of the fields included in the frame structure shown in FIG. 6*e*. Details are not described herein again.

It should be learned that, for the fifth frame described in structure 1, the AP may send the fifth frame to each second STA in a one-by-one sending manner.

Structure 2: The fifth frame includes a common information (Common Info) field and a user information (User Info) field, and the fourth information is located in the common information (Common Info) field and/or the user information (User Info) field.

In this case, the common information field is used to configure the same parameter information of the STAs participating in the sensing session, and may be understood as configuration information shared by the STAs participating in the sensing session in the fourth information, that is, common parameter information. User information fields are in a one-to-one correspondence with the STAs participating in the sensing session, and the user information field is used to configure the configuration content specific to the STAs participating in the sensing session, and may be understood as parameter information specific to the STAs participating in the sensing session in the fourth information, that is, parameter information other than the common parameter information in the fourth information.

Figures 1, 8B:
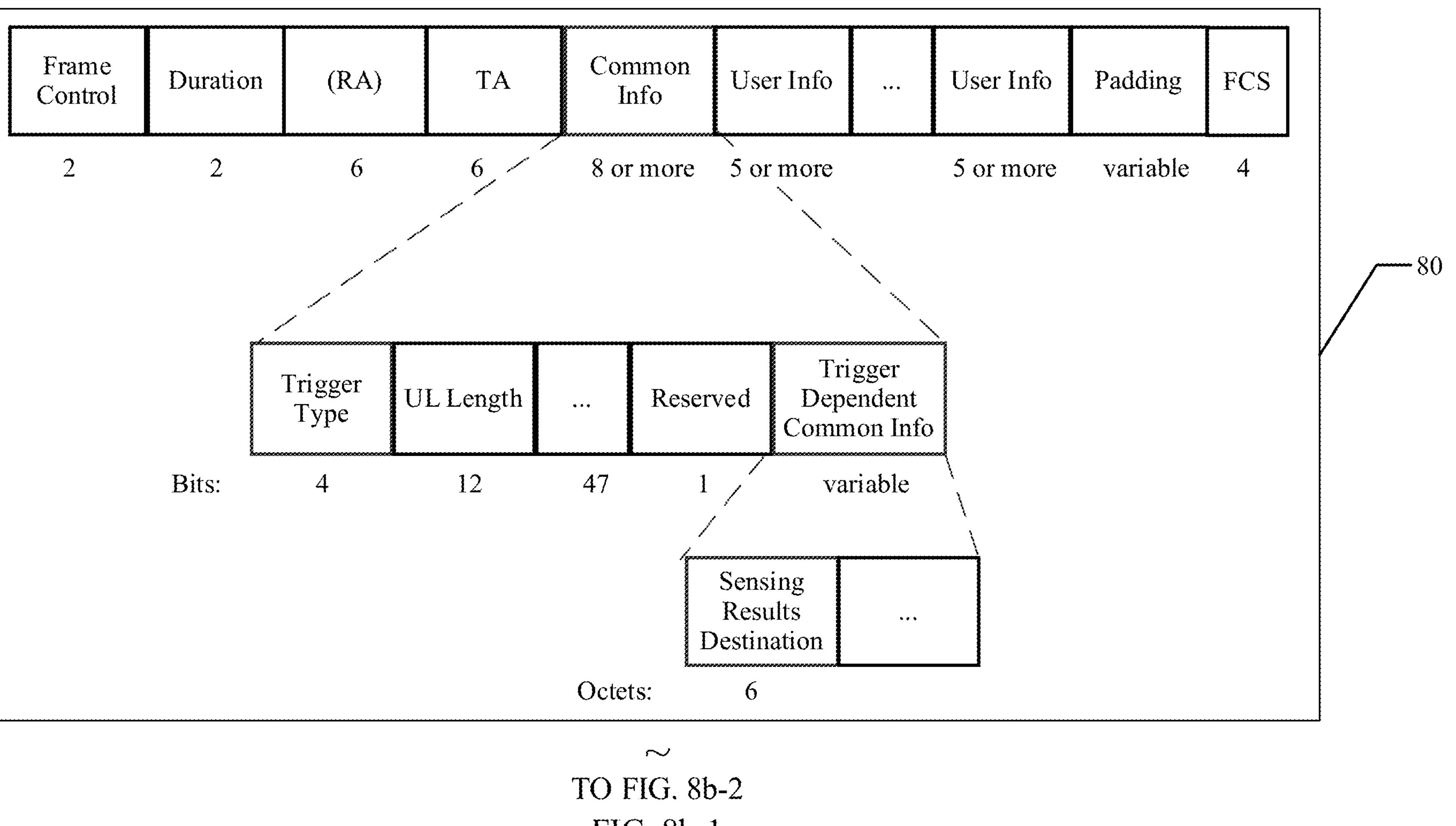

For example, FIG. 8*b*-1 and FIG. 8*b*-2 are a schematic diagram of a frame structure of the fifth frame according to this application. The fifth frame is a trigger (Trigger) frame, and the Trigger frame includes a common information (Common Info) field and a user information (User Info) field. The following describes in detail the Common Info field and the User Info field of the fifth frame.

1. Common Info Field

FIG. 8*b*-1 and FIG. 8*b*-2 are a schematic diagram of an expanded structure of the Common Info field of the fifth frame shown by a module 80. The Common Info field includes a trigger type subfield and a trigger dependent common info subfield. For specific structures of the Trigger Type subfield and the Trigger Dependent Common Info subfield, refer to descriptions of related fields of the module 60 in FIG. 6*b*-1 and FIG. 6*b*-2 in the foregoing 601. Details are not described herein again.

2. User Info Field

FIG. 8*b*-1 and FIG. 8*b*-2 are a schematic diagram of an expanded structure of the User Info field of the fifth frame shown by a module 81. The User Info field includes a trigger dependent user info subfield. The Trigger Dependent User Info subfield is used to configure specific fourth information (which may be understood as parameter information other than the common parameter information of the STA) corresponding to the STA in the fourth information. The Trigger Dependent User Info subfield may include a sensing request info subfield and a sensing type subfield.

2.1 Sensing Request Info Subfield

The Sensing Request Info subfield includes a sensing request info subfield, a sensing role indication subfield, and a sensing feedback type subfield.

The Sensing Request Indication subfield indicates to request a device to participate in the sensing session. For example, when a field value of the Sensing Request Indication subfield is 1, it indicates that the fifth frame is used to request whether the device is willing to participate in the sensing session. It should be learned that, when the STA receiving the fifth frame has confirmed to participate in the sensing session, the fifth frame may not include the sensing request indication subfield. For example, when the AP considers (or learns) that the STA 1 participates in the sensing session by default, and the AP needs only to allocate a sensing parameter or a role to the STA 1, the fifth frame sent by the AP to the STA 1 may not include the sensing request indication subfield requesting the STA 1 to participate in the sensing session.

The Sensing Roles Indication subfield indicates a role function. For example, the Sensing Roles Indication subfield includes two bits. When a value of the two bits is 00, it indicates that a role is a receiver (or may be a transmitter); when a value of the two bits is 01, it indicates that a role is a transmitter (or may be a receiver); or when a value of the two bits is 10, it indicates that a role is both a receiver and a transmitter (self-sending and self-receiving). It should be learned that, when the device (for example, the STA) receiving the fifth frame already learns the role of the device participating in the sensing session, the fifth frame may not include the Sensing Roles Indication subfield.

The Sensing Feedback Type subfield indicates that the feedback type is CSI, compressed CSI, a final result, or the like to feed back a result. 0 indicates original CSI feedback; 1 indicates compressed CSI feedback; 2 indicates final result speed information; 3 indicates final result angle information; 4 indicates final result distance information; and the like. It should be learned that when the receiver is an initiator (that is, may be understood as a device receiving the measurement result), the fifth frame received by the receiver does not include the sensing feedback type (Sensing Feedback Type) subfield; or when the AP considers by default that the STA serving as the receiver already learns the type of the measurement result fed back (or when the type of the measurement result fed back is a default type), the fifth frame received by the receiver does not include the sensing feedback type subfield. It should be learned that when the device receiving the fifth frame is an initiator (that is, may be understood as a device receiving the measurement result), the fifth frame received by the device does not include the Sensing Feedback Type subfield; or when the AP considers by default that the STA serving as the receiver already learns the type of the measurement result fed back (or when the type of the measurement result fed back is a default type), the fifth frame received by the receiver does not include the Sensing Feedback Type subfield.

2.2 Sensing Type Subfield

The Sensing Type subfield indicates a data sending type (which may be understood as the foregoing operation parameter). For example, the Sensing Type subfield indicates two data sending types: a burst-based type or a continuous sending-based type. For the burst-based type, the Sensing Type subfield includes a pattern subfield, a group measurement duration (Group measurement duration) subfield, a number of group subfield, and an interval between group subfield. It can be learned that, in the burst-based type, the Sensing Type subfield indicates sending duration, a quantity of sending times in a group, and an interval between groups. For the continuous sending-based type, the Sensing Type subfield includes a value of a pattern subfield, a measurement duration (Measurement duration) subfield, and a number subfield. In the continuous sending-based type, the Sensing Type subfield indicates information such as total sending duration, a total quantity of sent data packets, and a packet/beam sending period/interval.

For example, in the burst-based type, the Sensing Type subfield includes a pattern subfield, a group measurement duration subfield, a number of group subfield, and an interval between group subfield. The pattern subfield indicates a frequency pattern for sending data based on a burst. For example, when a field value of the pattern subfield is 0, it indicates that sending is performed at a low frequency. When a field value of the pattern subfield is 1, it indicates that sending is performed at a high frequency. The group measurement duration subfield indicates sending duration of a single packet group. The number of group subfield indicates a quantity of sent NDPs in a single packet group. The interval between group subfield indicates an interval between packet groups.

It should be learned that, when the receiver is an initiator (that is, may be understood as a device receiving the measurement result), the fifth frame received by the receiver may not include the sensing type subfield; or when the AP considers by default that the STA serving as the receiver already learns the data sending type (or understood that the data sending type is a default type), the fifth frame received by the receiver may not include the sensing type subfield.

It should be learned that, for the fifth frame described in structure 1, the AP may send the fifth frame to all second STA in a unified sending (or understood as broadcast) manner, and it may be understood that all the second STA simultaneously receives the fifth frame.

802: The AP receives a sixth frame from the plurality of second STAs, where the sixth frame includes fifth information, and the fifth information indicates whether the second STA confirms to participate in the sensing session by using the third role and the fourth sensing parameter.

For each of the plurality of second STAs, after the second STA receives the fifth frame sent by the AP, the second STA determines, based on an actual situation of the second STA (a current task of the STA, a capability of a processor, or the like), whether to participate in the sensing session by using the third role and the fourth sensing parameter that are allocated to the fifth frame. For example, the STA 1 is a second STA associated with the AP, and the fourth information corresponding to the STA 1 indicates that the third role is a transmitter, and the fourth sensing parameter is sending 10 data packets every 1 ms. In this case, the fifth information fed back by the STA 1 to the AP may include the following: 1. The STA 1 confirms to participate in the sensing session as a transmitter (that is, the third role) and by sending 10 data packets every 1 ms (the fourth sensing parameter). 2. The STA 1 confirms to participate in the sensing session as a transmitter (that is, the third role), but cannot transmit a sensing signal by sending 10 data packets every 1 ms (the fourth sensing parameter). When the STA accepts the third role configured by the AP by using the fourth information but does not accept the fourth sensing parameter, the fifth information may further include a suggested sensing parameter corresponding to the third role fed back by the STA. For example, when the STA 1 confirms to participate in the sensing session as the transmitter (that is, the third role), but cannot transmit the sensing signal by sending 10 data packets every 1 ms (the fourth sensing parameter), it is suggested that the data packets are sent by sending five data packets every 1 ms (that is, the suggested sensing parameter). 3. The STA 1 refuses to participate in the sensing session.

The following describes in detail the sixth frame based on the two structures of the fifth frame in the foregoing operation 801.

Structure 1: The sixth frame includes a sensing response element field, and the fifth information is located in the sensing response element field.

The frame structure of the sixth frame corresponds to structure 1 "the fifth frame includes a sensing request element field, and the fourth information is located in the sensing request element field" in the foregoing operation 801.

For example, FIG. 6*g* is a schematic diagram of a structure of the sixth frame according to this application. The sixth frame is a sensing response frame. The Sensing Response frame includes a sensing response element subfield, and the fifth information is located in the Sensing Response Element subfield. Specifically, for specific descriptions of the sixth frame, refer to the foregoing related descriptions of the fields included in the frame structure shown in FIG. 6*g*. Details are not described herein again.

Structure 2: The sixth frame includes a confirm element field, and the fifth information is located in the confirm element field.

The frame structure of the sixth frame corresponds to structure 2 "the fifth frame includes a common info field and a user info field, and the fourth information is located in the common info field and/or the user info field" in the foregoing operation 801.

For example, FIG. 6*f* is a schematic diagram of a frame structure of the sixth frame according to this application. The sixth frame is a confirm (Confirm) frame, the Confirm frame includes a confirm element field, and the fifth information is configured in the Confirm Element field. In an embodiment, the Confirm Element field may include a confirm info subfield and a parameter modification subfield.

1. Confirm Indication Subfield

A value of the confirm indication subfield indicates whether the STA agrees to participate in the sensing session. For example, when a field value of the Confirm Indication subfield is 0, it indicates that the STA does not agree to participate in the sensing session; when a field value of the Confirm Indication subfield is 1, it indicates that the STA agrees to participate in the sensing session, and accepts the fourth sensing parameter allocated by the AP by using the fifth frame; or when a field value of the Confirm Indication subfield is 2, it indicates that the STA agrees to participate in the sensing session, but does not accept the fourth sensing parameter allocated by the AP by using the fifth frame.

2. Parameter Modification Subfield

When a field value of the Confirm Indication subfield is 2, that is, the STA agrees to participate in the sensing session, but does not accept the fourth sensing parameter allocated by the AP by using the fifth frame, the Parameter Modification subfield includes a suggested (or recommended) parameter fed back by the STA by using the sixth frame.

It should be learned that, when a field value of the Confirm Indication subfield indicates that the STA does not agree to participate in the sensing session, or a field value of the Confirm Indication subfield indicates that the STA agrees to participate in the sensing session and accepts the first sensing parameter allocated by the AP by using the fifth frame, the sixth frame may not include the parameter modification subfield.

In operation 803: the AP determines the first STA from the plurality of second STAs based on the fifth information from the plurality of second STAs.

It can be learned from the process of participating in the sensing session for sensing in FIG. 3 that there may be at least one transmitter and at least one receiver in a sensing session, to form at least one complete communication link. For each of the plurality of second STAs, after the second STA receives the fifth frame sent by the AP, the fifth indication information fed back by the second STA may include the following content: 1. The second STA confirms to participate in the sensing session by using the third role and the fourth sensing parameter; 2. The second STA confirms to participate in the sensing session by using the third role, but does not participate in the sensing session by using the fourth sensing parameter; and 3. The second STA participates in the sensing session.

To form at least one complete communication link of the sensing signal, regardless of whether the AP participates in receiving/sending of the sensing signal, first STAs determined by the AP from the plurality of second STAs include at least one first STA whose role is a receiver and at least one first STA whose role is a transmitter.

In other words, in an embodiment, the fifth information from the third STA indicates that the third STA confirms to participate in the sensing session based on the third role corresponding to the third STA and the fourth sensing parameter. In addition, when the fifth information from the fourth STA indicates that the fourth STA participates in the sensing session based on the third role corresponding to the fourth STA and the fourth sensing parameter, the AP determines the third STA and the fourth STA as the first STAs. The third STA is one of the plurality of second STAs, and a third role corresponding to the third STA is a receiver in the sensing session. The fourth STA is one of the plurality of fourth STAs, and a third role corresponding to the fourth STA is a transmitter in the sensing session.

For example, the AP does not participate in receiving/sending of the sensing signal, and the STA 1, the STA 2, and the STA 3 are the plurality of second STAs associated with the AP. The AP sends a fifth frame to the STA 1, the STA 2, and the STA 3, to request the STA 1, the STA 2, and the STA 3 to participate in the sensing session. Fourth information sent by the AP to the STA 1 by using the fifth frame indicates that the third role is a transmitter, and the fourth sensing parameter is sending 10 data packets every 1 ms. Fourth information sent by the AP to the STA 2 by using the fifth frame indicates that the third role is a receiver, and the fourth sensing parameter is receiving 10 data packets every 1 ms. Fourth information sent by the AP to the STA 3 by using the fifth frame indicates that the third role is a receiver, and the fourth sensing parameter is receiving 10 data packets every 1 ms. If the STA 1 sends a sixth frame to the AP, the STA 1 confirms to participate in the sensing session as a transmitter (the third role corresponding to the STA 1) and by sending 10 data packets every 1 ms (the fourth sensing parameter corresponding to the STA 1). If the STA 2 sends a sixth frame to the AP, the STA 2 confirms to participate in the sensing session as a receiver (the third role corresponding to the STA 2) and by receiving 10 data packets every 1 ms (the fourth sensing parameter corresponding to the STA 2). If the STA 3 sends a sixth frame to the AP, the STA 3 confirms to participate in the sensing session as a receiver (the third role corresponding to the STA 3) and by receiving 10 data packets every 1 ms (the fourth sensing parameter corresponding to the STA 3). In this case, the AP determines the STA 1, the STA 2, and the STA 3 as the first STAs participating in the sensing session.

In another embodiment, when the AP participates in receiving/sending of the sensing signal (that is, the AP is a transmitter and/or a receiver), the AP may determine the first STA from the plurality of second STAs based on a role of the AP in the sensing session and the fifth information from the plurality of second STAs.

Specifically, there may be a case in which the AP is a transmitter and a case in which the AP is a receiver. The following describes the two cases in detail.

Case 1: The role of the AP in the sensing session is a transmitter.

In a sensing scenario corresponding to this possible case, the AP is a non-independent sensing initiator (in this case, the AP is an initiator and a transmitter), or the AP is a transmitter in the sensing session. In this case, to form at least one complete communication link of a sensing signal, first STAs determined by the AP include at least one first STA whose corresponding role is a receiver.

In other words, when the role of the AP in the sensing session is a transmitter, and the fifth information from the fifth STA indicates that the fifth STA participates in the sensing session based on the third role corresponding to the fifth STA, the AP determines the fifth STA as the first STA. The fifth STA is one of the plurality of second STAs, and the third role corresponding to the fifth STA is a receiver in the sensing session.

That the fifth information from the fifth STA indicates that the fifth STA participates in the sensing session based on the third role corresponding to the fifth STA includes the following two possible cases.

In an embodiment, if the fifth information from the fifth STA indicates that the fifth STA participates in the sensing session based on the third role and the fourth sensing parameter, the AP determines the fifth STA as the first STA. The fifth STA is one of the plurality of second STAs, and the third role corresponding to the fifth STA is a receiver in the sensing session. In this possible case, the AP determines the fifth STA as the first STA, determines the third role corresponding to the fifth STA as the first role of the fifth STA participating in the sensing session, and determines the fourth sensing parameter corresponding to the fifth STA as the first sensing parameter of the fifth STA participating in the sensing session.

For example, in the sensing session, the AP is a sensing signal transmitter, and the STA 1 and the STA 2 are the plurality of second STAs associated with the AP. The AP sends a fifth frame to the STA 1 and the STA 2, to request the STA 1 and the STA 2 to participate in the sensing session, and allocates a third role and a fourth sensing parameter to both the STA 1 and the STA 2. The AP receives the fifth information sent by the STA 1 and the STA 2. The fifth information sent by the STA 1 to the AP indicates that the STA 1 confirms to participate in the sensing session as a receiver (the third role corresponding to the STA 1) and by receiving 10 data packets every 1 ms (the fourth sensing parameter corresponding to the STA 1). The fifth information sent by the STA 2 to the AP indicates that the STA 2 refuses to participate in the sensing session as a transmitter (the third role corresponding to the STA 2) and by sending 10 data packets every 1 ms (the fourth sensing parameter corresponding to the STA 2). It can be learned that, although only a part of the plurality of second STAs confirm to participate in the sensing session, the STA 1 (that is, the fifth STA) in the part of the second STAs confirms to participate in the sensing session as a receiver, and the AP needs to determine the STA 1 as a STA (that is, the first STA) participating in the sensing session, and determine the fourth sensing parameter (that is, receiving 10 data packets every 1 ms) of the STA 1 as the first sensing parameter.

In another embodiment, if the fifth information from the fifth STA indicates that the fifth STA participates in the sensing session based on the third role, but does not participate in the sensing session based on the fourth sensing parameter corresponding to the fifth STA, the AP determines the fifth STA as the first STA. The fifth information further includes a suggested parameter (that is, a fifth sensing parameter) of the fifth STA participating in the sensing session by using the third role. In this possible case, the AP determines the fifth STA as the first STA, and determines the fifth sensing parameter fed back by the fifth STA as the first sensing parameter of the fifth STA participating in the sensing session.

For example, in the sensing session, the AP is a sensing signal transmitter, and the STA 1 and the STA 2 are the plurality of second STAs associated with the AP. The AP sends a fifth frame to the STA 1 and the STA 2, to request the STA 1 and the STA 2 to participate in the sensing session, and allocates a third role and a fourth sensing parameter to both the STA 1 and the STA 2. The AP receives the fifth information sent by the STA 1 and the STA 2. The fifth information sent by the STA 1 to the AP indicates that the STA 1 confirms to participate in the sensing session as a receiver (the third role corresponding to the STA 1), but the STA 1 refuses to participate in the sensing session by receiving 10 data packets every 1 ms (the fourth sensing parameter corresponding to the STA 1). It is recommended that the STA 1 participates in the sensing session by receiving 5 data packets every 1 ms (the fifth sensing parameter fed back by the STA 1). The fifth information sent by the STA 2 to the AP indicates that the STA 2 refuses to participate in the sensing session as a transmitter (the third role corresponding to the STA 2) and by sending 10 data packets every 1 ms (the fourth sensing parameter corresponding to the STA 2). The AP determines the STA 1 as a STA (that is, the first STA) participating in the sensing session, and determines the fifth sensing parameter of the STA 1 (receiving five data packets every 1 ms) as the first sensing parameter.

Case 2: The role of the AP in the sensing session is a receiver.

In a sensing scenario corresponding to this possible case, the AP is a non-independent sensing initiator (in this case, the AP is an initiator and a receiver), or the AP is a receiver in the sensing session. In this case, to form at least one complete communication link of a sensing signal, first STAs determined by the AP include at least one first STA whose corresponding role is a transmitter.

In other words, when the role of the AP in the sensing session is a receiver, and the fifth information from the sixth STA indicates that the sixth STA participates in the sensing session based on the third role corresponding to the sixth STA, the AP determines the sixth STA as the first STA. The sixth STA is one of the plurality of second STAs, and a third role corresponding to the sixth STA is a transmitter in the sensing session.

That the fifth information from the sixth STA indicates that the sixth STA participates in the sensing session based on the third role corresponding to the sixth STA includes the following two possible cases.

In an embodiment, if the fifth information from the sixth STA indicates that the sixth STA participates in the sensing session based on the third role and the fourth sensing parameter, the AP determines the sixth STA as the first STA. The sixth STA is one of the plurality of second STAs, and the third role corresponding to the sixth STA is a transmitter in the sensing session. In this possible case, the AP determines the sixth STA as the first STA, determines the third role corresponding to the sixth STA as the first role of the sixth STA participating in the sensing session, and determines the fourth sensing parameter corresponding to the sixth STA as the first sensing parameter of the sixth STA participating in the sensing session.

For example, in the sensing session, the AP is a sensing signal receiver, and the STA 1 and the STA 2 are the plurality of second STAs associated with the AP. The AP sends a fifth frame to the STA 1 and the STA 2, to request the STA 1 and the STA 2 to participate in the sensing session, and allocates a third role and a fourth sensing parameter to both the STA 1 and the STA 2. The AP receives the fifth information sent by the STA 1 and the STA 2. The fifth information sent by the STA 1 to the AP indicates that the STA 1 refuses to participate in the sensing session as a receiver (the third role corresponding to the STA 1) and by receiving 10 data packets every 1 ms (the fourth sensing parameter corresponding to the STA 1). The fifth information sent by the STA 2 to the AP indicates that the STA 2 confirms to participate in the sensing session as a transmitter (the third role corresponding to the STA 2) and by sending 10 data packets every 1 ms (the fourth sensing parameter corresponding to the STA 2). The AP determines the STA 2 as a STA (that is, the first STA) participating in the sensing session, and determines the fourth sensing parameter of the STA 2 (sending 10 data packets every 1 ms) as the first sensing parameter.

In another embodiment, if the fifth information from the sixth STA indicates that the sixth STA participates in the sensing session based on the third role, but does not participate in the sensing session based on the fourth sensing parameter corresponding to the sixth STA, the AP determines the sixth STA as the first STA. The fifth information further includes a suggested parameter (that is, a fifth sensing parameter) of the sixth STA participating in the sensing session by using the third role. In this possible case, the AP determines the sixth STA as the first STA, and determines the fifth sensing parameter fed back by the sixth STA as the first sensing parameter of the sixth STA participating in the sensing session.

For example, in the sensing session, the AP is a sensing signal receiver, and the STA 1 and the STA 2 are the plurality of second STAs associated with the AP. The AP sends a fifth frame to the STA 1 and the STA 2, to request the STA 1 and the STA 2 to participate in the sensing session, and allocates a third role and a fourth sensing parameter to both the STA 1 and the STA 2. The AP receives the fifth information sent by the STA 1 and the STA 2. The fifth information sent by the STA 1 to the AP indicates that the STA 1 refuses to participate in the sensing session as a receiver (the third role corresponding to the STA 1) and by receiving 10 data packets every 1 ms (the fourth sensing parameter corresponding to the STA 1). The fifth information sent by the STA 2 to the AP indicates that the STA 2 confirms to participate in the sensing session as a transmitter (the third role corresponding to the STA 2), but refuses to participate in the sensing session by sending 10 data packets every 1 ms (the fourth sensing parameter corresponding to the STA 2). It is recommended that the STA 2 participates in the sensing session by sending 5 data packets every 1 ms (the fifth sensing parameter fed back by the STA 2). The AP determines the STA 2 as a STA (that is, the first STA) participating in the sensing session, and determines the fifth sensing parameter of the STA 2 (sending 5 data packets every 1 ms) as the first sensing parameter.

It should be noted that, if a complete communication link of a sensing signal cannot be formed in one sensing session, the AP may reallocate a role or a sensing parameter of each second STA by using the fifth frame according to operation 801. This is not discussed in this application.

In operation 804: the AP sends a first frame to a first STA, where the first frame includes first information, and the first information indicates a first role of the first STA in a sensing session.

In operation 805: the AP receives a second frame from the first STA, where the second frame includes confirm information for the first frame.

For specific implementations of operations 804 and 805, refer to the specific implementations of operations 601 and 602. Details are not described herein again in this application.

Figure 8C:
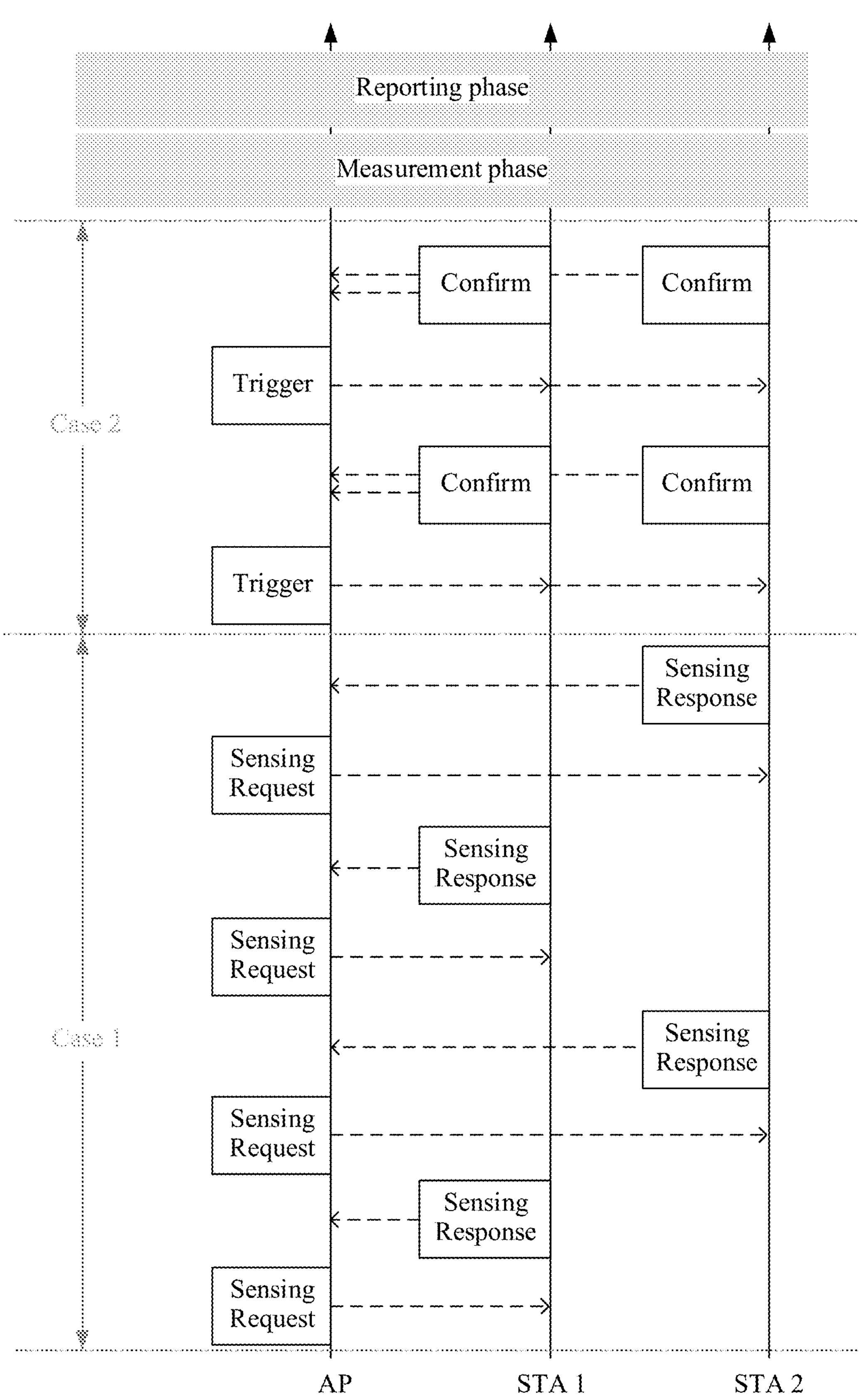
FIG. 8*c* is a schematic diagram of still another application scenario according to this application.

In a scenario, FIG. 8*c* is an application scenario according to an embodiment of this application. In this application scenario, the AP is an initiator, and the STA 1 and the STA 2 are the second STAs associated with the AP.

As shown in case 1 in FIG. 8*c*, the AP sends the fifth frame (for example, the sensing request frame in structure 1) in the foregoing 801 to both the STA 1 and the STA 2, configures the third role and the fourth sensing parameter of the STA 1 participating in the sensing session, and configures the third role and the fourth sensing parameter of the STA 2 participating in the sensing session. After receiving the fifth frame (for example, the sensing request frame in structure 1), the STA 1 sends the sixth frame (for example, the sensing response frame in structure 1) in the foregoing 802 to the AP, and feeds back, to the AP, whether the STA 1 participates in the sensing session by using the third role and the fourth sensing parameter corresponding to the STA 1. After receiving the fifth frame (for example, the sensing request frame in structure 1), the STA 2 sends the sixth frame (for example, the sensing response frame in structure 1) in the foregoing 802 to the AP, and feeds back, to the AP, whether the STA 2 participates in the sensing session by using the third role and the fourth sensing parameter corresponding to the STA 2. The AP determines, based on the sixth frame fed back by the STA 1 and the STA 2, whether to reallocate a role and/or a parameter. When the AP needs to reallocate a role or a sensing parameter of the STA 1 and/or the STA 2, the AP sends the fifth frame (for example, the sensing request frame in structure 1) in the foregoing 801 again to the STA 1 and the STA 2, configures the third role and the fourth sensing parameter of the STA 1 participating in the sensing session, and configures the third role and the fourth sensing parameter of the STA 2 participating in the sensing session until the sixth frame sent by the STA 1 to the AP indicates that the STA 1 confirms to participate in the sensing session by using the third role and the fourth sensing parameter that correspond to the STA 1, and/or the sixth frame sent by the STA 2 to the AP indicates that the STA 2 confirms to participate in the sensing session by using the third role and the fourth sensing parameter that correspond to the STA 2.

Similarly, in case 2 in FIG. 8*c*, the AP sends the fifth frame (for example, a trigger frame) in structure 2 in the foregoing 801 to both the STA 1 and the STA 2, configures the third role and the fourth sensing parameter of the STA 1 participating in the sensing session, and configures the third role and the fourth sensing parameter of the STA 2 participating in the sensing session until the STA 1 sends the sixth frame (for example, a confirm frame) in structure 2 in the foregoing 802 to the AP, and confirms to participate in the sensing session by using the third role and the fourth sensing parameter that correspond to the STA 1; and/or the STA 2 sends the sixth frame (for example, a confirm frame) in structure 2 in the foregoing 802 to the AP until the STA 2 confirms to participate in the sensing session by using the third role and the fourth sensing parameter that correspond to the STA 2.

In conclusion, when the AP sends, to the plurality of second STAs, the fifth frame used to request the second STA to participate in the sensing session, the fifth frame further configures a role and a sensing parameter for each second STA to participate in the sensing session. After each second STA receives the fifth frame, each second STA sends, to the AP, the sixth frame indicating whether the second STA confirms to participate in the sensing session. Further, the AP may determine, from the plurality of second STAs based on the sixth frame sent by each second STA, the first STA participating in the sensing session. This reduces devices participating in the session sensing, and saves communication transmission resources.

It should be noted that, in this application, content carried in each frame is merely described as an example, and it may be considered that deletion, addition, or modification of content carried in a frame according to the frame structure described in the present invention of this application falls within the protection scope of this application. For example, in the session establishment method provided in FIG. 8*a*, the AP sends the fifth frame to the plurality of second STAs, the fifth frame is used to request the plurality of second STAs to participate in the sensing session, and the fifth frame further configures a role for each second STA to participate in the sensing session. For each of the plurality of second STAs, the second STA sends the sixth frame to the AP based on the fifth frame. In an embodiment, content included in the sixth frame includes: When the second STA confirms to participate in the sensing session based on the role allocated in the fifth frame, in addition to indicating that the second frame confirms to participate in the sensing session based on the role allocated in the fifth frame, the sixth frame further indicates a suggested (or supported) sensing parameter that is fed back by the second STA and that participates in the sensing session. When the second STA does not participate in the sensing session based on the role allocated in the fifth frame, in addition to indicating that the second frame does not participate in the sensing session based on the role allocated in the fifth frame, the sixth frame further indicates a suggested (or supported) role and a corresponding sensing parameter that are fed back by the second STA and that participate in the sensing session. When the second STA does not participate in the sensing session, the sixth frame indicates that the second STA does not participate in the sensing session. Further, the AP may determine, from the plurality of second STAs based on the sixth frame fed back by the plurality of second STAs, the first STA participating in the sensing session.

To intuitively understand the sensing session establishment method described in this application, the following describes an application scenario to which the sensing session establishment method is applied. It should be understood that the following application scenario is merely an example for description, and cannot be considered as a limitation on this application.

Figure 9A:
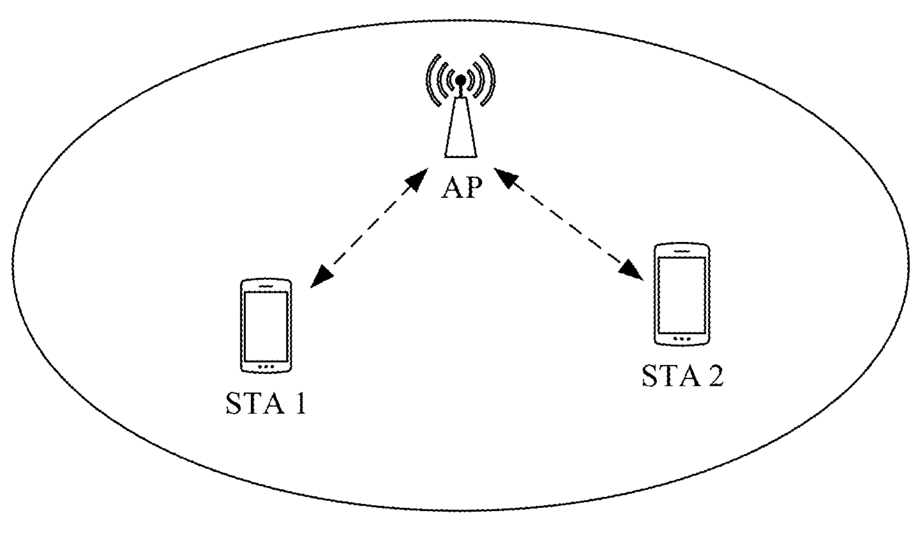
FIG. 9*a* is a schematic diagram of still another sensing application scenario according to this application.

FIG. 9*a* is an application scenario of a sensing session according to this application.

In an application scenario corresponding to FIG. 9*a*, an AP is a non-independent sensing initiator (that is, the AP serves as a sensing initiator, and the AP further participates in receiving/sending of a sensing signal), and a STA 1 and a STA 2 are STAs associated with the AP (that is, the foregoing second STAs). The following uses an example in which the AP serves as a sensing initiator and a sensing signal transmitter for schematic description.

Figure 9B:
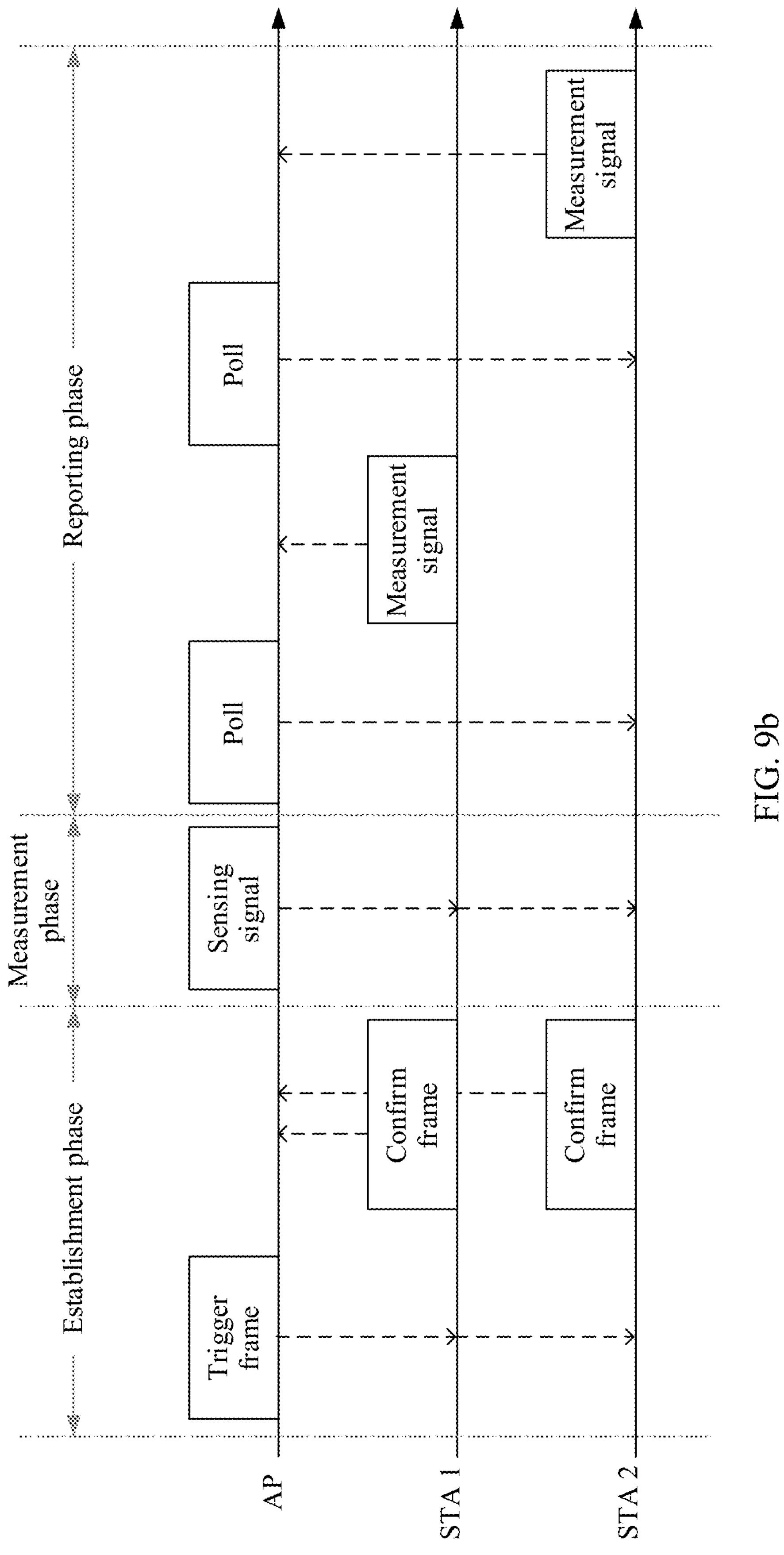
FIG. 9*b* is a schematic diagram of a sensing session according to this application.

In a sensing session establishment phase, if the AP establishes the sensing session by using the method shown in FIG. 6*a*, a schematic diagram of the sensing procedure in the application scenario in FIG. 9*a* is shown in FIG. 9*b*. In the sensing session establishment phase, the AP sends a first frame (a trigger frame in FIG. 9*b*) to the STA 1 and the STA 2 by using the method shown in FIG. 6*a*, and configures a role and a sensing parameter for both the STA 1 and the STA 2 to participate in the sensing session. After receiving the first frame, the STA 1 sends a second frame (for example, a confirm frame in FIG. 9*b*) to the AP, and confirms to accept first information that is in the first frame and that is configured by the AP for the STA 1. After receiving the first frame, the STA 2 sends a second frame to the AP, and confirms to accept first information that is in the first frame and that is configured by the AP for the STA 2. In a measurement phase, the AP sends a sensing signal to the STA 1 and the STA 2. After receiving the sensing signal, the STA 1 and the STA 2 perform signal processing measurement to obtain a measurement result. In a reporting phase, the AP sends a Poll frame to both the STA 1 and the STA 2, so that the STA 1 and the STA 2 send the measurement result to the AP after receiving the Poll frame. It should be noted that, in the reporting phase, the AP may alternatively obtain measurement results of the STA 1 and the STA 2 in a scheduling-based manner (as shown in case 2 in FIG. 5*c*) or a contention-based manner (as shown in case 3 in FIG. 5*c*).

Figure 9C:
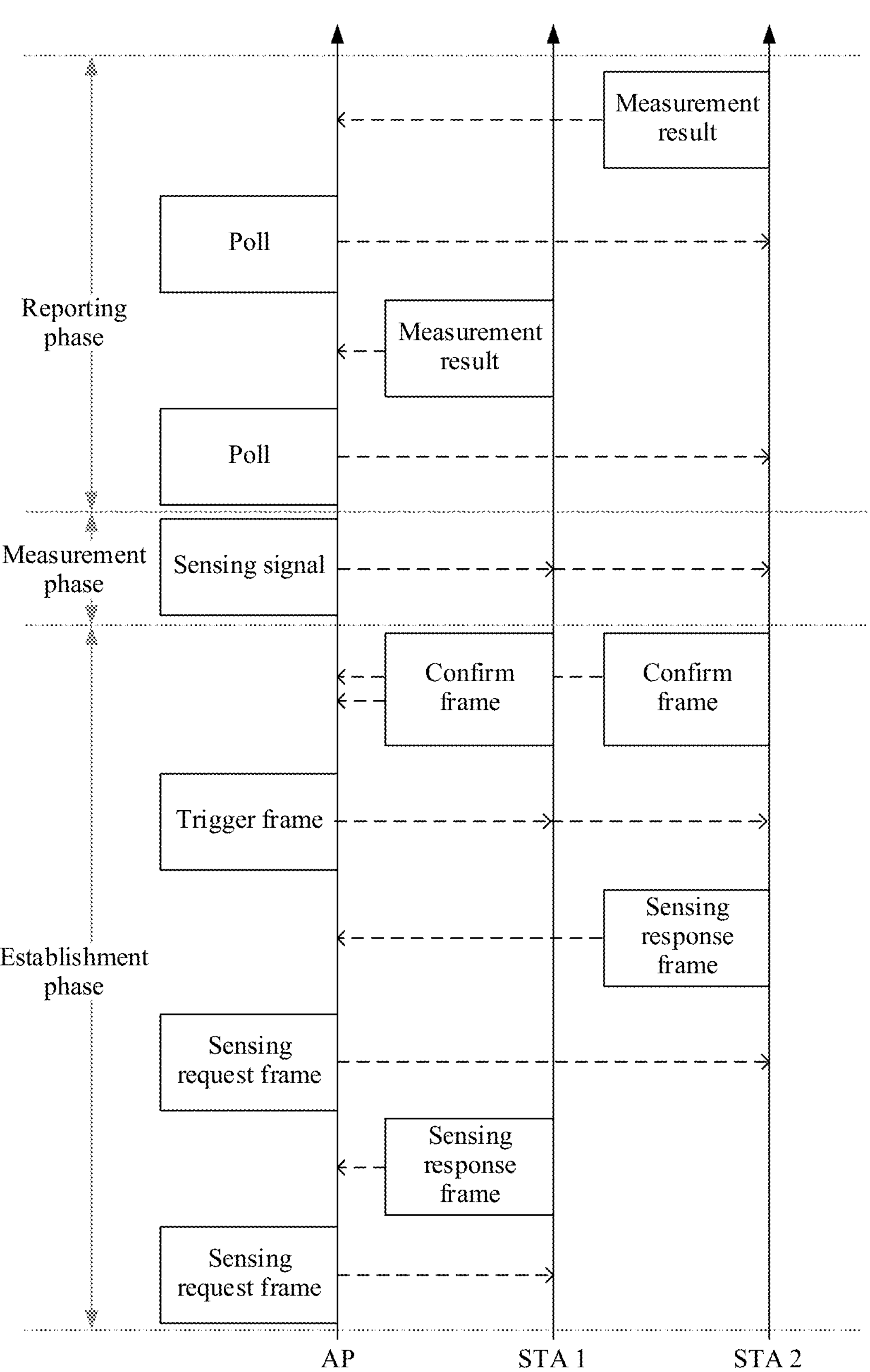
FIG. 9*c* is a schematic diagram of another sensing session according to this application.

In the sensing session establishment phase, if the AP establishes the sensing session by using the method shown in FIG. 7*a*, a schematic diagram of the sensing procedure in the application scenario in FIG. 9*a* is shown in FIG. 9*c*. In the sensing session establishment phase, the AP sends a third frame (a sensing request frame in FIG. 9*c*) to both the STA 1 and the STA 2 by using the method shown in FIG. 7*a*, to request the STA 1 and the STA 2 to participate in the sensing session. After the STA 1 receives the third frame from the AP, the STA 1 sends a fourth frame (for example, a sensing response frame in FIG. 9*c*) to the AP, and indicates, in the fourth frame, a receiving/sending capability of the STA 1 (which may be understood as a role supported in the sensing session) and a corresponding sensing parameter. After the STA 2 receives the third frame from the AP, the STA 2 sends a fourth frame (for example, a sensing response frame in FIG. 9*c*) to the AP, and indicates, in the fourth frame, a receiving/sending capability of the STA 2 (which may be understood as a role supported in the sensing session) and a corresponding sensing parameter. Further, the AP determines the STA 1 and the STA 2 as first STAs participating in the sensing session, and the AP sends (for example, sends by broadcast) a first frame (for example, the Trigger frame) to the STA 1 and the STA 2 based on the fourth frame (for example, a sensing response frame in FIG. 9*c*) fed back by both the STA 1 and the STA 2, to configure a role and a sensing parameter for both the STA 1 and the STA 2 to participate in the sensing session. After receiving the first frame, the STA 1 sends a second frame (for example, the Confirm frame) to the AP, and confirms to accept first information that is in the first frame and that is configured by the AP for the STA 1. After receiving the first frame, the STA 2 sends a second frame to the AP, and confirms to accept first information that is in the first frame and that is configured by the AP for the STA 2. In a measurement phase, the AP sends a sensing signal to the STA 1 and the STA 2. After receiving the sensing signal, the STA 1 and the STA 2 perform signal processing measurement to obtain a measurement result. In a reporting phase, the AP sends a Poll frame to both the STA 1 and the STA 2, so that the STA 1 and the STA 2 send the measurement result to the AP after receiving the Poll frame. It should be noted that, in the reporting phase, the AP may alternatively obtain the measurement result of the STA 1 and the STA 2 in a scheduling-based manner (as shown in case 2 in FIG. 5*c*) or a contention-based manner (as shown in case 3 in FIG. 5*c*).

Figure 9D:
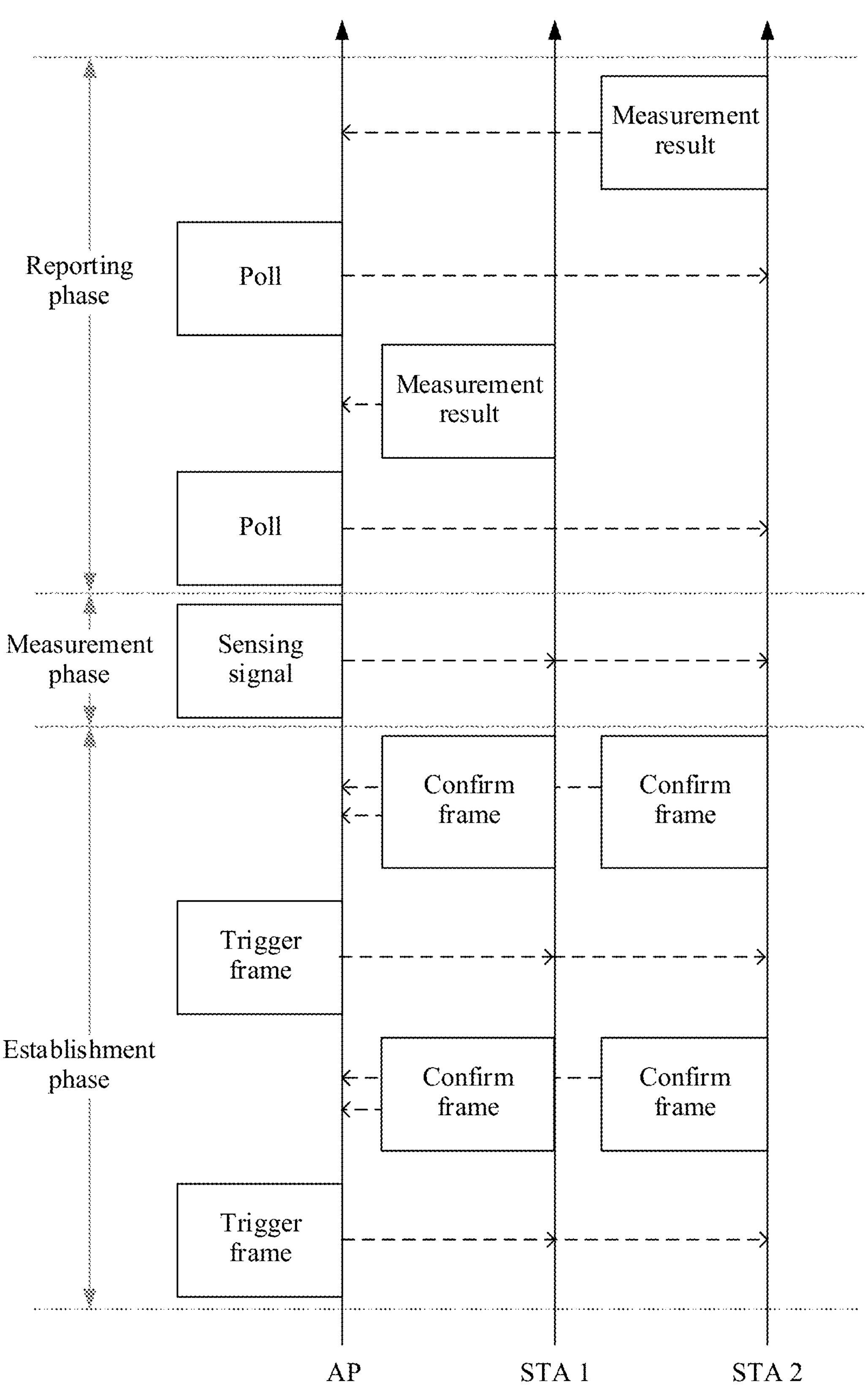
FIG. 9*d* is a schematic diagram of still another sensing session according to this application.

In the sensing session establishment phase, if the AP establishes the sensing session by using the method shown in FIG. 8*a*, a schematic diagram of the sensing procedure in the application scenario in FIG. 9*a* is shown in FIG. 9*d*. In the sensing session establishment phase, the AP sends a fifth frame (a trigger frame in FIG. 9*d*) to the STA 1 and the STA 2 by using the method shown in FIG. 8*a*, to request the STA 1 and the STA 2 to participate in the sensing session, and configures a role and a sensing parameter for both the STA 1 and the STA 2 to participate in the sensing session. After the STA 1 and the STA 2 receive the fifth frame from the AP, the STA 1 and the STA 2 separately send a sixth frame (for example, a confirm frame in FIG. 9*d*) to the AP. If the sixth frame in FIG. 9*c* indicates that the STA receiving/sending the sixth frame refuses to participate in the sensing session by using the role and/or the sensing parameter configured in the fifth frame, the AP sends the fifth frame to the STA 1 and the STA 2 again, and configures the role and the sensing parameter for the STA 1 and the STA 2 to participate in the sensing session until the sixth frame sent by the STA 1 to the AP indicates that the STA 1 confirms to participate in the sensing session by using the third role and the fourth sensing parameter that correspond to the STA 1, and/or the sixth frame sent by the STA 2 to the AP indicates that the STA 2 confirms to participate in the sensing session by using the third role and the fourth sensing parameter that correspond to the STA 2. In a measurement phase, the AP sends a sensing signal to the STA 1 and the STA 2. After receiving the sensing signal, the STA 1 and the STA 2 perform signal processing measurement to obtain a measurement result. In a reporting phase, the AP sends a Poll frame to both the STA 1 and the STA 2, so that the STA 1 and the STA 2 send the measurement result to the AP after receiving the Poll frame. It should be noted that, in the reporting phase, the AP may alternatively obtain the measurement result of the STA 1 and the STA 2 in a scheduling-based manner (as shown in case 2 in FIG. 5*c*) or a contention-based manner (as shown in case 3 in FIG. 5*c*).

In another application scenario corresponding to FIG. 9*a*, when the STA has a sensing requirement, the STA usually cannot schedule and manage the STA participating in the sensing session. Therefore, in this case, when the STA serves as an initiator, the STA usually needs to cooperate with the AP to perform sensing. For example, the STA 1 is a non-independent sensing initiator (that is, the STA 1 serves as a sensing initiator, and the STA 1 further participates in receiving/sending of a sensing signal), and the STA 1 and the STA 2 are STAs associated with the AP (that is, the foregoing second STAs). The following uses an example in which the AP serves as a sensing signal transmitter for schematic description.

In a sensing session establishment phase, the STA 1 (e.g., an initiator) sends a sensing request frame to the AP, to request the AP to participate in the sensing session. After receiving the sensing request frame, the AP feeds back (or sends) a sensing response frame to the STA 1, and the sensing response frame indicates whether the AP confirms to participate in the sensing session. When the AP agrees to participate in the sensing session, the AP performs coordinated scheduling on the STAs (for example, the STA 1 and the STA 2) participating in the sensing session. It should be learned that, for a specific frame structure of the sensing request frame sent by the STA 1 to the AP, refer to the first frame in structure 4 in the foregoing 601 (that is, as shown in FIG. 6*e*). In this case, the STA 1 serves as an initiator, and the Sensing Request Element field in the sensing request frame sent by the STA to the AP further includes another station information (Other STA Info) subfield in addition to a sensing request info subfield. The another station info subfield indicates information such as an address of another STA participating in the sensing session. In other words, when the STA 1 is an initiator, the STA 1 sends a sensing request frame to the AP, to request the AP to participate in the sensing session. When the STA 1 learns the information of the address of the another STA participating in the sensing session, the STA 1 may further indicate, to the AP by using the another station info subfield, information such as the address of the another STA participating in the sensing session.

Figure 9E:
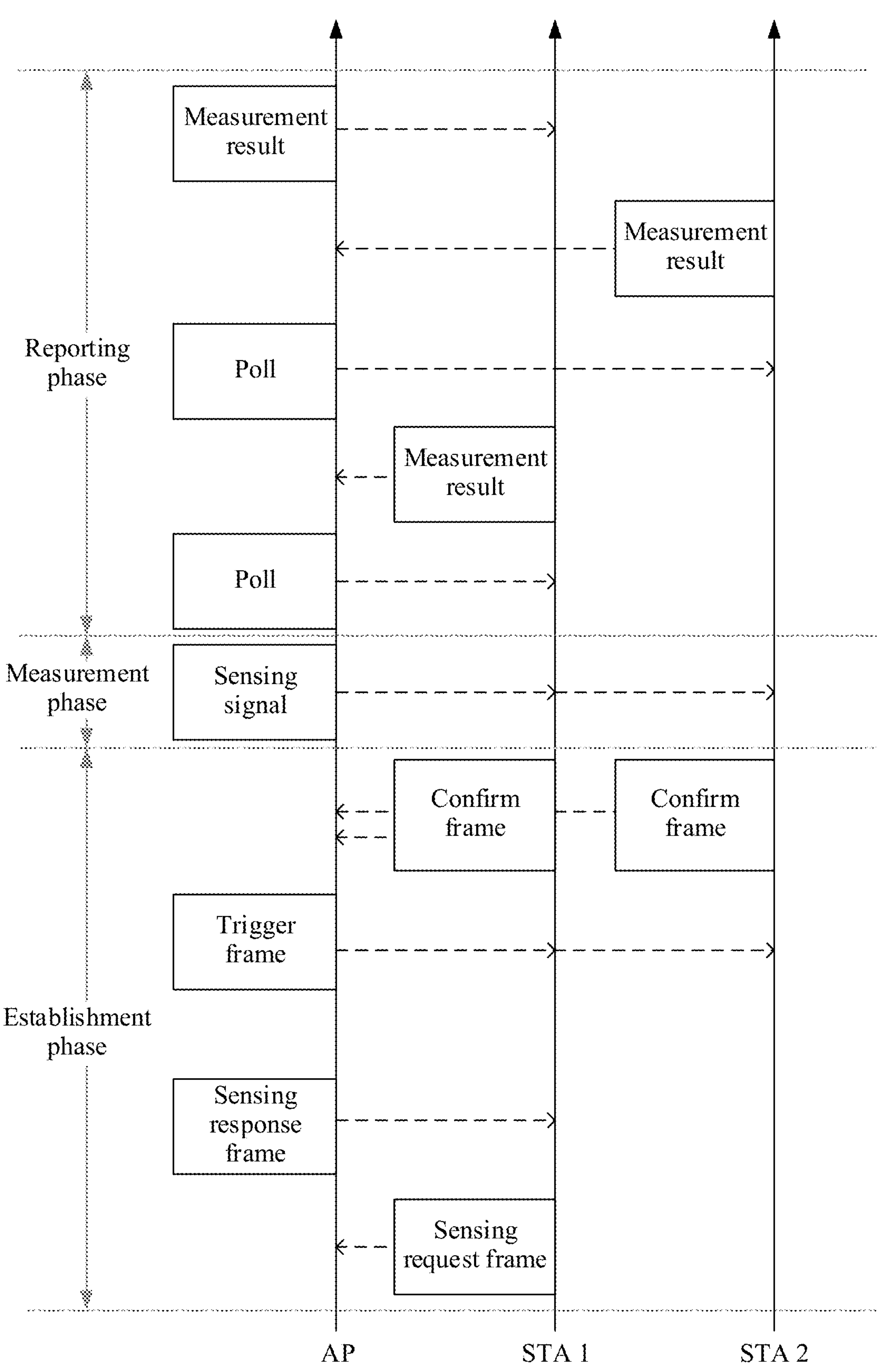
FIG. 9*e* is a schematic diagram of still another sensing session according to this application.

If the AP establishes the sensing session by using the method shown in FIG. 6*a*, a schematic diagram of the sensing procedure in the application scenario in FIG. 9*a* is shown in FIG. 9*e*. In the sensing session establishment phase, the AP sends a first frame (a trigger frame in FIG. 9*e*) to the STA 1 and the STA 2 by using the method shown in FIG. 6*a*, and configures a role and a sensing parameter for both the STA 1 and the STA 2 to participate in the sensing session. After receiving the first frame, the STA 1 sends a second frame (for example, a response frame in FIG. 9*e*) to the AP, and confirms to accept first information that is in the first frame and that is configured by the AP for the STA 1. After receiving the first frame, the STA 2 sends a second frame to the AP, and confirms to accept first information that is in the first frame and that is configured by the AP for the STA 2. In a measurement phase, the AP sends a sensing signal to the STA 1 and the STA 2. After receiving the sensing signal, the STA 1 and the STA 2 perform signal processing measurement to obtain a measurement result. In a reporting phase, the AP sends a Poll frame to both the STA 1 and the STA 2, so that the STA 1 and the STA 2 send the measurement result to the AP after receiving the Poll frame. Further, because the STA 1 is an initiator, the AP sends, to the STA 1, the measurement result sent by the STA 1 and the STA 2.

It should be noted that, in the reporting phase, the AP may alternatively obtain the measurement result of the STA 1 and the STA 2 in a scheduling-based manner (as shown in case 2 in FIG. 5*c*) or a contention-based manner (as shown in case 3 in FIG. 5*c*).

Figure 9F:
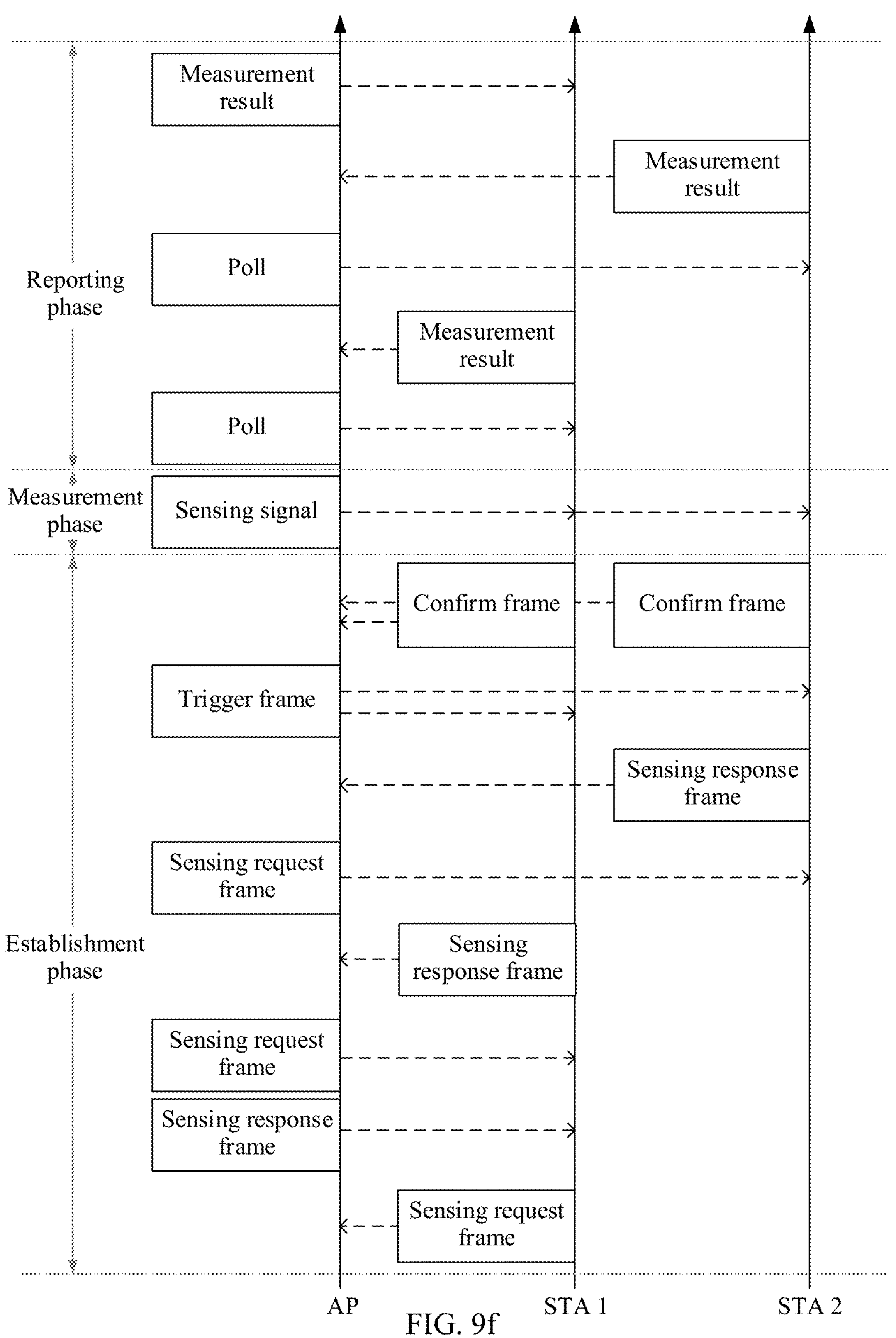
FIG. 9*f* is a schematic diagram of still another sensing session according to this application.

If the AP establishes the sensing session by using the method shown in FIG. 7*a*, a schematic diagram of the sensing procedure in the application scenario in FIG. 9*a* is shown in FIG. 9*f*. In the sensing session establishment phase, the AP sends a third frame (a sensing request frame in FIG. 9*f*) to both the STA 1 and the STA 2 by using the method shown in FIG. 7*a*, to request the STA 1 and the STA 2 to participate in the sensing session. After the STA 1 receives the third frame from the AP, the STA 1 sends a fourth frame (for example, a sensing response frame in FIG. 9*f*) to the AP, and indicates, in the fourth frame, a receiving/sending capability of the STA 1 (which may be understood as a role supported in the sensing session) and a corresponding sensing parameter. After the STA 2 receives the third frame from the AP, the STA 2 sends a fourth frame (for example, a sensing response frame in FIG. 9*f*) to the AP, and indicates, in the fourth frame, a receiving/sending capability of the STA 2 (which may be understood as a role supported in the sensing session) and a corresponding sensing parameter. Further, the AP determines the STA 1 and the STA 2 as first STAs participating in the sensing session, and the AP sends (for example, sends by broadcast) a first frame (for example, a trigger frame) to the STA 1 and the STA 2 based on the fourth frame (for example, a sensing response frame in FIG. 9*f*) fed back by both the STA 1 and the STA 2, to configure a role and a sensing parameter for both the STA 1 and the STA 2 to participate in the sensing session. After receiving the first frame, the STA 1 sends a second frame (for example, a confirm frame) to the AP, and confirms to accept first information that is in the first frame and that is configured by the AP for the STA 1. After receiving the first frame, the STA 2 sends a second frame to the AP, and confirms to accept first information that is in the first frame and that is configured by the AP for the STA 2. In a measurement phase, the AP sends a sensing signal to the STA 1 and the STA 2. After receiving the sensing signal, the STA 1 and the STA 2 perform signal processing measurement to obtain a measurement result. In a reporting phase, the AP sends a Poll frame to both the STA 1 and the STA 2, so that the STA 1 and the STA 2 send the measurement result to the AP after receiving the Poll frame. Further, because the STA 1 is an initiator, the AP sends, to the STA 1, the measurement result sent by the STA 1 and the STA 2.

It should be noted that, in the reporting phase, the AP may alternatively obtain the measurement result of the STA 1 and the STA 2 in a scheduling-based manner (as shown in case 2 in FIG. 5*c*) or a contention-based manner (as shown in case 3 in FIG. 5*c*).

Figure 9G:
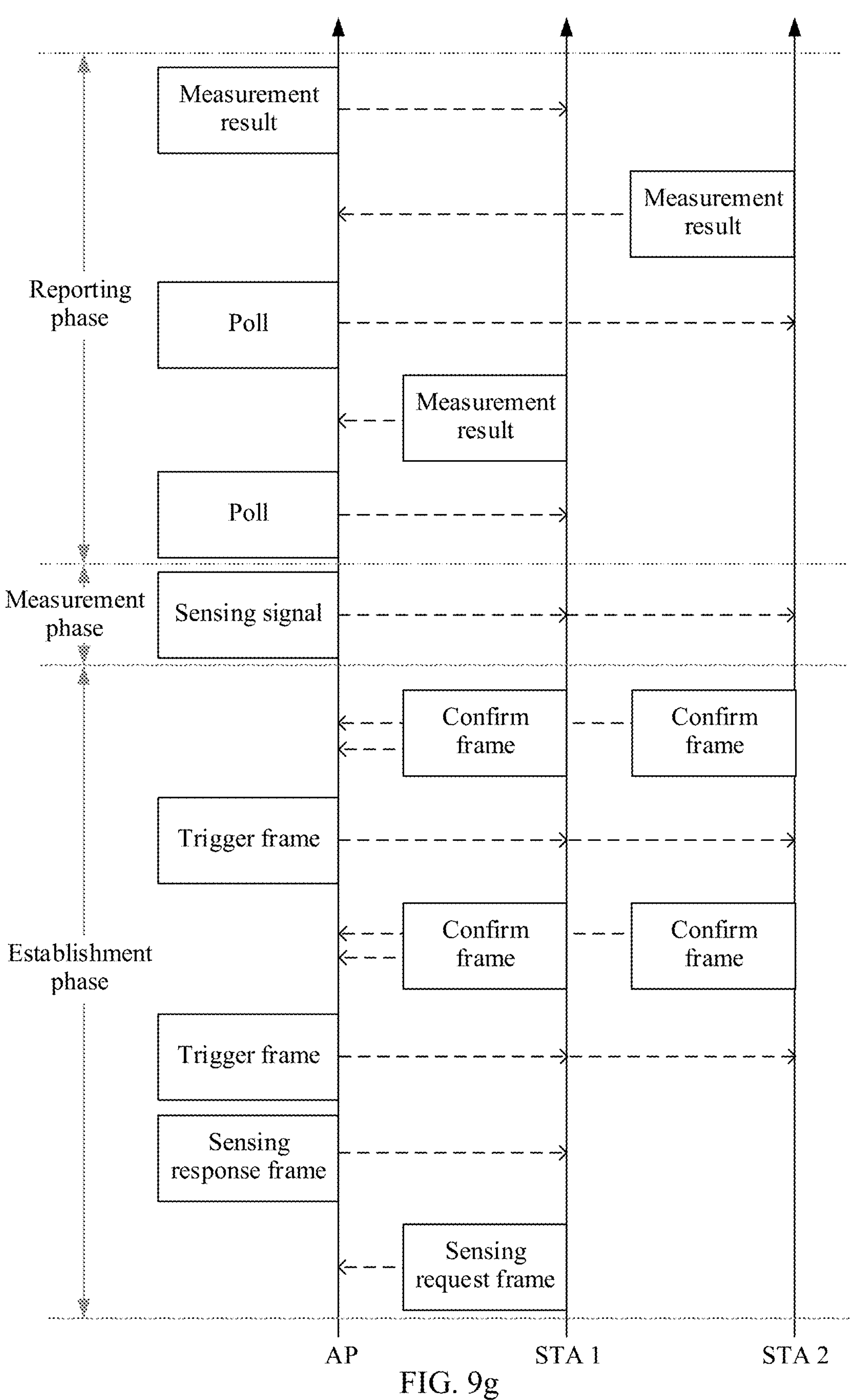
FIG. 9*g* is a schematic diagram of still another sensing session according to this application.

If the AP establishes the sensing session by using the method shown in FIG. 8*a*, a schematic diagram of the sensing procedure in the application scenario in FIG. 9*a* is shown in FIG. 9*g*. In the sensing session establishment phase, the AP sends a fifth frame (a trigger frame in FIG. 9*d*) to the STA 1 and the STA 2 by using the method shown in FIG. 8*a*, to request the STA 1 and the STA 2 to participate in the sensing session, and configures a role and a sensing parameter for both the STA 1 and the STA 2 to participate in the sensing session. After the STA 1 and the STA 2 receive the fifth frame from the AP, the STA 1 and the STA 2 separately send a sixth frame (for example, a confirm frame in FIG. 9*d*) to the AP. If the sixth frame in FIG. 9*d* indicates that the STA receiving/sending the sixth frame refuses to participate in the sensing session by using the role and/or the sensing parameter configured in the fifth frame, the AP sends the fifth frame to the STA 1 and the STA 2 again, and configures the role and the sensing parameter for the STA 1 and the STA 2 to participate in the sensing session until the sixth frame sent by the STA 1 to the AP indicates that the STA 1 confirms to participate in the sensing session by using the third role and the fourth sensing parameter that correspond to the STA 1, and/or the sixth frame sent by the STA 2 to the AP indicates that the STA 2 confirms to participate in the sensing session by using the third role and the fourth sensing parameter that correspond to the STA 2. In a measurement phase, the AP sends a sensing signal to the STA 1 and the STA 2. After receiving the sensing signal, the STA 1 and the STA 2 perform signal processing measurement to obtain a measurement result. In a reporting phase, the AP sends a Poll frame to both the STA 1 and the STA 2, so that the STA 1 and the STA 2 send the measurement result to the AP after receiving the Poll frame. It should be noted that, in the reporting phase, the AP may alternatively obtain the measurement result of the STA 1 and the STA 2 in a scheduling-based manner (as shown in case 2 in FIG. 5*c*) or a contention-based manner (as shown in case 3 in FIG. 5*c*). Further, because the STA 1 is an initiator, the AP sends, to the STA 1, the measurement result sent by the STA 1 and the STA 2.

Figure 10A:
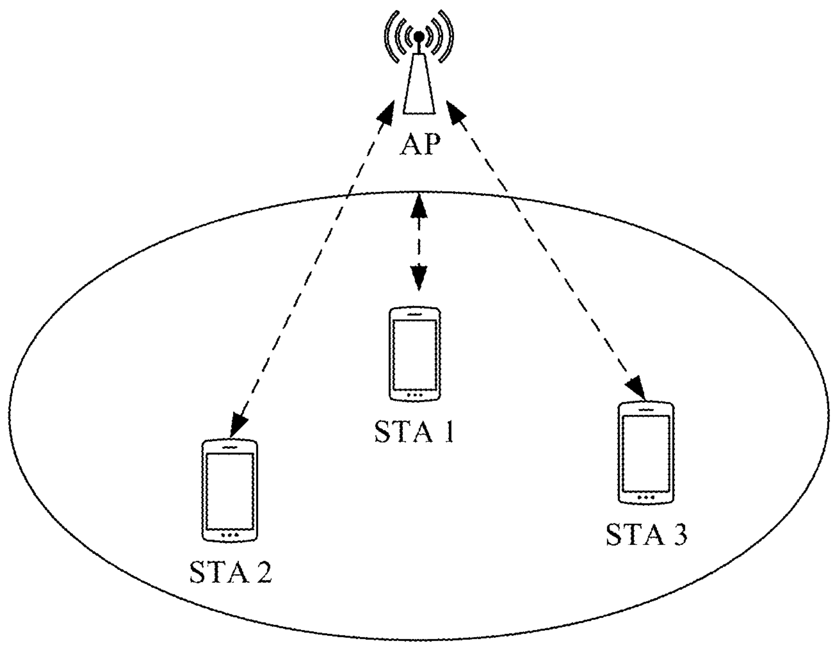
FIG. 10*a* is a schematic diagram of still another sensing application scenario according to this application.

FIG. 10*a* is an application scenario of a sensing session according to this application.

In an application scenario corresponding to FIG. 10*a*, an AP is an independent sensing initiator (that is, the AP serves as a sensing initiator, and the AP does not participate in receiving/sending of a sensing signal), and a STA 1, a STA 2, and a STA 3 are STAs associated with the AP (that is, the foregoing second STAs).

Figure 10B:
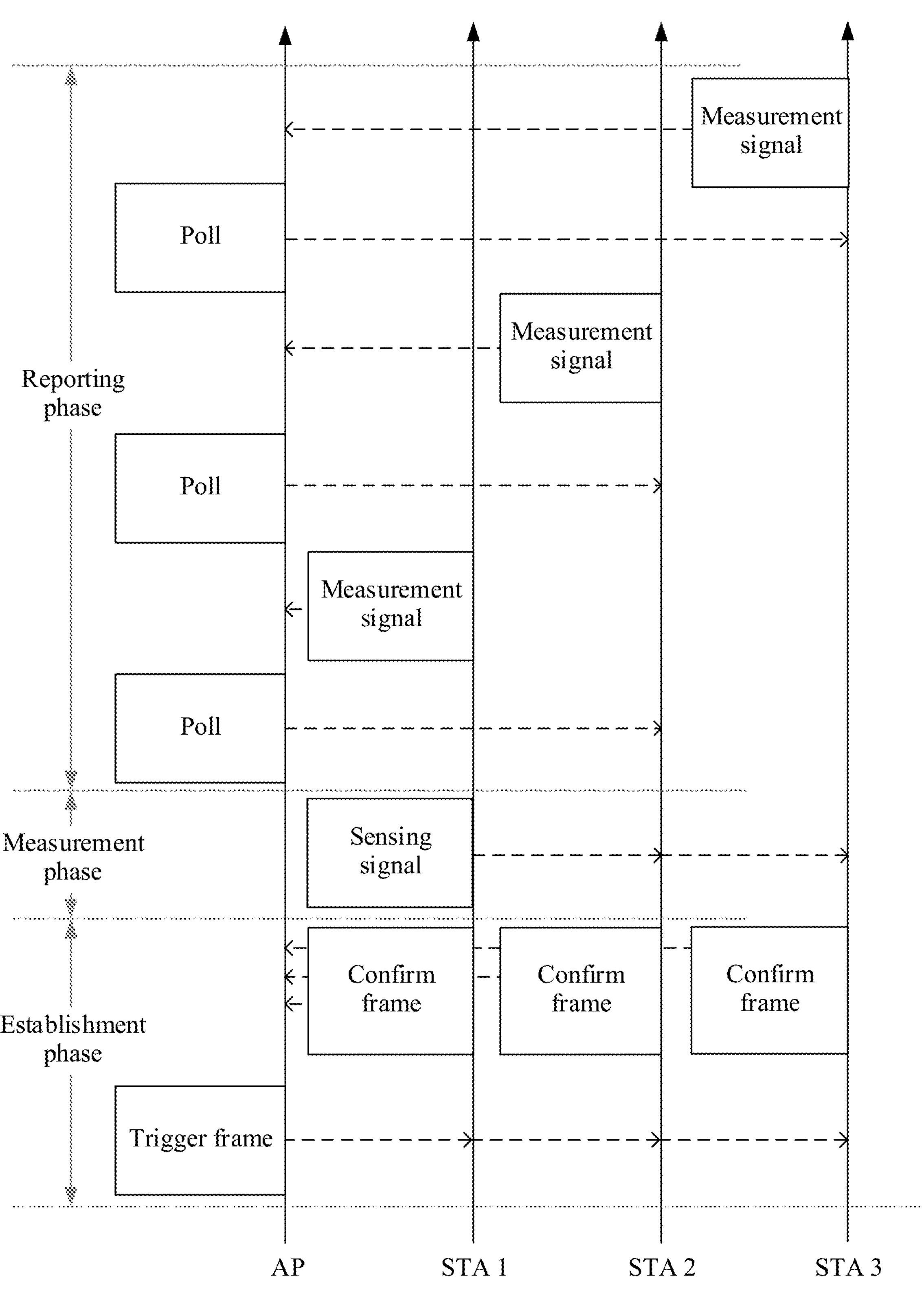
FIG. 10*b* is a schematic diagram of a sensing session according to this application.

In a sensing session establishment phase, if the AP establishes the sensing session by using the method shown in FIG. 6*a*, a schematic diagram of the sensing procedure in the application scenario in FIG. 10*a* is shown in FIG. 10*b*. In the sensing session establishment phase, the AP sends a first frame (for example, a trigger frame in FIG. 10*b*) to the STA 1, the STA 2, and the STA 3 by using the method shown in FIG. 6*a*, to configure a role and a sensing parameter for each of the STA 1, the STA 2, and the STA 3 to participate in the sensing session. After receiving the first frame, the STA 1 sends a second frame (for example, a response frame in FIG. 10*b*) to the AP, and confirms to accept first information that is in the first frame and that is configured by the AP for the STA 1. After receiving the first frame, the STA 2 sends a second frame to the AP, and confirms to accept first information that is in the first frame and that is configured by the AP for the STA 2. After receiving the first frame, the STA 3 sends a second frame to the AP, and confirms to accept first information that is in the first frame and that is configured by the AP for the STA 3. In a measurement phase, the STA 1 sends a sensing signal to the STA 2 and the STA 3. After receiving the sensing signal, the STA 2 and the STA 3 perform signal processing measurement to obtain a measurement result. In a reporting phase, the AP sends a Poll frame to both the STA 2 and the STA 3, so that the STA 2 and the STA 3 send the measurement result to the AP after receiving the Poll frame. It should be noted that, in the reporting phase, the AP may alternatively obtain the measurement result of the STA 2 and the STA 3 in a scheduling-based manner (as shown in case 2 in FIG. 5*c*) or a contention-based manner (as shown in case 3 in FIG. 5*c*).

Figure 10C:
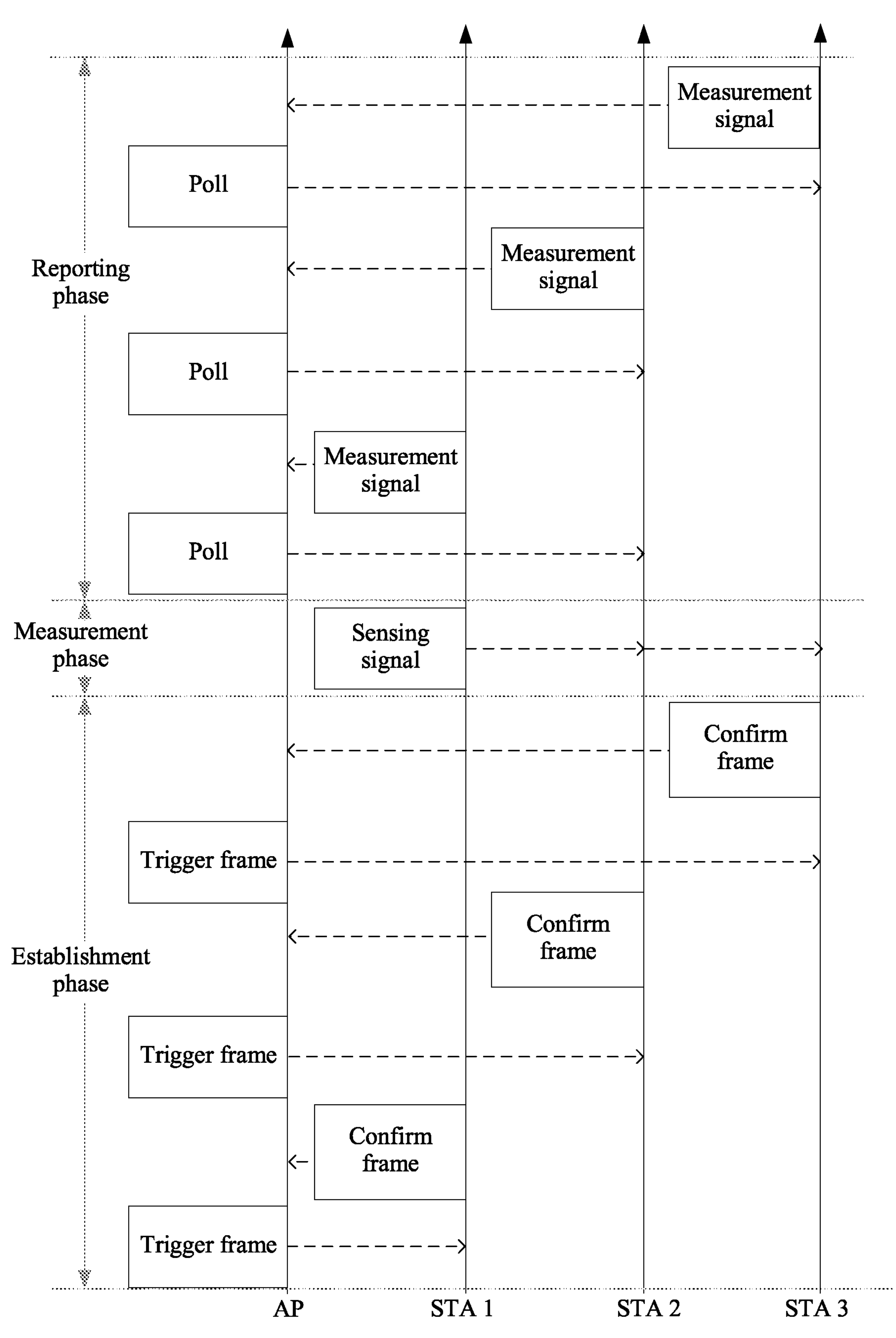
FIG. 10*c* is a schematic diagram of another sensing session according to this application.

In the sensing session establishment phase, if the AP establishes the sensing session by using the method shown in FIG. 7*a*, a schematic diagram of the sensing procedure in the application scenario in FIG. 10*a* is shown in FIG. 10*c*. In the sensing session establishment phase, the AP sends a third frame (a sensing request frame in FIG. 10*c*) to each of the STA 1, the STA 2, and the STA 3 by using the method shown in FIG. 7*a*, to request the STA 1, the STA 2, and the STA 3 to participate in the sensing session. After the STA 1 receives the third frame from the AP, the STA 1 sends a fourth frame (for example, a sensing response frame in FIG. 9*c*) to the AP, and indicates, in the fourth frame, a receiving/sending capability of the STA 1 (for example, a role supported in the sensing session is a transmitter) and a corresponding sensing parameter. After the STA 2 receives the third frame from the AP, the STA 2 sends a fourth frame (for example, a sensing response frame in FIG. 9*c*) to the AP, and indicates, in the fourth frame, a receiving/sending capability of the STA 2 (for example, a role supported in the sensing session is a receiver) and a corresponding sensing parameter. After the STA 3 receives the third frame from the AP, the STA 3 sends a fourth frame (for example, a sensing response frame in FIG. 9*c*) to the AP, and indicates, in the fourth frame, a receiving/sending capability of the STA 3 (for example, a role supported in the sensing session is a receiver) and a corresponding sensing parameter. Further, the AP determines the STA 1, the STA 2, and the STA 3 as first STAs participating in the sensing session, and the AP sends (for example, sends by broadcast) a first frame (for example, a Trigger frame) to the STA 1, the STA 2, and the STA 3 based on a fourth frame (for example, a sensing response frame in FIG. 9*c*) fed back by each of the STA 1, the STA 2, and the STA 3, and configures a role and a sensing parameter for each of the STA 1, the STA 2, and the STA 3 to participate in the sensing session. After receiving the first frame, the STA 1 sends a second frame (for example, a Confirm frame) to the AP, and confirms to accept first information that is in the first frame and that is configured by the AP for the STA 1. After receiving the first frame, the STA 2 sends a second frame to the AP, and confirms to accept first information that is in the first frame and that is configured by the AP for the STA 2. After receiving the first frame, the STA 3 sends a second frame to the AP, and confirms to accept first information that is in the first frame and that is configured by the AP for the STA 3. In a measurement phase, the STA 1 sends a sensing signal to the STA 2 and the STA 3. After receiving the sensing signal, the STA 2 and the STA 3 perform signal processing measurement to obtain a measurement result. In a reporting phase, the AP sends a Poll frame to both the STA 2 and the STA 3, so that the STA 2 and the STA 3 send the measurement result to the AP after receiving the Poll frame. It should be noted that, in the reporting phase, the AP may alternatively obtain the measurement result of the STA 2 and the STA 3 in a scheduling-based manner (as shown in case 2 in FIG. 5*c*) or a contention-based manner (as shown in case 3 in FIG. 5*c*).

Figure 10D:
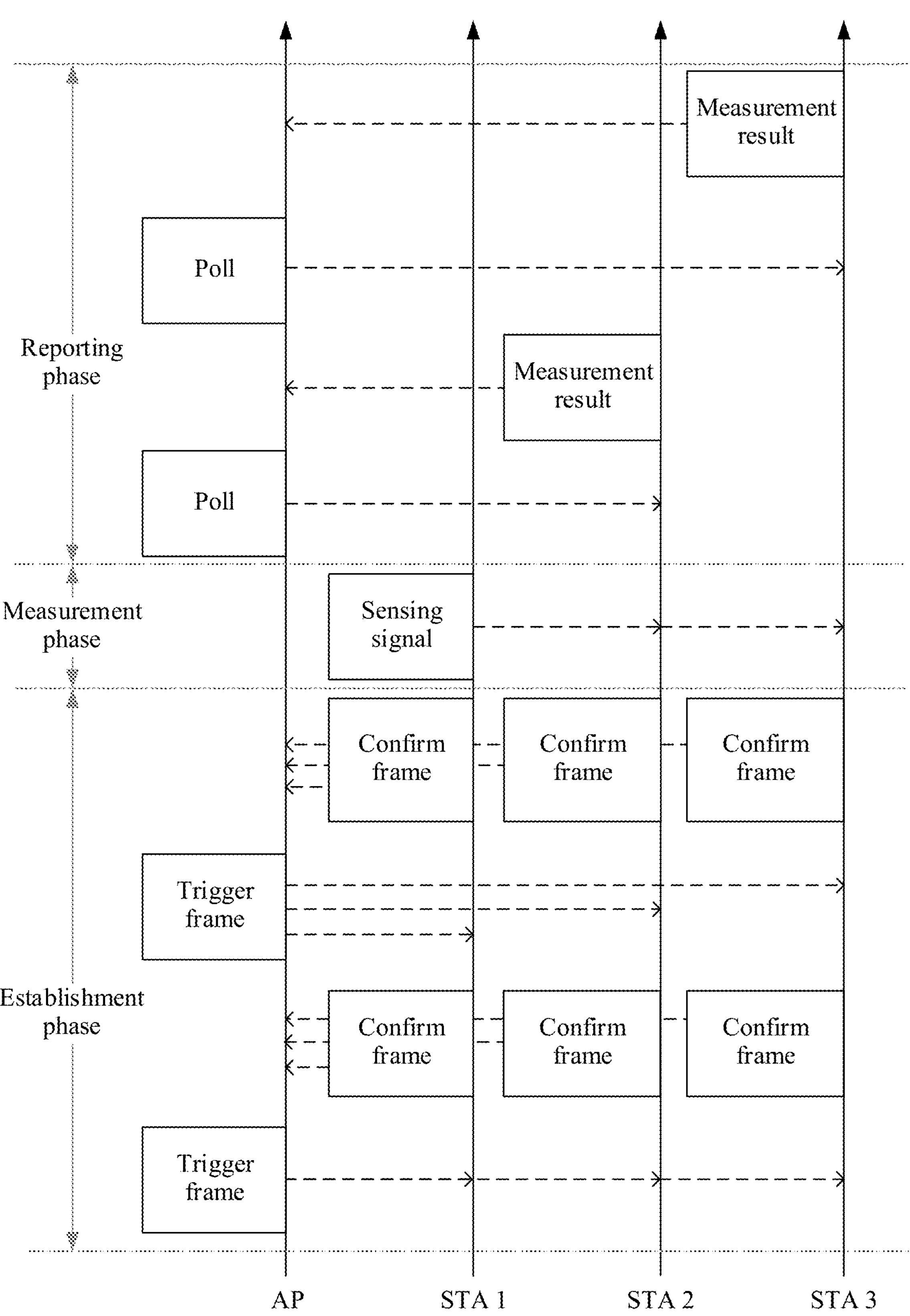
FIG. 10*d* is a schematic diagram of still another sensing session according to this application.

In the sensing session establishment phase, if the AP establishes the sensing session by using the method shown in FIG. 8*a*, a schematic diagram of the sensing procedure in the application scenario in FIG. 10*a* is shown in FIG. 10*d*. In the sensing session establishment phase, the AP sends a fifth frame (a trigger frame in FIG. 10*d*) to the STA 1, the STA 2, and the STA 3 by using the method shown in FIG. 8*a*, to request the STA 1, the STA 2, and the STA 3 to participate in the sensing session, and configures a role and a sensing parameter for each of the STA 1, the STA 2, and the STA 3 to participate in the sensing session. After the STA 1, the STA 2, and the STA 3 receive the fifth frame from the AP, the STA 1, the STA 2, and the STA 3 separately send a sixth frame (for example, a confirm frame in FIG. 10*d*) to the AP. If the sixth frame sent by a STA (the STA 1, the STA 2, or the STA 3) in FIG. 10*d* indicates that the STA refuses to participate in the sensing session by using the role and/or the sensing parameter configured in the fifth frame, the AP sends the fifth frame to the STA 1, the STA 2, and STA 3 again, and configures the role and the sensing parameter for the STA 1, the STA 2, and the STA 3 to participate in the sensing session until the sixth frame sent by the STA 1 to the AP indicates that the STA 1 confirms to participate in the sensing session by using the third role and the fourth sensing parameter that correspond to the STA 1, and/or the sixth frame sent by the STA 2 to the AP indicates that the STA 2 confirms to participate in the sensing session by using the third role and the fourth sensing parameter that correspond to the STA 2, and/or the sixth frame sent by the STA 3 to the AP indicates that the STA 3 confirms to participate in the sensing session by using the third role and the fourth sensing parameter that correspond to the STA 3. In a measurement phase, the STA 1 sends a sensing signal to the STA 2 and the STA 3. After receiving the sensing signal, the STA 2 and the STA 3 perform signal processing measurement to obtain a measurement result. In a reporting phase, the AP sends a Poll frame to both the STA 2 and the STA 3, so that the STA 2 and the STA 3 send the measurement result to the AP after receiving the Poll frame. It should be noted that, in the reporting phase, the AP may alternatively obtain the measurement result of the STA 2 and the STA 3 in a scheduling-based manner (as shown in case 2 in FIG. 5*c*) or a contention-based manner (as shown in case 3 in FIG. 5*c*).

Figure 11A:
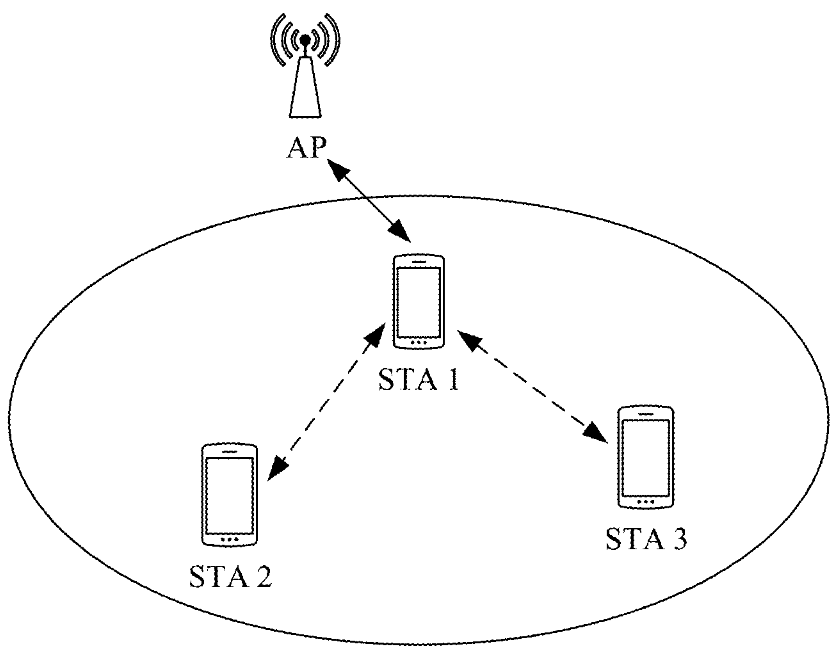
FIG. 11*a* is a schematic diagram of still another sensing application scenario according to this application.

FIG. 11*a* is an application scenario of a sensing session according to this application. In this application scenario, an AP is an independent sensing initiator (that is, the AP serves as a sensing initiator, and the AP does not participate in receiving/sending of a sensing signal), and a STA 1, a STA 2, and a STA 3 are STAs associated with the AP (that is, the foregoing second STAs). The STA 1 has a strong function. It may be understood that the STA 1 has a capability of coordinating another STA to participate in the sensing session (including but not limited to a capability of sending a sensing request frame to request the another STA to participate in the sensing session, and a capability of configuring a role or a sensing parameter for the another STA), or it may be understood that the STA 1 and another STA (the STA 2 or the STA 3) are not STAs at the same level, and the level of the STA 1 is higher than that of the another STA (the STA 2 or the STA 3).

In a sensing session implementation procedure, the AP sends a sensing request frame to the STA 1, to request the STA 1 to participate in the sensing session. After receiving the sensing request frame, the STA 1 feeds back (or sends) a sensing response frame to the AP, and the sensing response frame indicates whether the STA 1 confirms to participate in the sensing session. When the STA 1 agrees to participate in the sensing session, the STA 1 performs coordinated scheduling on the STAs (for example, the STA 2 and the STA 3) participating in the sensing session.

Figure 11B:
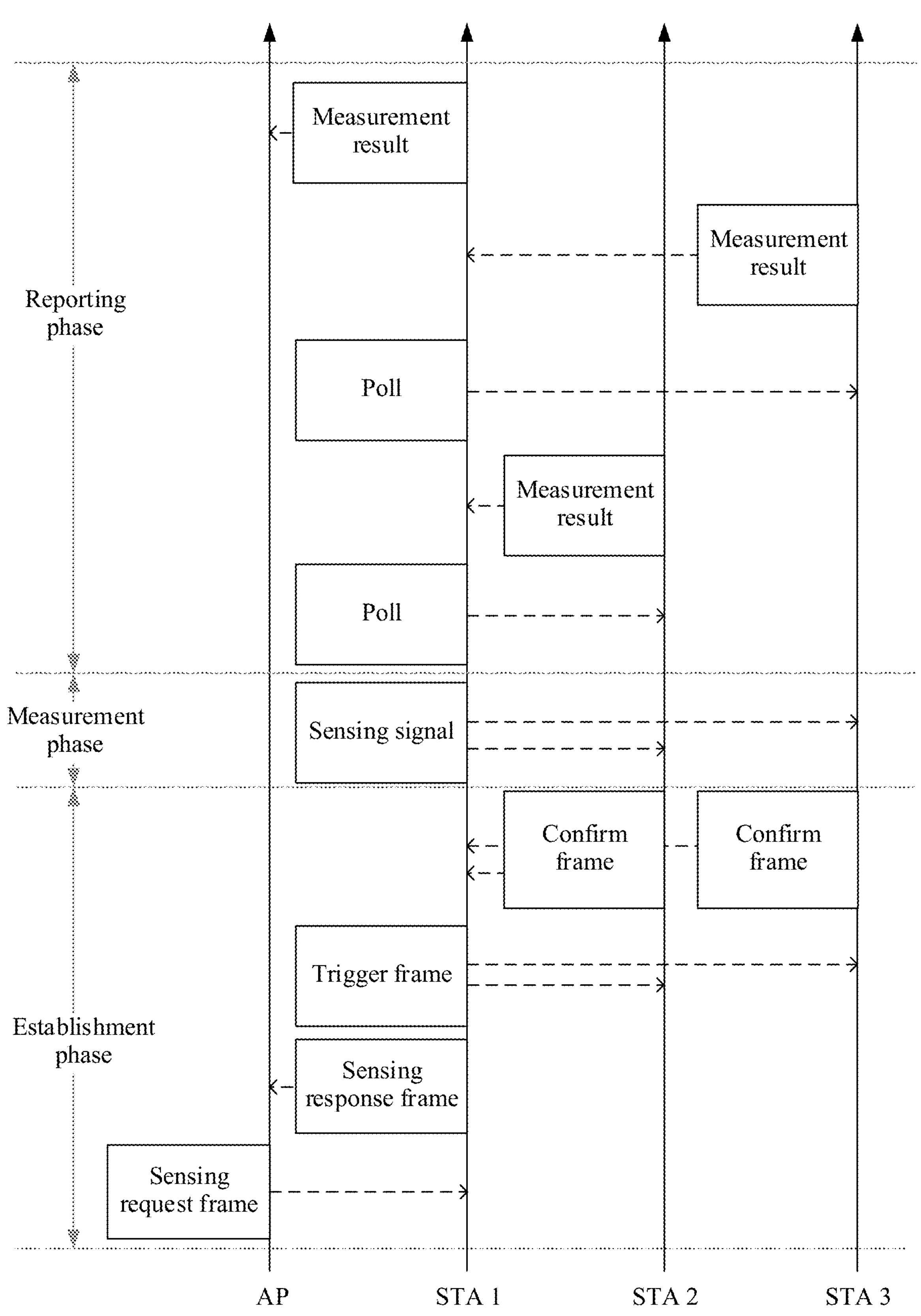
FIG. 11*b* is a schematic diagram of a sensing session according to this application.

In an application scenario corresponding to FIG. 11*a*, in a sensing session establishment phase, the STA 1 sends a first frame (a trigger frame in FIG. 11*b*) to the STA 2 and the STA 3 by using the method shown in FIG. 6*a*, and configures a role and a sensing parameter for both the STA 2 and STA 3 to participate in the sensing session. After receiving the first frame, the STA 2 sends a second frame (for example, a confirm frame in FIG. 11*b*) to the STA 1, and confirms to accept first information that is in the first frame and that is configured by the AP for the STA 2. After receiving the first frame, the STA 3 sends a second frame to the STA 1, and confirms to accept first information that is in the first frame and that is configured by the AP for the STA 3. In a measurement phase, the STA 1 sends a sensing signal to the STA 2 and the STA 3. After receiving the sensing signal, the STA 2 and the STA 3 perform signal processing measurement to obtain a measurement result. In a reporting phase, the STA 1 sends a Poll frame to both the STA 2 and the STA 3, so that the STA 2 and the STA 3 send the measurement result to the STA 1 after receiving the Poll frame. Further, the STA 1 sends, to the AP, a measurement report received from the STA 2 and the STA 3. It should be noted that, in the reporting phase, the STA 1 may alternatively obtain the measurement result of the STA 2 and the STA 3 in a scheduling-based manner (as shown in case 2 in FIG. 5*c*) or a contention-based manner (as shown in case 3 in FIG. 5*c*).

Figure 11C:
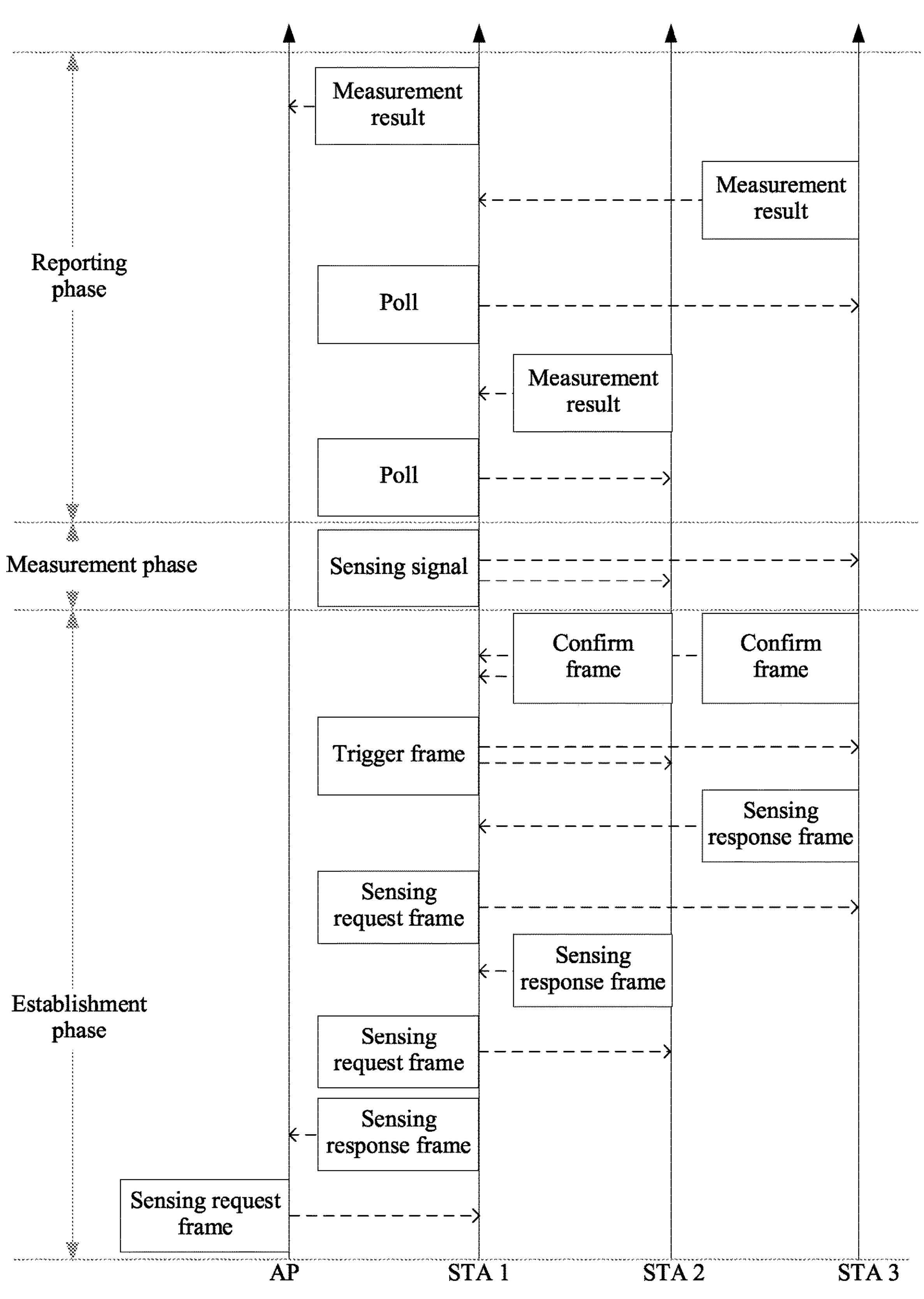
FIG. 11*c* is a schematic diagram of another sensing session according to this application.

In the sensing session establishment phase, if the AP establishes the sensing session by using the method shown in FIG. 7*a*, a schematic diagram of the sensing procedure in the application scenario in FIG. 10*a* is shown in FIG. 11*c*. In the sensing session establishment phase, the STA 1 sends a third frame (a sensing request frame in FIG. 11*c*) to both the STA 2 and the STA 3 by using the method shown in FIG. 7*a*, to request the STA 2 and the STA 3 to participate in the sensing session. After the STA 2 receives the third frame from the STA 1, the STA 2 sends a fourth frame (for example, a sensing response frame in FIG. 11*c*) to the STA 1, and indicates, in the fourth frame, a receiving/sending capability of the STA 2 (for example, a role supported in a sensing session is a receiver) and a corresponding sensing parameter. After the STA 3 receives the third frame from the STA 1, the STA 3 sends a fourth frame (for example, a sensing response frame in FIG. 9*c*) to the STA 1, and indicates, in the fourth frame, a receiving/sending capability of the STA 3 (for example, a role supported in a sensing session is a receiver) and a corresponding sensing parameter. Further, the STA 1 determines the STA 2 and the STA 3 as first STAs participating in the sensing session, and the STA 1 sends (for example, sends by broadcast) a first frame (for example, a trigger frame) to the STA 2 and the STA 3 based on the fourth frame (for example, a sensing response frame in FIG. 11*c*) fed back by both the STA 2 and the STA 3, to configure a role and a sensing parameter for both the STA 2 and the STA 3 to participate in the sensing session. After receiving the first frame, the STA 2 sends a second frame (for example, a confirm frame) to the STA 1, and confirms to accept first information that is in the first frame and that is configured by the AP for the STA 2. After receiving the first frame, the STA 3 sends a second frame to the STA 1, and confirms to accept first information that is in the first frame and that is configured by the AP for the STA 3. In a measurement phase, the STA 1 sends a sensing signal to the STA 2 and the STA 3. After receiving the sensing signal, the STA 2 and the STA 3 perform signal processing measurement to obtain a measurement result. In a reporting phase, the STA 1 sends a Poll frame to both the STA 2 and the STA 3, so that the STA 2 and the STA 3 send the measurement result to the STA 1 after receiving the Poll frame. Further, the STA 1 sends, to the AP, a measurement report received from the STA 2 and the STA 3. It should be noted that, in the reporting phase, the STA 1 may alternatively obtain the measurement result of the STA 2 and the STA 3 in a scheduling-based manner (as shown in case 2 in FIG. 5*c*) or a contention-based manner (as shown in case 3 in FIG. 5*c*).

Figure 11D:
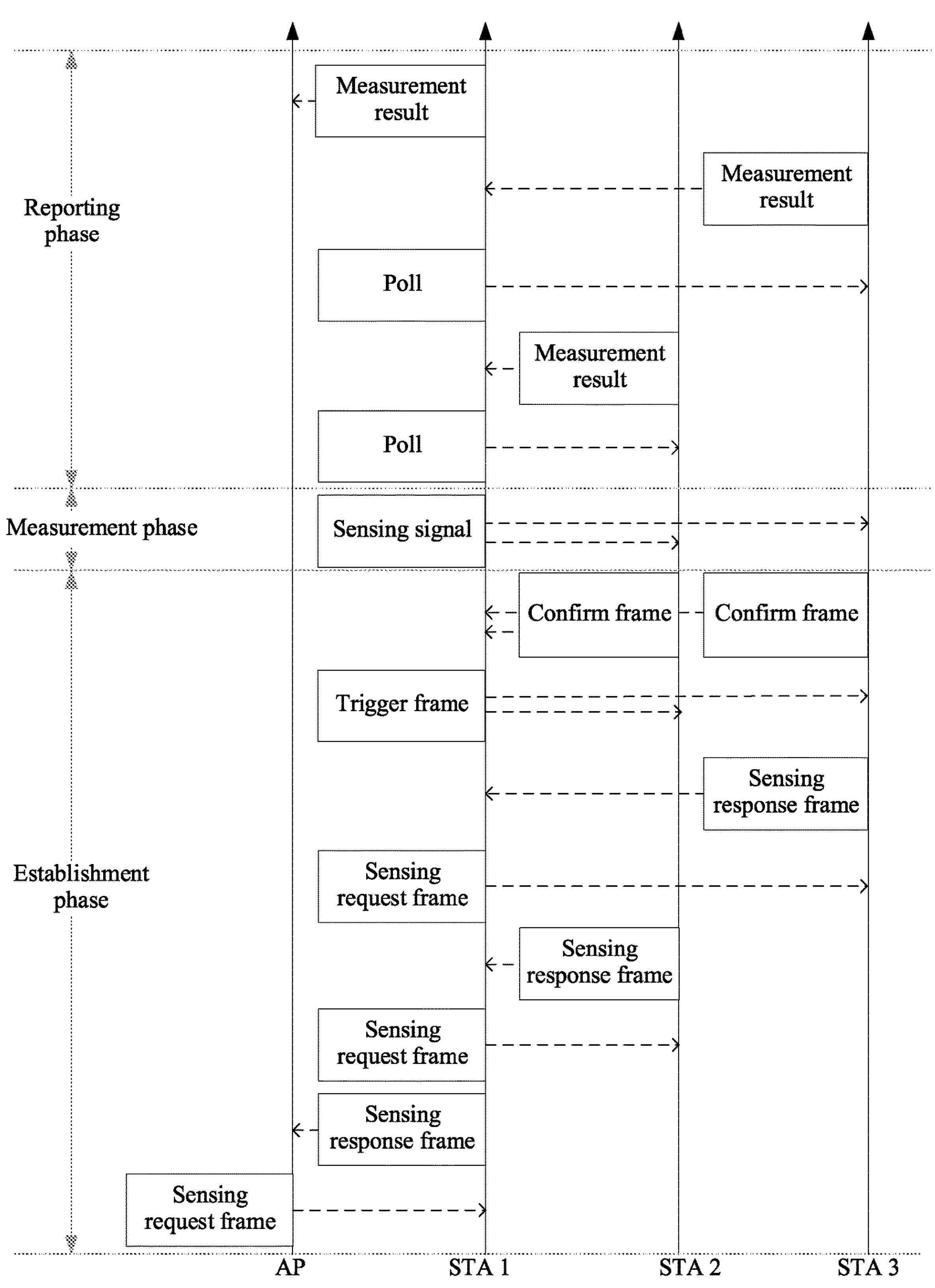
FIG. 11*d* is a schematic diagram of still another sensing session according to this application.

In the sensing session establishment phase, if the STA 1 establishes the sensing session by using the method shown in FIG. 8*a*, a schematic diagram of the sensing procedure in the application scenario in FIG. 11*a* is shown in FIG. 11*d*. In the sensing session establishment phase, the STA 1 sends a fifth frame (a trigger frame in FIG. 11*d*) to the STA 2 and the STA 3 by using the method shown in FIG. 8*a*, to request the STA 2 and the STA 3 to participate in the sensing session, and configures a role and a sensing parameter for both the STA 2 and the STA 3 to participate in the sensing session. After the STA 2 and the STA 3 receive the fifth frame from the STA 1, the STA 2 and the STA 3 separately send a sixth frame (for example, a confirm frame in FIG. 11*d*) to the AP. If the sixth frame sent by another STA (the STA 2 or the STA 3) other than the STA 1 in FIG. 11*d* indicates that the STA receiving/sending the sixth frame refuses to participate in the sensing session by using the role and/or the sensing parameter configured in the fifth frame, the STA 1 sends the fifth frame to the STA 2 and the STA 3 again, and configures the role and the sensing parameter for the STA 2 and the STA 3 to participate in the sensing session until the sixth frame sent by the STA 2 to the AP indicates that the STA 2 confirms to participate in the sensing session by using the third role and the fourth sensing parameter that correspond to the STA 2, and/or the sixth frame sent by the STA 3 to the AP indicates that the STA 3 confirms to participate in the sensing session by using the third role and the fourth sensing parameter that correspond to the STA 3. In a measurement phase, the STA 1 sends a sensing signal to the STA 2 and the STA 3. After receiving the sensing signal, the STA 2 and the STA 3 perform signal processing measurement to obtain a measurement result. In a reporting phase, the STA 1 sends a Poll frame to both the STA 2 and the STA 3, so that the STA 2 and the STA 3 send the measurement result to the STA 1 after receiving the Poll frame. Further, the STA 1 sends, to the AP, a measurement report received from the STA 2 and the STA 3. It should be noted that, in the reporting phase, the STA 1 may alternatively obtain the measurement result of the STA 2 and the STA 3 in a scheduling-based manner (as shown in case 2 in FIG. 5*c*) or a contention-based manner (as shown in case 3 in FIG. 5*c*).

Figure 11E:
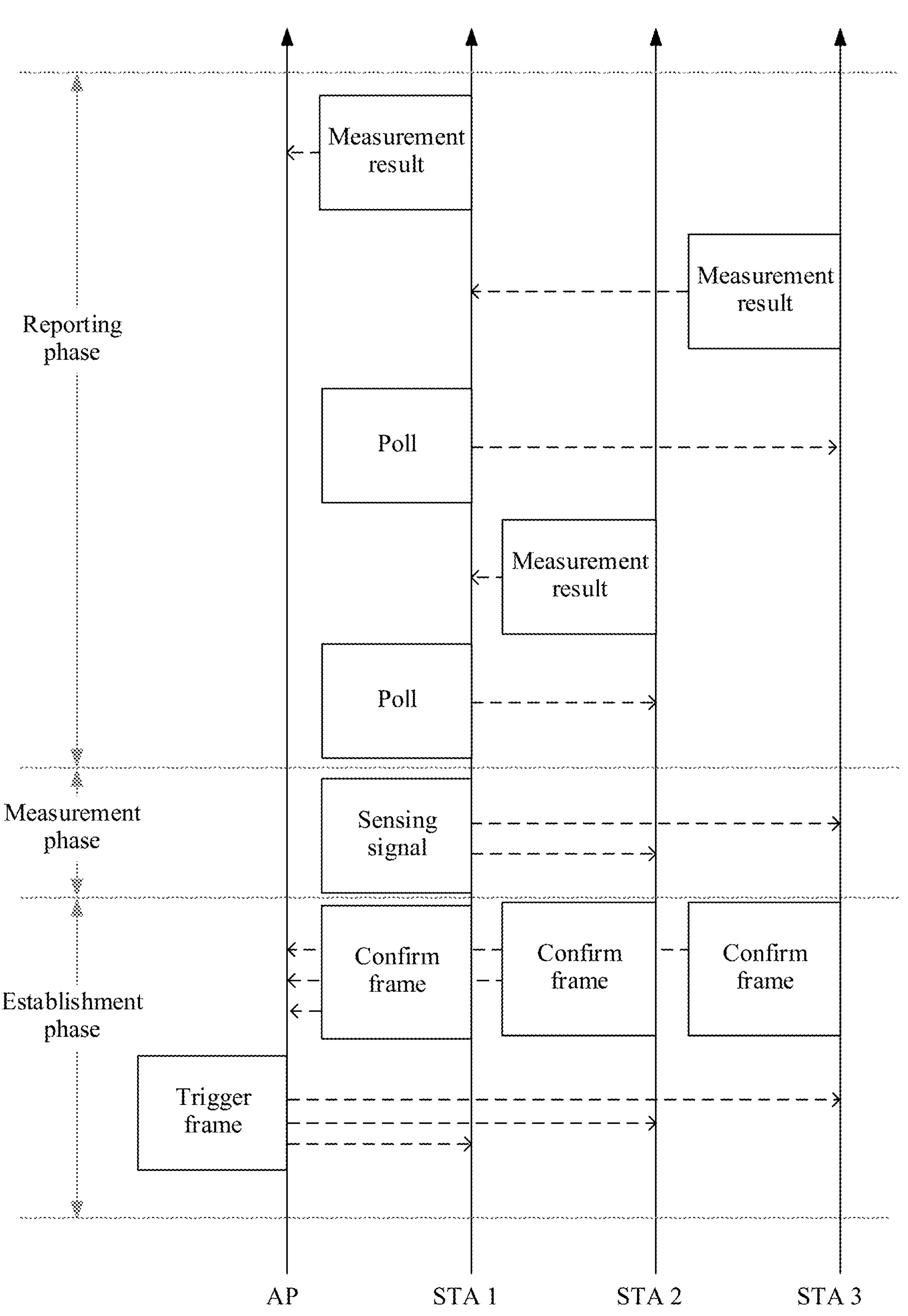
FIG. 11*e* is a schematic diagram of still another sensing session according to this application.

In another application scenario corresponding to FIG. 11*a*, in a sensing session establishment phase, the AP sends a first frame (a trigger frame in FIG. 11*e*) to the STA 1, the STA 2, and the STA 3 by using the method shown in FIG. 6*a*, and configures a role and a sensing parameter for each of the STA 1, STA 2, and STA 3 to participate in the sensing session. After receiving the first frame, the STA 1 sends a second frame (for example, a confirm frame in FIG. 11*e*) to the AP, and confirms to accept first information that is in the first frame and that is configured by the AP for the STA 1. After receiving the first frame, the STA 2 sends a second frame (for example, a confirm frame in FIG. 11*e*) to the STA 1, and confirms to accept first information that is in the first frame and that is configured by the AP for the STA 2. After receiving the first frame, the STA 3 sends a second frame to the STA 1, and confirms to accept first information that is in the first frame and that is configured by the AP for the STA 3. In a measurement phase, the STA 1 sends a sensing signal to the STA 2 and the STA 3. After receiving the sensing signal, the STA 2 and the STA 3 perform signal processing measurement to obtain a measurement result. In a reporting phase, the STA 1 sends a Poll frame to both the STA 2 and the STA 3, so that the STA 2 and the STA 3 send the measurement result to the STA 1 after receiving the Poll frame. Further, the STA 1 sends, to the AP, a measurement report received from the STA 2 and the STA 3. It should be noted that, in the reporting phase, the STA 1 may alternatively obtain the measurement result of the STA 2 and the STA 3 in a scheduling-based manner (as shown in case 2 in FIG. 5*c*) or a contention-based manner (as shown in case 3 in FIG. 5*c*).

Figure 11F:
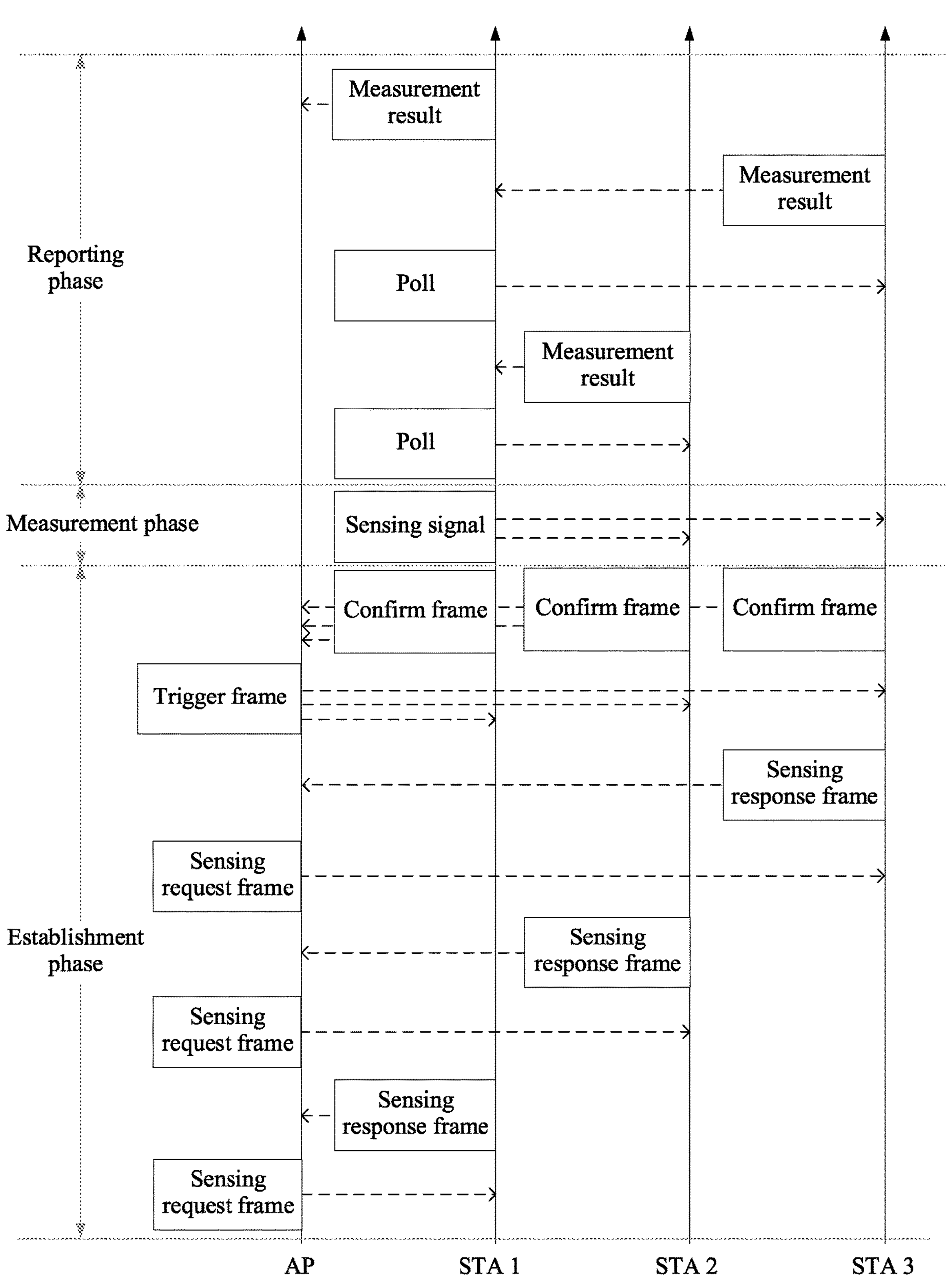
FIG. 11*f* is a schematic diagram of still another sensing session according to this application.

In the sensing session establishment phase, if the AP establishes the sensing session by using the method shown in FIG. 7*a*, a schematic diagram of the sensing procedure in the application scenario in FIG. 10*a* is shown in FIG. 11*f*. In the sensing session establishment phase, the AP sends a third frame (a sensing request frame in FIG. 11*f*) to each of the STA 1, the STA 2, and the STA 3 by using the method shown in FIG. 7*a*, to request the STA 1, the STA 2, and the STA 3 to participate in the sensing session. After the STA 1 receives the third frame from the AP, the STA 1 sends a fourth frame (for example, a sensing response frame in FIG. 11*c*) to the AP, and indicates, in the fourth frame, a receiving/sending capability of the STA 1 (for example, a role supported in the sensing session is a transmitter) and a corresponding sensing parameter. After the STA 2 receives the third frame from the AP, the STA 2 sends a fourth frame (for example, a sensing response frame in FIG. 11*f*) to the AP, and indicates, in the fourth frame, a receiving/sending capability of the STA 2 (for example, a role supported in the sensing session is a receiver) and a corresponding sensing parameter. After the STA 3 receives the third frame from the AP, the STA 3 sends a fourth frame (for example, a sensing response frame in FIG. 11*f*) to the AP, and indicates, in the fourth frame, a receiving/sending capability of the STA 3 (for example, a role supported in the sensing session is a receiver) and a corresponding sensing parameter. Further, the AP determines the STA 1, the STA 2, and the STA 3 as first STAs participating in the sensing session, and the AP sends (for example, sends by broadcast) a first frame (for example, a Trigger frame) to the STA 1, the STA 2, and the STA 3 based on a fourth frame (for example, a sensing response frame in FIG. 11*f*) fed back by each of the STA 1, the STA 2, and the STA 3, and configures a role and a sensing parameter for each of the STA 1, the STA 2, and the STA 3 to participate in the sensing session. After receiving the first frame, the STA 1 sends a second frame (for example, a Confirm frame) to the AP, and confirms to accept first information that is in the first frame and that is configured by the AP for the STA 1. After receiving the first frame, the STA 2 sends a second frame (for example, a Confirm frame) to the AP, and confirms to accept first information that is in the first frame and that is configured by the AP for the STA 2. After receiving the first frame, the STA 3 sends a second frame to the AP, and confirms to accept first information that is in the first frame and that is configured by the AP for the STA 3. In a measurement phase, the STA 1 sends a sensing signal to the STA 2 and the STA 3. After receiving the sensing signal, the STA 2 and the STA 3 perform signal processing measurement to obtain a measurement result. In a reporting phase, the STA 1 sends a Poll frame to both the STA 2 and the STA 3, so that the STA 2 and the STA 3 send the measurement result to the STA 1 after receiving the Poll frame. Further, the STA 1 sends, to the AP, a measurement report received from the STA 2 and the STA 3. It should be noted that, in the reporting phase, the AP may alternatively obtain the measurement result of the STA 2 and the STA 3 in a scheduling-based manner (as shown in case 2 in FIG. 5*c*) or a contention-based manner (as shown in case 3 in FIG. 5*c*).

Figure 11G:
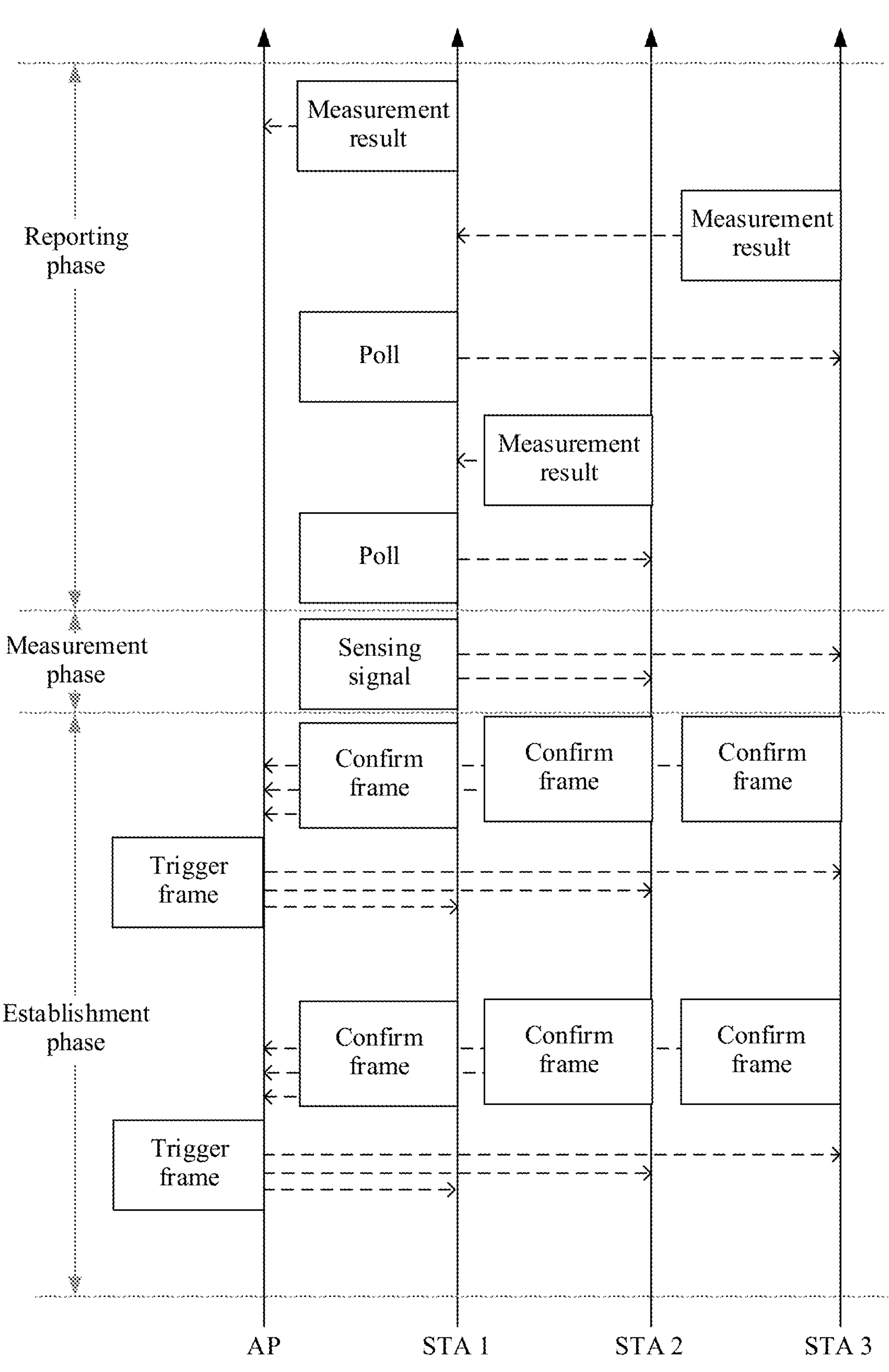
FIG. 11*g* is a schematic diagram of still another sensing session according to this application.

In the sensing session establishment phase, if the AP establishes the sensing session by using the method shown in FIG. 8*a*, a schematic diagram of the sensing procedure in the application scenario in FIG. 11*a* is shown in FIG. 11*g*. In the sensing session establishment phase, the AP sends a fifth frame (a trigger frame in FIG. 11*g*) to the STA 1, the STA 2, and the STA 3 by using the method shown in FIG. 8*a*, to request the STA 1, the STA 2, and the STA 3 to participate in the sensing session, and configures a role and a sensing parameter for each of the STA 1, the STA 2, and the STA 3 to participate in the sensing session. After the STA 1, the STA 2, and the STA 3 receive the fifth frame from the AP, the STA 1, the STA 2, and the STA 3 separately send a sixth frame (for example, a confirm frame in FIG. 11*g*) to the AP. If the sixth frame sent by another STA (the STA 2 or the STA 3) other than the STA 1 in FIG. 11*g* indicates that the STA receiving/sending the sixth frame refuses to participate in the sensing session by using the role and/or the sensing parameter configured in the fifth frame, the AP sends the fifth frame to the STA 1, the STA 2, and STA 3 again, and configures the role and the sensing parameter for the STA 1, the STA 2, and the STA 3 to participate in the sensing session until the sixth frame sent by the STA 1 to the AP indicates that the STA 1 confirms to participate in the sensing session by using the third role and the fourth sensing parameter that correspond to the STA 1, and/or the sixth frame sent by the STA 2 to the AP indicates that the STA 2 confirms to participate in the sensing session by using the third role and the fourth sensing parameter that correspond to the STA 2, and/or the sixth frame sent by the STA 3 to the AP indicates that the STA 3 confirms to participate in the sensing session by using the third role and the fourth sensing parameter that correspond to the STA 3. In a measurement phase, the STA 1 sends a sensing signal to the STA 2 and the STA 3. After receiving the sensing signal, the STA 2 and the STA 3 perform signal processing measurement to obtain a measurement result. In a reporting phase, the STA 1 sends a Poll frame to both the STA 2 and the STA 3, so that the STA 2 and the STA 3 send the measurement result to the STA 1 after receiving the Poll frame. Further, the STA 1 sends, to the AP, a measurement report received from the STA 2 and the STA 3. It should be noted that, in the reporting phase, the STA 1 may alternatively obtain the measurement result of the STA 2 and the STA 3 in a scheduling-based manner (as shown in case 2 in FIG. 5*c*) or a contention-based manner (as shown in case 3 in FIG. 5*c*).

Figure 12:
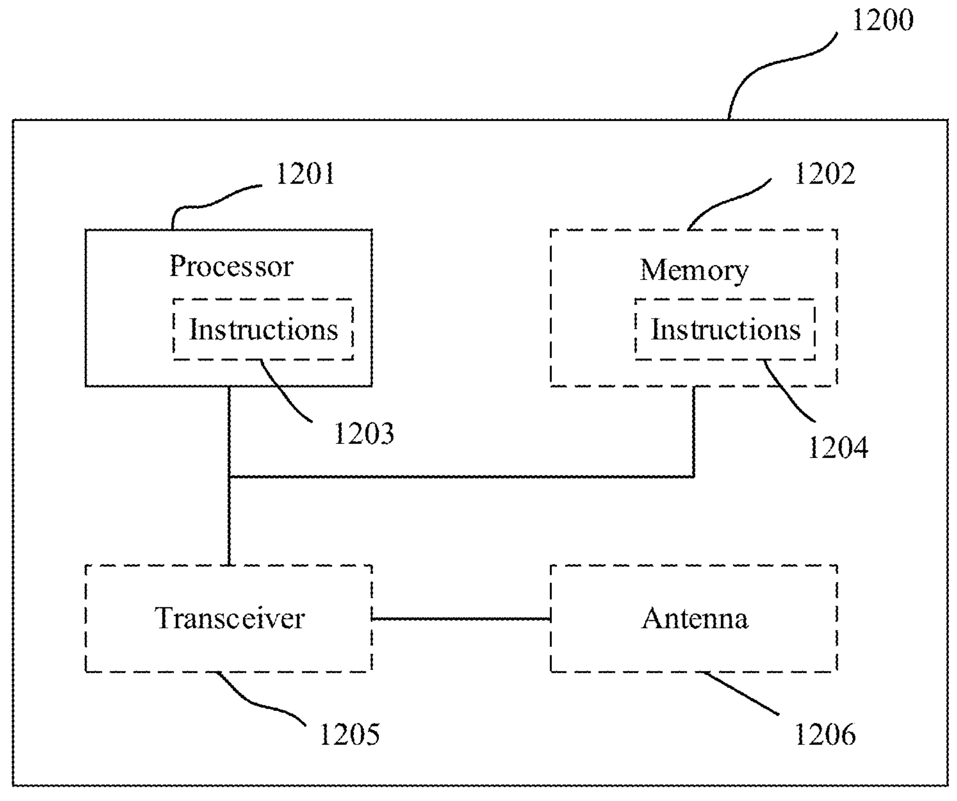
FIG. 12 is a schematic block diagram of a communication apparatus according to an embodiment of this application.

FIG. 12 is a schematic diagram of a structure of a communication apparatus according to an embodiment of this application. The communication apparatus 1200 may be the AP or a circuit system of the AP according to any one of the embodiments shown in FIG. 6*a*, FIG. 7*a*, or FIG. 8*a*, and is configured to implement the method corresponding to the AP according to the foregoing method embodiments. Alternatively, the communication apparatus 1200 may be the STA or a circuit system of the STA according to any one of the embodiments shown in FIG. 6*a*, FIG. 7*a*, or FIG. 8*a*, and is configured to implement the method corresponding to the STA according to the foregoing method embodiments. For a specific function, refer to the description in the foregoing method embodiments. For example, the circuit system is a chip system.

The communication apparatus 1200 includes one or more processors 1201. The processor 1201 may alternatively be referred to as a processing unit, and may implement a specific control function. The processor 1201 may be a general-purpose processor, a dedicated processor, or the like. For example, the processor 1201 may be a baseband processor, a central processing unit, and the like. The baseband processor may be configured to process a communication protocol and communication data. The central processing unit may be configured to control the communication apparatus 1200, execute a software program, and/or process data. Different processors may be independent components, or may be disposed in one or more processing circuits, for example, integrated into one or more application-specific integrated circuits.

Optionally, the communication apparatus 1200 includes one or more memories 1202, configured to store instructions 1204. The instructions 1204 may be run on the processor, so that the communication apparatus 1200 performs the method described in the foregoing method embodiments. Optionally, the memory 1202 may further store data. The processor and the memory may be separately disposed, or may be integrated together.

Optionally, the communication apparatus 1200 may include instructions 1203 (which may alternatively be referred to as code or a program sometimes), and the instructions 1203 may be run on the processor, so that the communication apparatus 1200 performs the method described in the foregoing embodiments. The processor 1201 may store data.

Optionally, the communication apparatus 1200 may further include a transceiver 1205 and an antenna 1206. The transceiver 1205 may be referred to as a transceiver unit, a transceiver machine, a transceiver circuit, a transceiver, an input/output interface, or the like, and is configured to implement sending and receiving functions of the communication apparatus 1200 by using the antenna 1206.

Optionally, the communication apparatus 1200 may further include one or more of the following components: a wireless communication module, an audio module, an external memory interface, an internal memory, a universal serial bus (USB) interface, a power management module, an antenna, a loudspeaker, a microphone, an input/output module, a sensor module, a motor, a camera, a display, or the like. It may be understood that, in some embodiments, the communication apparatus 1200 may include more or fewer components, or some components are integrated, or some components are split. These components can be hardware, software, or a combination implementation of software and hardware.

The processor 1201 and the transceiver 1205 described in embodiments of this application may be implemented on an integrated circuit (integrated circuit, IC), an analog IC, a radio frequency integrated circuit (RFID), a mixed-signal IC, an application-specific integrated circuit (ASIC), a printed circuit board (PCB), an electronic device, or the like. The communication apparatus described in this specification may be an independent device (for example, an independent integrated circuit or a mobile phone), or may be a part of a large device (for example, a module that may be embedded in another device). For details, refer to the foregoing descriptions of the AP and the STA. Details are not described herein again.

An embodiment of this application provides an access point device. The access point device (referred to as an AP for ease of description) may be used in the foregoing embodiments. The terminal device AP includes a corresponding means (means), unit, and/or circuit for implementing functions of the AP according to any one of embodiments shown in FIG. 6*a*, FIG. 7*a*, or FIG. 8*a*. For example, the AP includes a transceiver module, configured to support the AP in implementing sending and receiving functions, and a processing module, configured to support the AP in processing a signal.

An embodiment of this application further provides a station device. The station device (referred to as a STA for ease of description) may be used in the foregoing embodiments. The STA includes a corresponding means, unit, and/or circuit for implementing functions of the STA according to any one of the embodiments shown in FIG. 6*a*, FIG. 7*a*, or FIG. 8*a*. For example, the STA includes a transceiver module, configured to support the STA in implementing sending and receiving functions, and a processing module, configured to support the STA in processing a signal.

When several embodiments provided in this application are implemented in a form of software functional units and sold or used as independent products, the product may be stored in a computer-readable storage medium. The computer software product is stored in a storage medium, and includes several instructions for instructing a computer device (which may be a personal computer, a server, a network device, or the like) to perform all or some of the operations of the method described in embodiments of this application. The foregoing computer-readable storage medium may be any usable medium that can be accessed by a computer. The following provides an example but does not impose a limitation: The computer-readable medium may include a random access memory (RAM), a read-only memory (ROM), or any other medium that can be used to carry or store expected program code in a form of instructions or a data structure and can be accessed by a computer.

The foregoing descriptions are merely specific implementations of this application, but are not intended to limit the protection scope of embodiments of this application. Any variation or replacement readily figured out by a person skilled in the art within the technical scope disclosed in embodiments of this application shall fall within the protection scope of embodiments of this application. Therefore, the protection scope of embodiments of this application shall be subject to the protection scope of the claims.

What is claimed is:

1. A method, comprising:

receiving, by an access point (AP), a sensing request frame from a first station (STA), wherein the sensing request frame is used to request the AP to participate in a sensing session, the sensing request frame comprises an indication subfield, the indication subfield is used to indicate the first STA participates in at least one of receiving or sending of sensing signal, or, the indication subfield is used to indicate the first STA does not participate in at least one of receiving or sending of sensing signal, and the sensing request frame indicates an address of another STA participating in the sensing session; and sending, by the AP, a sensing response frame to the first STA, wherein the sensing response frame is used to indicate the AP participates or does not participate in the sensing session.

2. The method according to claim 1, wherein the sensing request frame comprises a sensing request element field that comprises a sensing request information subfield, and the sensing request information subfield comprises the indication subfield.

3. The method according to claim 1, wherein the sensing request frame further comprises another station information subfield that indicates the address of the another STA participating in the sensing session.

4. The method according to claim 3, wherein the sensing request frame comprises a sensing request element field that comprises the another station information subfield.

5. The method according to claim 1, further comprising:

performing, by the AP, coordinated scheduling on STAs participating in the sensing session.

6. The method according to claim 1, wherein the indication subfield is further used to indicate the first STA participates in the sensing session as at least one of a receiver or a transmitter, or, the indication subfield is used to indicate the first STA does not participate in the sensing session.

7. The method of claim 1, wherein the address of the another STA participating in the sensing session indicated in the sensing request frame comprises a MAC address.

8. An apparatus, comprising:

at least one processor and a memory, wherein the memory is configured to store one or more computer programs, and when the at least one processor executes the one or more computer programs stored in the memory, cause the apparatus to:

receive a sensing request frame from a first station (STA), wherein the sensing request frame is used to request the apparatus to participate in a sensing session, the sensing request frame comprises an indication subfield, the indication subfield is used to indicate the first STA participates in at least one of receiving or sending of sensing signal, or, the indication subfield is used to indicate the first STA does not participate in at least one of receiving or sending of sensing signal, and the sensing request frame indicates an address of another STA participating in the sensing session; and send a sensing response frame to the first STA, wherein the sensing response frame is used to indicate the apparatus participates or does not participate in the sensing session.

9. The apparatus according to claim 8, wherein the sensing request frame comprises a sensing request element field that comprises a sensing request information subfield, and the sensing request information subfield comprises the indication subfield.

10. The apparatus according to claim 8, wherein the sensing request frame further comprises another station information subfield that indicates the address of the another STA participating in the sensing session.

11. The apparatus according to claim 10, wherein the sensing request frame comprises a sensing request element field that comprises the another station information subfield.

12. The apparatus according to claim 8, wherein when the at least one processor executes the one or more computer programs stored in the memory, cause the apparatus further to:

perform coordinated scheduling on STAs participating in the sensing session.

13. The apparatus according to claim 8, wherein the indication subfield is further used to indicate the first STA participates in the sensing session as at least one of a receiver or a transmitter, or, the indication subfield is used to indicate the first STA does not participate in the sensing session as at least one of a receiver or a transmitter.

14. The apparatus of claim 8, wherein the address of the another STA participating in the sensing session indicated in the sensing request frame comprises a MAC address.

15. A non-transitory computer-readable storage medium, wherein the non-transitory computer-readable storage medium stores a computer program or instructions, and when the computer program or instructions are run on a computer, cause the computer to:

receive a sensing request frame from a first station (STA), wherein the sensing request frame is used to request an access point (AP) to participate in a sensing session, the sensing request frame comprises an indication subfield, the indication subfield is used to indicate the first STA participates in at least one of receiving or sending of sensing signal, or, the indication subfield is used to indicate the first STA does not participate in at least one of receiving or sending of sensing signal, and the sensing request frame indicates an address of another STA participating in the sensing session; and send a sensing response frame to the first STA, wherein the sensing response frame is used to indicate the AP participates or does not participate in the sensing session.

16. The non-transitory computer-readable storage medium according to claim 15, wherein the sensing request frame comprises a sensing request element field that comprises a sensing request information subfield, and the sensing request information subfield comprises the indication subfield.

17. The non-transitory computer-readable storage medium according to claim 15, wherein the sensing request frame further comprises another station information subfield that indicates the address of the another STA participating in the sensing session.

18. The non-transitory computer-readable storage medium according to claim 17, wherein the sensing request frame comprises a sensing request element field that comprises the another station information subfield.

19. The non-transitory computer-readable storage medium according to claim 15, wherein when the computer program or instructions are run on a computer, cause the computer further to:

perform coordinated scheduling on STAs participating in the sensing session.

20. The non-transitory computer-readable storage medium according to claim 15, wherein the indication subfield is further used to indicate the first STA participates in the sensing session as at least one of a receiver or a transmitter, or, the indication subfield is used to indicate the first STA does not participate in the sensing session as at least one of a receiver or a transmitter.

* * * * *